United States Patent
Roberts et al.

(10) Patent No.: US 11,281,820 B2
(45) Date of Patent: Mar. 22, 2022

(54) SYSTEMS AND METHODS FOR GROWTH-BASED DESIGN

(71) Applicant: Desktop Metal, Inc., Burlington, MA (US)

(72) Inventors: Andrew Fiske Roberts, Charlestown, MA (US); Christian Gomez, Burlington, MA (US)

(73) Assignee: Desktop Metal, Inc., Burlington, MA (US)

(*) Notice: Subject to any disclaimer, the term of this patent is extended or adjusted under 35 U.S.C. 154(b) by 0 days.

(21) Appl. No.: 16/373,246

(22) Filed: Apr. 2, 2019

(65) Prior Publication Data

US 2020/0320175 A1    Oct. 8, 2020

(51) Int. Cl.
*G06F 30/17* (2020.01)
*G06T 19/20* (2011.01)

(52) U.S. Cl.
CPC .......... *G06F 30/17* (2020.01); *G06T 19/20* (2013.01)

(58) Field of Classification Search
None
See application file for complete search history.

(56) References Cited

U.S. PATENT DOCUMENTS

| | | | |
|---|---|---|---|
| 5,297,054 A | 3/1994 | Kienzle et al. | |
| 6,445,388 B1 | 9/2002 | Subrahmanyam et al. | |
| 6,486,878 B1 | 11/2002 | Subrahmanyam et al. | |
| 6,608,623 B1 | 8/2003 | Gerlovin et al. | |
| 7,013,246 B1 | 3/2006 | Gerlovin et al. | |
| 7,176,942 B2 | 2/2007 | Chartier et al. | |
| 7,283,136 B2 | 10/2007 | Chartier et al. | |

(Continued)

FOREIGN PATENT DOCUMENTS

| | | |
|---|---|---|
| WO | 2012058607 A2 | 5/2012 |
| WO | 2013119389 A1 | 8/2013 |

(Continued)

OTHER PUBLICATIONS

Bill Arrighi et al., "Three-Dimension Multiscale Design Using Neural Net Surrogate Models of Lattice Material Response," Purdue University, Sep. 17-19, 2018, (2 pages).

(Continued)

*Primary Examiner* — Edward Martello
(74) *Attorney, Agent, or Firm* — Oak Law, PLLC; Jonathan D. Hall

(57) ABSTRACT

Systems and methods are disclosed for generating designs for mechanical parts in a computer aided design (CAD) context. One method includes generating a model of a mechanical part, the model including one or more cells, wherein each cell is comprised of a plurality of parameterized representations, each of the plurality of parameterized representations representing a material property; determining, for each cell, a cell-specific parameter value for each of the parameterized representations; comparing, for each cell, each of the cell-specific parameter values to a corresponding threshold parameter value associated with each of the representations of the material properties; and generating at least one additional cell or removing at least one of the one or more cells based on the comparison of each cell-specific parameter value to the corresponding threshold parameter value.

20 Claims, 42 Drawing Sheets

(56) References Cited

U.S. PATENT DOCUMENTS

| | | |
|---|---|---|
| 7,353,147 B2 | 8/2008 | Kozak et al. |
| 7,464,007 B2 | 12/2008 | Reitman et al. |
| 7,577,935 B2 | 8/2009 | Reynolds |
| 7,966,598 B2 | 6/2011 | Polomik et al. |
| 8,103,484 B2 | 1/2012 | Ravnikar et al. |
| 8,122,399 B2 | 2/2012 | Bowers et al. |
| 8,141,016 B2 | 5/2012 | Correale, Jr. et al. |
| 8,775,130 B2 | 7/2014 | Walker et al. |
| 9,102,099 B1 | 8/2015 | Karpas et al. |
| 9,535,663 B2 | 1/2017 | Yaseen et al. |
| 9,582,458 B2 | 2/2017 | Gavish et al. |
| 9,727,675 B2 | 8/2017 | Liu et al. |
| 9,747,394 B2 | 8/2017 | Nelaturi et al. |
| 9,946,816 B2 | 4/2018 | Kim et al. |
| 10,061,870 B2 | 8/2018 | Nelaturi et al. |
| 2003/0200533 A1 | 10/2003 | Roberts et al. |
| 2007/0028208 A1 | 2/2007 | Maki |
| 2010/0107130 A1 | 4/2010 | Bowers et al. |
| 2013/0070949 A1 | 3/2013 | Fukuma |
| 2014/0214370 A1 | 7/2014 | Olhofer et al. |
| 2016/0133049 A1 | 5/2016 | Hill et al. |
| 2016/0171126 A1 | 6/2016 | Gannon et al. |
| 2016/0224694 A1 | 8/2016 | Boussuge et al. |
| 2016/0232264 A1 | 8/2016 | Oh et al. |
| 2017/0024647 A1 | 1/2017 | Cheong et al. |
| 2017/0032056 A1 | 2/2017 | Iorio |
| 2017/0065373 A1 | 3/2017 | Martz et al. |
| 2017/0154150 A1 | 6/2017 | Schaefer |
| 2018/0098828 A1 | 4/2018 | Hansen et al. |
| 2018/0113959 A1 | 4/2018 | Tierney et al. |
| 2018/0137213 A1 | 5/2018 | Benjamin et al. |
| 2018/0253511 A1 | 9/2018 | Benjamin et al. |
| 2018/0267676 A1 | 9/2018 | Glueck et al. |
| 2018/0268087 A1 | 9/2018 | Tierney et al. |
| 2018/0276319 A1 | 9/2018 | Tierney et al. |
| 2018/0299868 A1 | 10/2018 | Grafen et al. |
| 2018/0336289 A1 | 11/2018 | Benjamin et al. |
| 2018/0349531 A1 | 12/2018 | Morris et al. |
| 2019/0026401 A1 | 1/2019 | Benjamin et al. |
| 2019/0057166 A1 | 2/2019 | Liongosari et al. |
| 2019/0065633 A1 | 2/2019 | Stoddart et al. |
| 2019/0115668 A1* | 4/2019 | Coward ............... H01Q 19/062 |
| 2019/0339670 A1* | 11/2019 | Tang ....................... B33Y 50/00 |

FOREIGN PATENT DOCUMENTS

| | | |
|---|---|---|
| WO | 2017167726 A1 | 10/2017 |
| WO | 20170186786 A1 | 11/2017 |
| WO | 2018172079 A1 | 9/2018 |
| WO | 2018172080 A1 | 9/2018 |
| WO | 2018183275 A1 | 10/2018 |

OTHER PUBLICATIONS

Rubaiat Habib Kazi et al., "DreamSketch: Early Stage 3D Design Explorations with Sketching and Generative Design" Oct. 22-25, 2017, (14 pages).

Sivam Krish, "A practical generative design method," Computer-Aided Design, 43 (2011) 88-100, (13 pages).

N. P. Oliveira et al., "Parametric modelling design applied to weft knitted surfaces and its effects in their physical properties," 17th World Textile Conference AUTEX 2017—Textiles—Shaping the Future, IOP Conf. Series: Materials Science and Engineering, 254 (2017) (7 pages).

Kristina Shea et al., "Towards integrated performance-driven generative design tools," Automation in Construction, 14 (2005) 253-264, (12 pages).

Taras Kowaliw et al. "The Evolution of Structural Design Through Artificial Embryogeny" Artificial Life, Apr. 1, 2007, pp. 425-432.

Norio Inoue et al. "Cellular automaton generating topological structures", Proceedings of SPIE, vol. 2361, Sep. 13, 1994, pp. 47-50.

Zhu J. H. et al. "Bi-Directional Evolutionary Topology Optimization Using Elements Replaceable Method", Computational Mechanics; Solids, Fluids, Engineered Materials, Aging Infrastructure, Molecular Dynamics, Heat Transfer, Manufacturing Processes, Optimization, Fracture & Integrity, Springer, Berlin, Germany, vol. 40, No. 1, Jun. 10, 2006, pp. 97-109.

International Search Report and Written Opinion in Application No. PCT/US2018/058010, dated Feb. 12, 2019, (18 pages).

* cited by examiner

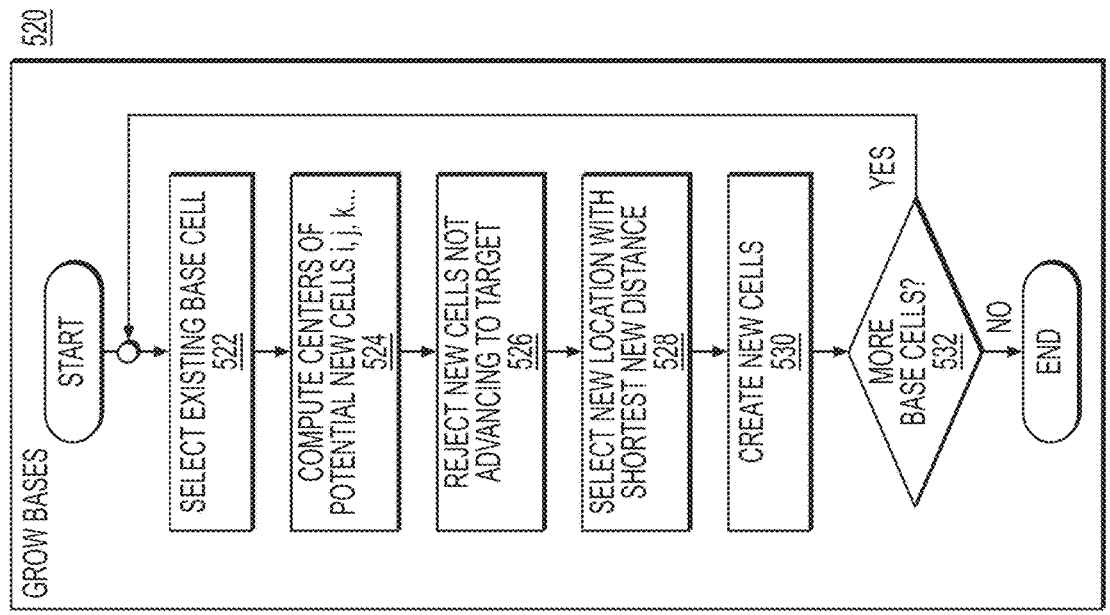
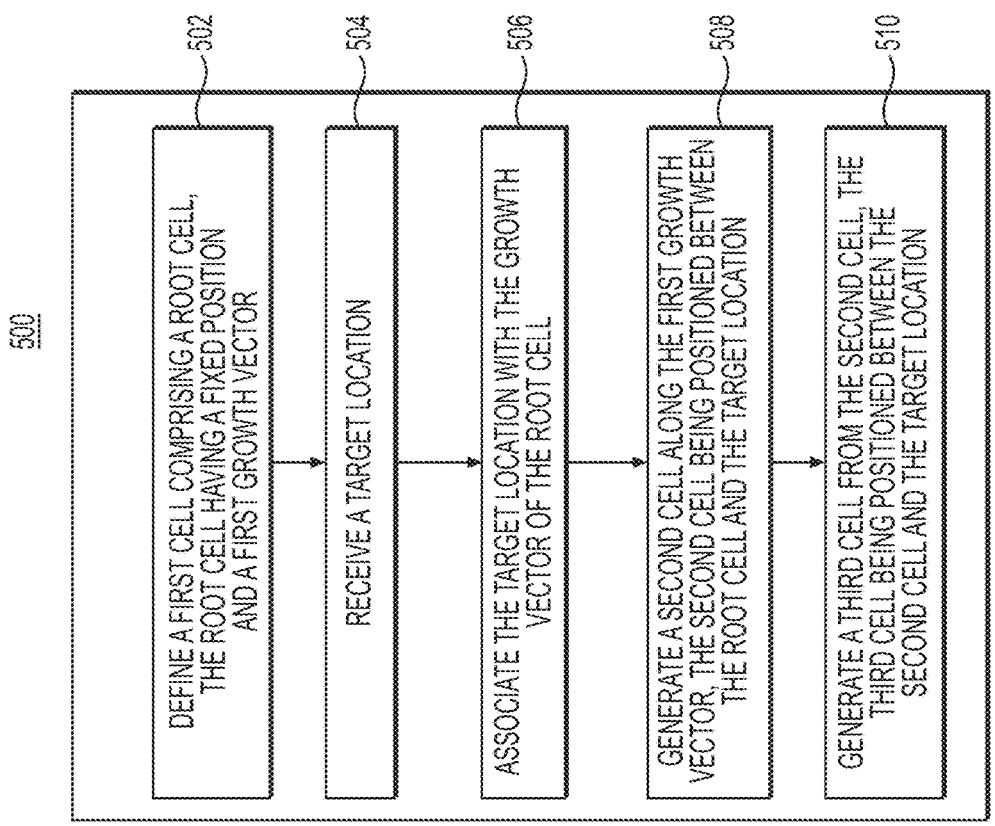

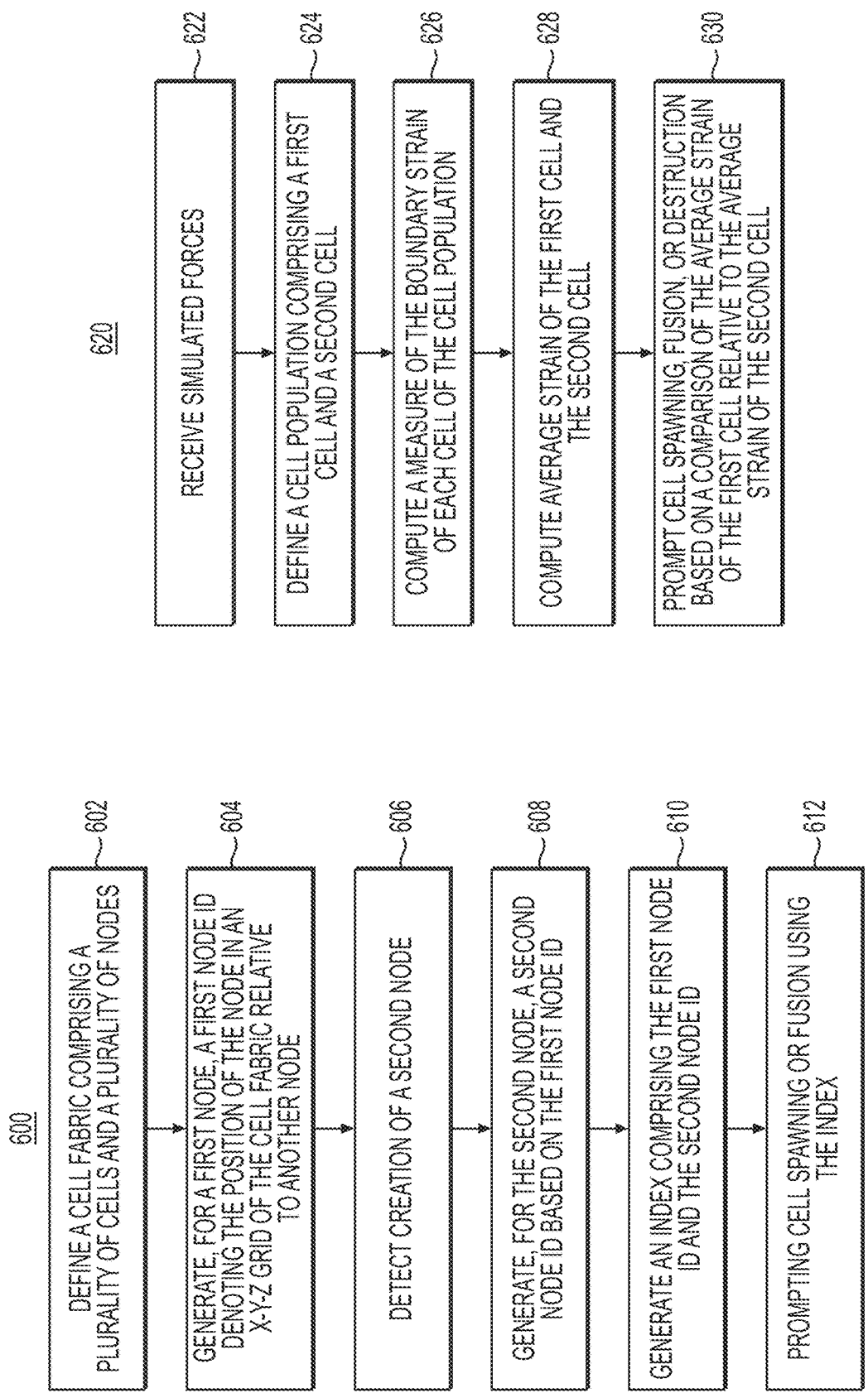

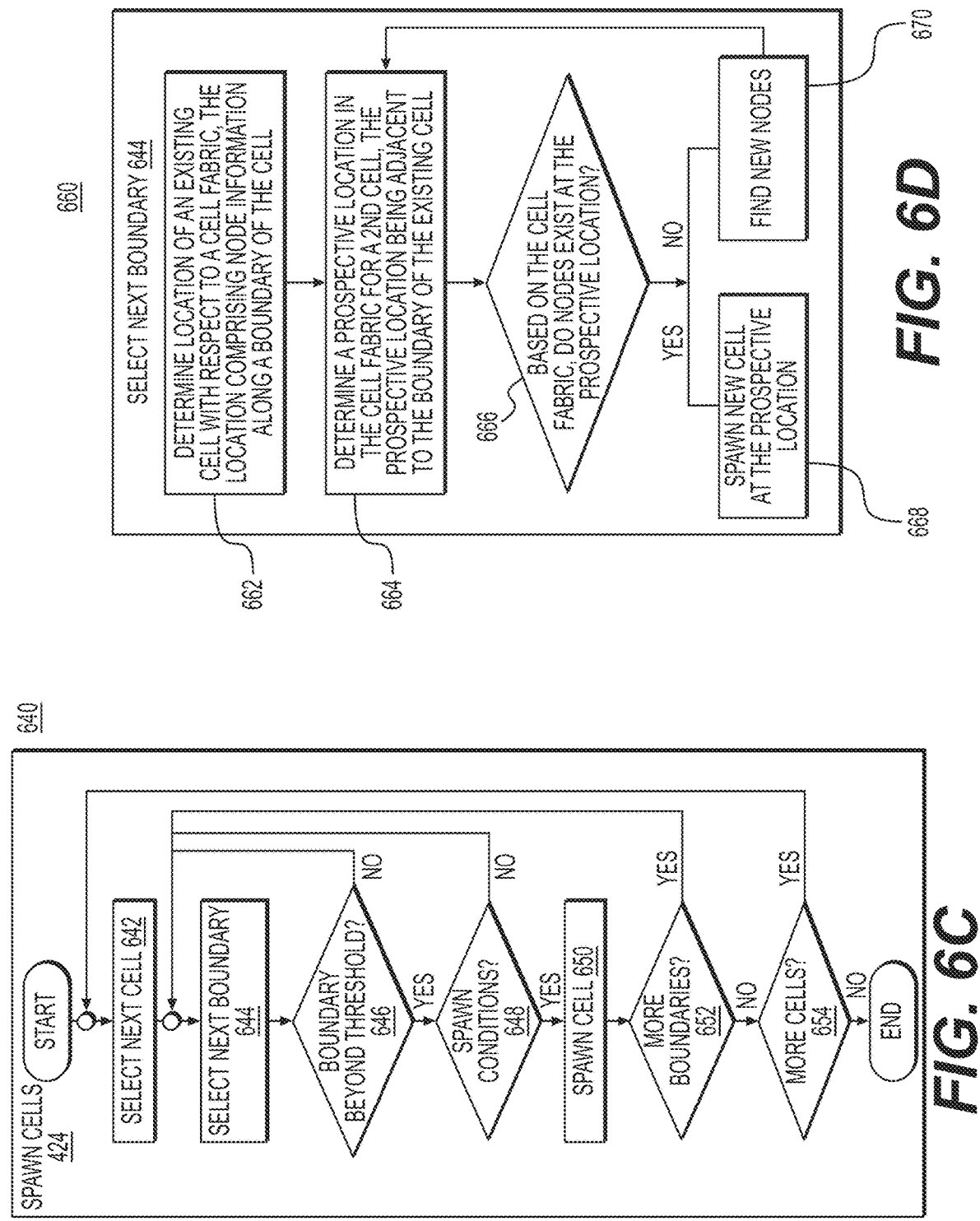

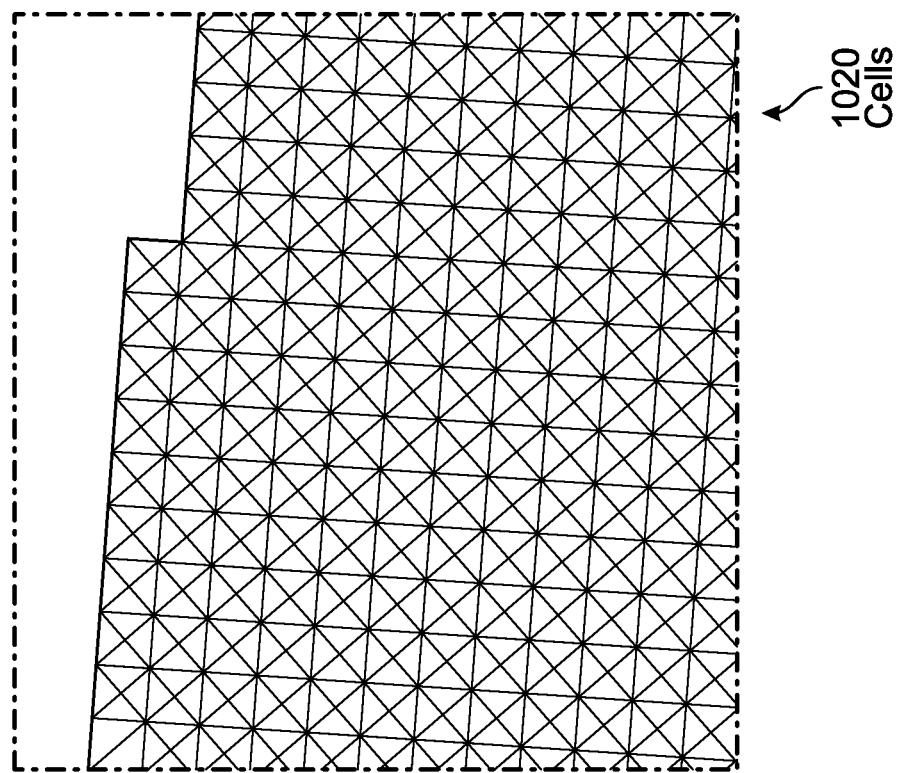
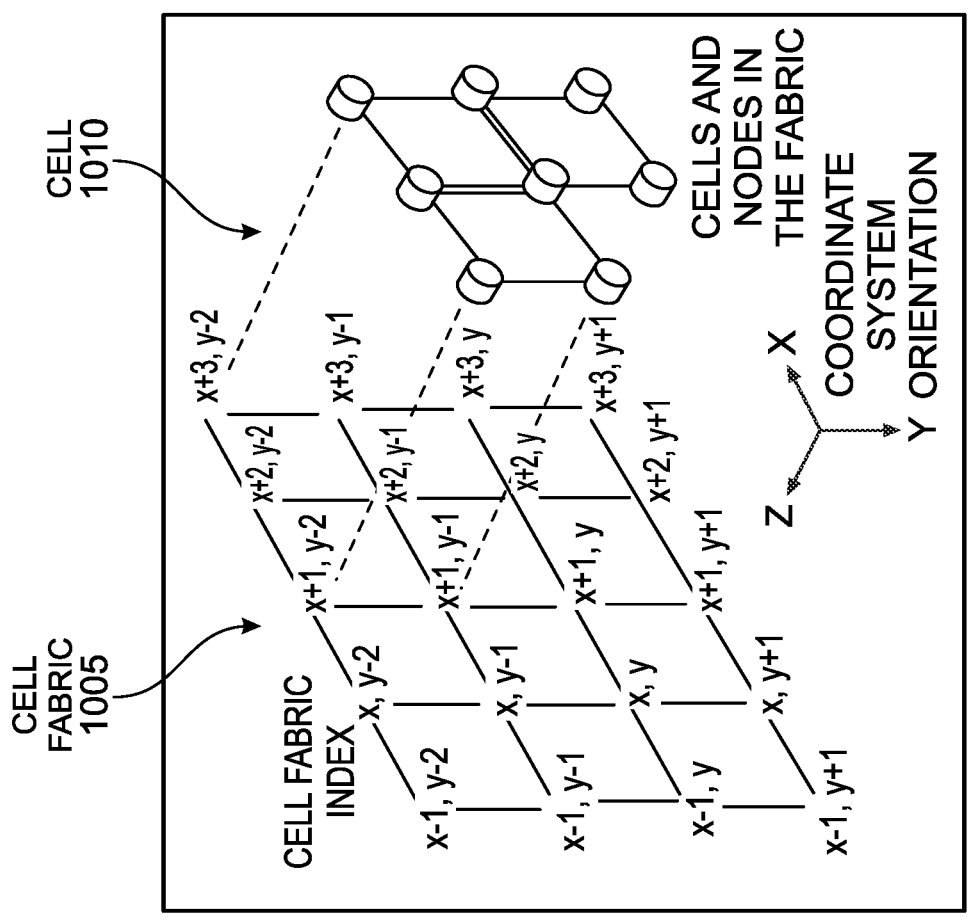
FIG. 10B
FIG. 10A

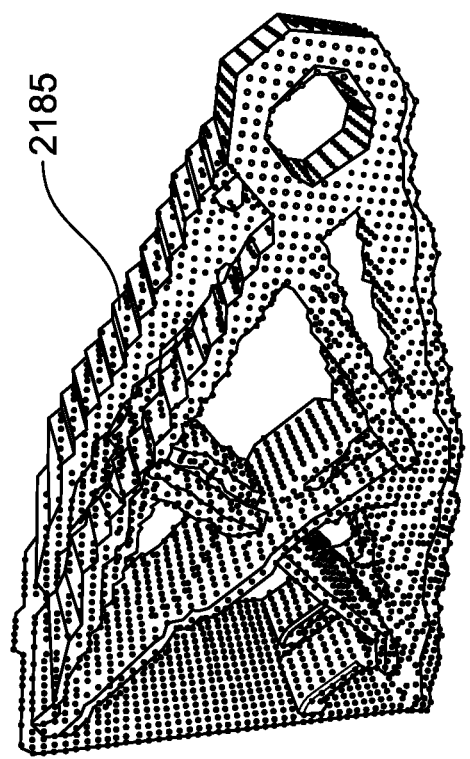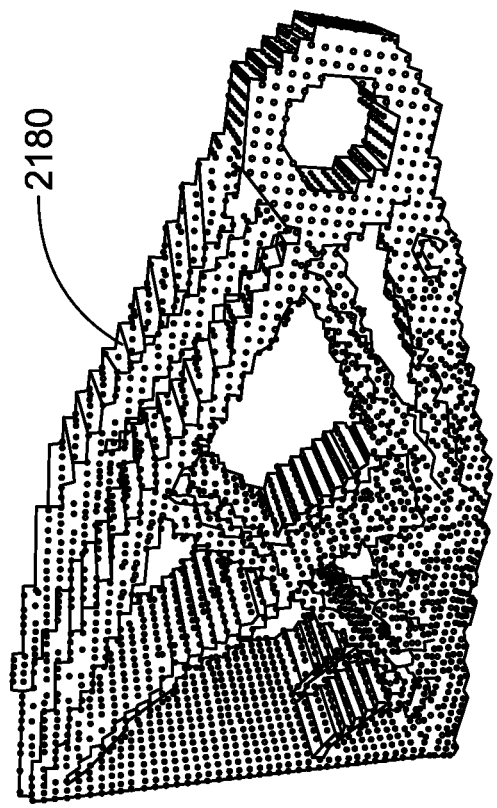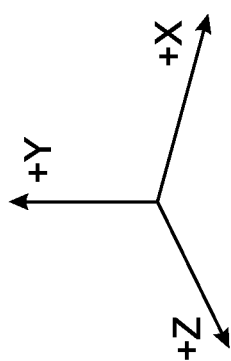
FIG. 21K

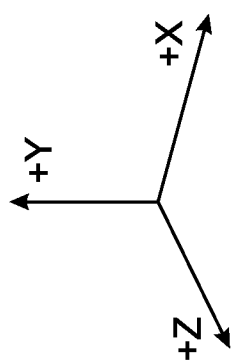
FIG. 21L

SYSTEMS AND METHODS FOR GROWTH-BASED DESIGN

INTRODUCTION

Existing tools for designing mechanical parts require that the geometry of the part be known in advance. Users envision the geometry of the part, model the part using a tool, subject the part to static or dynamic tests, and modify the part design according to the test results. Various software tools are available for creating, designing, viewing and editing mechanical parts. Such software systems are commonly referred to as computer aided design tools (i.e., CAD tools). Existing CAD tools require that the engineer manually create design shapes using geometry creation tools. These tools permit users to build parts from generic parameterized attributes of parts, including bosses, holes, shells, fillets, patterns, and other attributes. For example, a CAD tool may provide a list of possible mechanical part attributes (holes, shells, fillets, etc.) for a user to select and manipulate. A user can change parameters of selected attributes and add/delete attributes until design of the mechanical part is complete. Existing CAD tools require users to create aspects of the geometry of a mechanical part.

Existing CAD tools may also provide kinematic or dynamic analysis capabilities to test a design of a mechanical part under various static or dynamic conditions. For example, a user could create a bracket and then simulate stresses, strains, and failure modes as the geometry is gradually loaded up, or subjected to vibrations over time. Based on the analysis, a user could modify the design features of the bracket and test the modified bracket until the bracket met desired safety or wear specifications. In 1988, topology optimization (TO) emerged as a mathematical approach to optimize the geometry of a part. TO involves discretizing an entire design space (including the structure of a modeled mechanical part) into a mesh with mesh elements, and solving an objective function to optimize the mesh and thus the form of the mechanical part. While TO has opened the door to varying the geometry of known initial structures existing in a known design space, without a user having to manually modify the model of the mechanical part, it still requires a user to engineer the general form of the part prior to simulating stresses, etc.

Thus, there remains a need for software capable of generating designs for mechanical parts and capable of automatically updating the part design in response to testing simulations.

SUMMARY

Existing CAD tools require a user to create a design manually and from beginning to end and shape a design by iteratively testing and modifying the geometry and structure of the design. Embodiments of the present disclosure take a different approach and involve programming building components that automatically respond to simulations/testing, and thus automate the design process.

The disclosed systems and method thus provide a software system that adaptively, automatically models mechanical parts. The disclosed approach is referred to herein as growth-based design (GBD). Growth-based design is an approach to computer aided design (i.e., CAD) that enables users to create models of mechanical parts. The disclosed systems and methods describe a set of modeling building blocks (called "cells") that are programmed to generate populations of cells. The user may set up modeling constraints that may guide these cells to grow from a set of seed cells into a collection of cells, via the GBD approach. The collection of cells may grow to form a model of a physical structure. Users benefit from this solution by being able to create naturally self-optimized designs that they could not have envisioned on their own. Example embodiments can provide design tools that blend principles of growth and adaptation with engineering. In particular, example embodiments may provide elements of cell-level growth behaviors, and may include them into a toolset of building blocks for creating structures.

The present disclosure provides embodiments of a computer-implemented system and method that automatically generates designs for mechanical parts. For example, the present embodiments may define a basic design building block comprising a "cell." The present disclosure describes the systems and methods that allow the cell to "grow" towards a target and thus to generate a design for a part.

The cellular building blocks mentioned above are software implementations of multi-dimensional cellular objects that may automatically grow, spawn cells, subdivide, and die in response to a constantly changing design space environment. The disclosed growth-based design space may provide a sort of "virtual Petri dish," where a user can set up the initial boundary conditions, such as one or more walls, fixed regions, symmetry planes, forces, and zones (e.g., fill-in, keep-out/exclusion, and/or container/boundary regions, as will be discussed in greater detail), and watch a structure take shape via growth-based design. The GBD system may trigger growth through the elapsing of time. The GBD system may also let a user stop the progress, and interact with the growth-based designed structure ("GBD structure") before resuming. This approach contrasts with existing CAD tools where there is no concept of autonomous cell growth over time, and where the user must develop the form of a part, and then create the geometry explicitly.

At least one advance of the described techniques is that designs are automated, and designs can be generated that are not limited to a user's imagination. In addition, the disclosed systems and methods permit real-time tests of the design(s) and updates to the designs without a user having to manually modify a design and then run a test on the modified design to see the success of the design. In particular, the described techniques provide cells that track data of the tests, and automatically respond to the stimuli of the tests. Updates to a design are derived from the cells' adaptation to the tests, rather than a user's modification to a design.

TO approaches are also fundamentally different when compared with the GBD approach taken in this disclosure. TO approaches discretize an entire volumetric design space into mesh elements, and make assumptions on whether each mesh elements is filled or void. The growth-based approach, however, bypasses the step of discretizing an entire design space. Rather, structures made from a growth-based approach are made cell-by-cell. Thus, only cells may be tracked and processed, rather than also monitoring void spaces.

In addition, with TO approaches, mesh elements are simply represented by a density value, and the decision to change mesh density values is based on simulation results from the current iteration. TO uses only the current state of a designed structure to make decisions on the next state of the designed structure. To elaborate, TO approaches entail a setting of initial parameters, and various final structures may form from the initial parameters. Users then select a final design of their preference, from the various final structures.

The disclosed GBD approach, however, uses the cumulative effect of prior states of cells to make decisions on the next state of the structure being generated. In a growth-based approach, a structure is continually grown in a design space, from a single cell to a full structure, with the structure fluctuating from various applications of tests (e.g., stimuli/forces). The structure is a single structure that may take various forms over the course of a simulation, similar to how an animal or plant grows through its life. A user may select, for manufacture, a structure from the generated growth-based approach, from the various forms that the GBD structure takes over its lifetime in the design space. In other words, the various structures generated by TO are various outcomes/solutions of a single set of initial parameters. TO may be seen as generating solutions with respect to one function. The GBD approach, however, generates various structures by having the structures fluctuate in response to multiple stimuli/functions applied in the course of a design cycle. Users then select, for manufacture, a structure taken as a "snapshot" of the GBD structure at one point in time, built from the cumulated effect of all of the applied tests.

One method includes: generating a model of a mechanical part, the model including one or more cells, wherein each cell is comprised of a plurality of parameterized representations, each of the plurality of parameterized representations representing a material property; determining, for each cell, a cell-specific parameter value for each of the parameterized representations; comparing, for each cell, each of the cell-specific parameter values to a corresponding threshold parameter value associated with each of the representations of the material properties; and generating at least one additional cell or removing at least one of the one or more cells based on the comparison of each cell-specific parameter value to the corresponding threshold parameter value.

In accordance with another embodiment, a system for generating a design for a mechanical part: a data storage device storing instructions for generating a design for a mechanical part; and a processor configured for: generating a model of a mechanical part, the model including one or more cells, wherein each cell is comprised of a plurality of parameterized representations, each of the plurality of parameterized representations representing a material property; determining, for each cell, a cell-specific parameter value for each of the parameterized representations; comparing, for each cell, each of the cell-specific parameter values to a corresponding threshold parameter value associated with each of the representations of the material properties; and generating at least one additional cell or removing at least one of the one or more cells based on the comparison of each cell-specific parameter value to the corresponding threshold parameter value.

In accordance with another embodiment, a non-transitory computer readable medium for use on a computer system containing computer-executable programming instructions for generating a design for a mechanical part, the method comprising: generating a model of a mechanical part, the model including one or more cells, wherein each cell is comprised of a plurality of parameterized representations, each of the plurality of parameterized representations representing a material property; determining, for each cell, a cell-specific parameter value for each of the parameterized representations; comparing, for each cell, each of the cell-specific parameter values to a corresponding threshold parameter value associated with each of the representations of the material properties; and generating at least one additional cell or removing at least one of the one or more cells based on the comparison of each cell-specific parameter value to the corresponding threshold parameter value.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The foregoing will be apparent from the following more particular description of example embodiments, as illustrated in the accompanying drawings in which like reference characters may refer to the same parts throughout the different views. The drawings are not necessarily to scale, emphasis instead being placed upon illustrating embodiments. The described inventions are neither limited to any single aspect nor embodiment thereof, nor to any combinations and/or permutations of such aspects and/or embodiments. Moreover, each of the aspects of the described inventions, and/or embodiments thereof, may be employed alone or in combination with one or more of the other aspects of the described inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended to reflect or indicate that the embodiment(s) is/are "example" embodiment(s).

FIG. 5A is a flow diagram of an exemplary method for growing a GBD structure.

FIG. 5B is a flow diagram illustrating an exemplary method for growing bases from existing base cells.

FIGS. 6A, 6B, 6C, 6D, and 6E are flow diagrams of exemplary methods for various cell actions and states (e.g., spawning, fusing, destruction, etc.).

FIGS. 10A and 10B illustrate configurations of cells within a simulated design space.

FIGS. 21K, 21L, 22, 23, 24, 25, 26, 27, 28, 29, and 30 illustrate a process of voxel fairing to process the surfaces of an object model.

DETAILED DESCRIPTION

A description of example embodiments follows. The teachings of all patents, published applications, and references cited herein are incorporated by reference in their entireties. Existing CAD tools require that a user develop an idea or image of a mechanical part, and then create the geometry explicitly. Such structures are thus limited by a user's imagination.

Figure 19A:
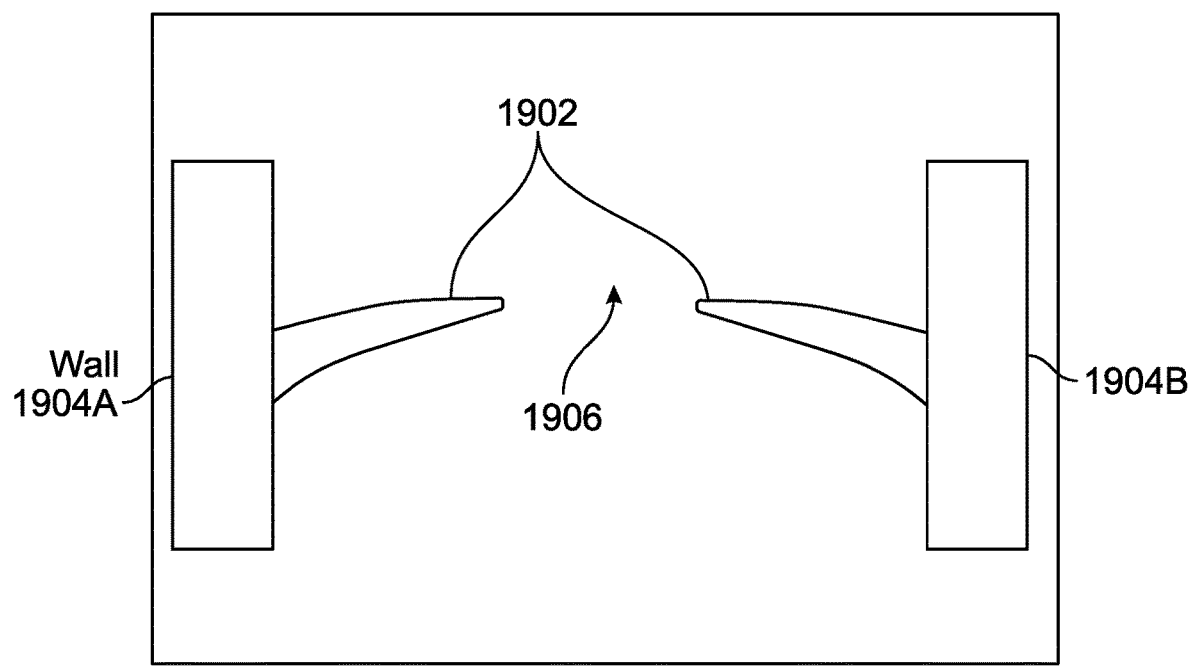
FIGS. 19A, 19B, 19C, 19D, 19E, 19F, 19G, 19H, 19I, and 19J illustrate an exemplary sequence of growth and modification of a GBD structure.
Figure 19B:
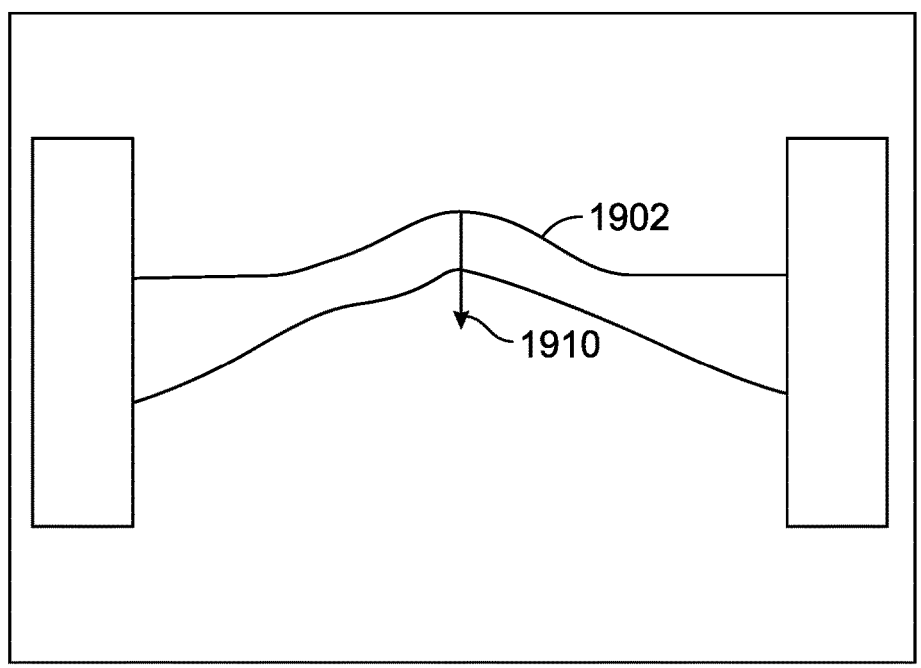
Figure 19C:
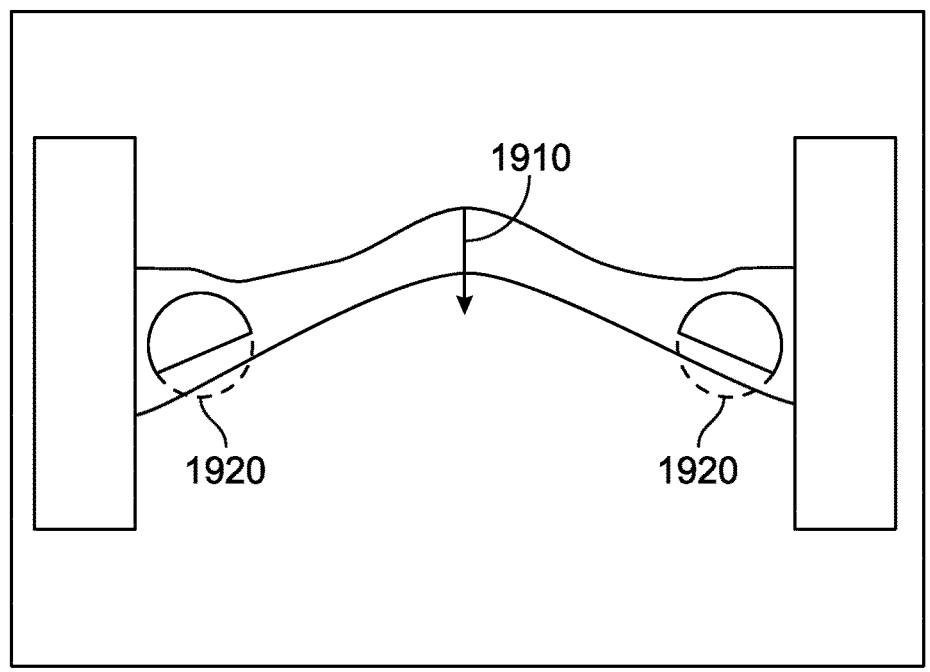
Figure 19D:
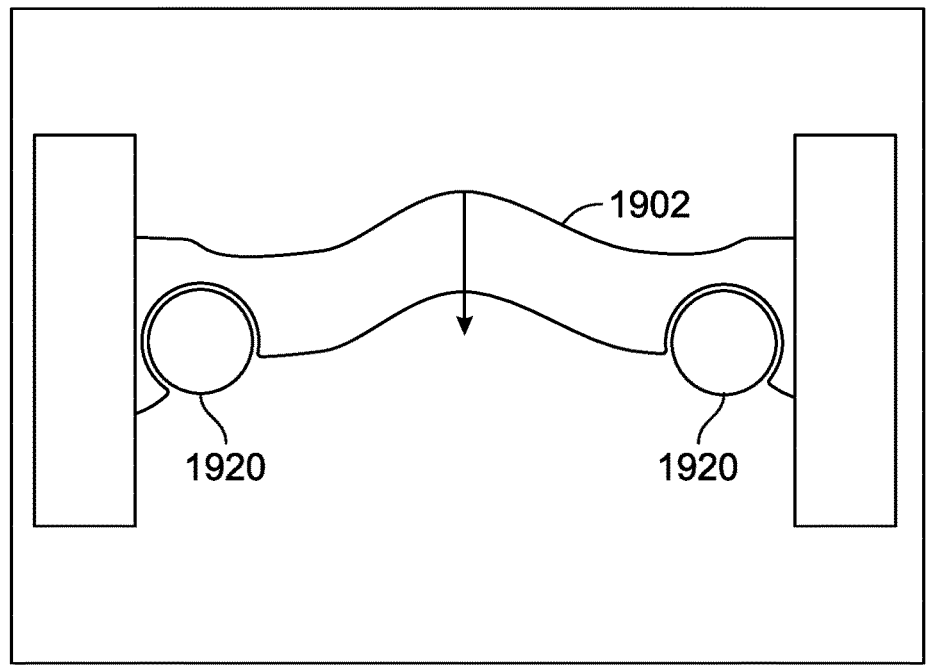

As described above, the disclosed systems and methods, however, provide a method for creating computer-designed structures. In particular, the present embodiments detail a method of automated design of mechanical parts, built on a principle of building structures as a collection of units (e.g., via "cell growth"). Specifically, the disclosed embodiments comprise a software system referred to as growth based design (GBD). Growth based design is a new approach to computer aided design (CAD) that enables users to design mechanical parts via building blocks (e.g., "cells") that may be programmed to automatically generate the designs for mechanical parts. For example, in the disclosed embodiments, a user may provide initial constraints or parameters to a design space and initiate a GBD design process. In one scenario, this may entail the user providing initial constraints (e.g., material to be used to the mechanical part) and/or boundary conditions (e.g., walls and forces), and clicking a "start GBD" icon, or example, on a user interface. The described GBD approach may then build a structure for the mechanical part, using one or more parameterized building blocks referred to as "cells", e.g., as illustrated at FIG. 19A where GBD structure 1902 is developing from starting positions at walls 1904a and 1904b, to target location 1906. These cells may be comprised of software implementations of multi-dimensional cellular objects that may grow, spawn additional cells, subdivide, fuse, and/or die in response to a changing design space environment. In other words, the GBD approach may involve constructing a design or a model of a physical structure by growing a population of cells from one or more seed cells, while taking into account the initial boundary conditions and variances in the boundary conditions over time. The design space environment and boundary conditions may change over time, due to applied stimuli or tests for the developing structure, and due to the structure's development.

Just as a user may initiate the GBD design process, the disclosed GBD tool may allow a user to stop or pause the progress at any point, and interact with the designed structure before resuming or saving the structure, e.g., for manufacture. This approach contrasts with existing CAD tools in that the design process may be driven by commands programmed to construct a structure in response to parametric settings, rather than by an individual's conception of a finalized structure.

Another improvement is that the GBD approach may automatically change structures in response to testing, whereas for traditional CAD environments, structural change and testing are generally separate actions. In a traditional CAD environment, testing of mechanical parts is performed by beginning with a whole design, and breaking the entire design into parts for analysis with the Finite Element Method (i.e., FEM). A user builds the structure for a mechanical part, tests the mechanical part, adjusts the structure, and re-tests. The disclosed GBD approach, however, starts with parts (e.g., cellular building blocks) and grows a structure into an entire mechanical part, testing the structure at each time interval and adjusting the structure's form in response to the test. This takes guess work out of design, eliminating the need for users to try a design structure, analyze it, make changes, and try again. With GBD, the analysis may be built into the designed structure, so analysis is not an afterthought.

Yet another improvement is that the structures produced by the disclosed GBD approach may be the results of compounded, cumulative tests. Their stored development "history" may provide many advantages. As context, by implementing a GBD approach to define a geometry of an object, example embodiments can provide structures having shapes that take on a natural and functional form that emerges from the growth process. During such a design process, the shape of the structure may result from a constantly-adapting form. Over the span of a GBD process, the constantly-adapting form may have portions that grow (e.g., via cell spawning, fusion, or strengthening), and portions that atrophy via cell destruction. Such growth and loss in the form causes the GBD structure to gain overall strength and efficiency. The GBD approach thus provides structures that are the results of compounding effects of changes. Thus, this "history" is advantageous in that the GBD structure is thus understood to be able to withstand the total stimuli/forces it was subjected to during testing. This cumulative testing capability in the GBD process is an improvement over the singular testing scenarios available in traditional CAD environments.

Present embodiments include systems and methods of defining geometry of an object. In particular, the disclosed systems and methods generate a modeling environment (e.g., a design space) including at least one initial cell, the design space being defined by global parameters. The present embodiments describe a design space which may provide a user with a library of features (tools) for a user to define boundary constraints (e.g., fill-in, keep-out, and/or container/boundary zones), fixed and forced regions, symmetries, locations for seed cells, and parameters (including gravity forces, material properties, and cell sizes, safety factors and design objectives (e.g., minimize mass within selected stress/strain limits)). The disclosed GBD system may then use user input to build a representation comprising building blocks (e.g., "cells") planted into this design space. Each "cell" may refer to a modeled, parametrized unit that comprises a basic building block for a structure made from a GBD structure. For example, a cell may be comprised of a mathematical and visual representation of physical material properties, mechanical properties, electrical properties, thermal properties, chemical properties, or a combination thereof. For instance, one exemplary cell may include a representation elastic material properties by modeling one or more physical elements, including springs, dampers, and masses. The current embodiments describe various ways to parameterize, monitor, and manipulate each cell and cell population to prompt automated design or "growth."

Some global parameters may be provided by user input, e.g., type of material or a safety factor. The representation of the cell building block may be based on these global factors. For example, a soft material may cause a cell representation comprised of springs with low stiffness. Selection of a hard material may cause the disclosed system to generate a cell comprised of springs with high stiffness.

One example embodiment focuses on the modeling of 2D planar structures. Another disclosed embodiment describes a library of cells for modeling 3D surfaces and volume-filling structures. In each embodiment, the growth-based design system may provide a "scaffolding structure" which serves as an abstract platform upon which the cellular building blocks may "grow." In the 2D plane and 3D surface cases, this construct, which maintains location and relationship information of cells within a space, may be referred to as a "cell fabric." A cell fabric may define the allowable cell locations, including cell orientations and cell-to-cell attachments that are allowed in the cell population.

In example embodiments, the described GBD systems may have the capability to automatically destroy or spawn new cells. This may enable automatic optimization of the shape of a designed structure, where cells may be automatically added or subtracted based on parameterized values associated with each cell, relative parameter values between cells, and threshold parameter values that may be pre-set, user-entered, or continuously learned using machine learning techniques. Solutions may utilize a number of measurements in determining whether or not to create a new neighboring cell or to destroy a cell. In one approach, the strain of a structural element, such as a spring along an individual cell boundary, may cause the GBD system to determine that the cell needs the help of a neighboring cell in order to reduce its deformation along that boundary. In determining whether or not to create a new cell as a neighbor to another cell, a system utilizing a GBD process may also utilize a number of measurements, as well be described herein.

Successive cells may be generated to form a cell population, including the at least one initial cell, where the generation is a function of global parameters, cell parameters of cells in a GBD structure, and modeled stimuli. The cell population may be the GBD structure. In the GBD modeling design space described herein, cell parameters may be updated and determined in response to a simulated stimulus applied to the GBD structure, the stimulus including at least one of a force, a radiation source, a chemical reaction, e.g., an electrolytic action, etc. For destroying a cell, the system may calculate a time-averaged value of overall stress or strain, where both compression and tension of internal and boundary elements, such as springs, factor into the overall strain.

In implementation, the present embodiments describe a simulated environment (e.g., a design space) in which a mechanical part or assembly may be generated. A start location and an end location may be defined within the design space. At least one initial cell may be generated at the start location. For example, for each seed cell (e.g., initial cell), one start location and one end location may be defined by a user. Such locations may be coincident, e.g., two seed cells may start at a single point and grow towards different end/target locations. Multiple seed cells or start/end location pairings may be defined and selected in a single design space.

Locations for successive cells may be calculated by the GBD approach, the locations being 1) adjacent to at least one successive cell or the at least one initial cell, and 2) a function of parameters. The GBD approach may then entail the generation of successive cells to form a GBD structure comprising the at least one initial cell and the successive cell(s), the GBD structure extending from the start location to the end location. The GBD structure may be modified in response to at least one simulated force applied to the GBD structure. A geometry for an object may then be defined based on a geometry of the GBD structure.

Example embodiments may assist users in developing optimal designs, mechanical or otherwise. The cell-based GBD structures produced by the disclosed systems may directly represent structures to be manufactured. They may also be used to optimize shapes (e.g., by smoothing out surfaces or fitting/adjusting a smooth surface to desired shape). The GBD approach may further serve as a source for generating CNC machine tool instructions used in producing manufactured parts and assemblies using materials such as steel, plastic, sheet metal, or wood.

Example embodiments may also provide geometries for use in 3D printing applications. The latest advances in 3D printing technologies may allow material properties of the printed medium to be varied throughout the structure. This may allow the GBD structures to have stronger materials in areas that may experience higher stress. Growth-based design may be well suited to leveraging this material property-varying capability because a GBD cell growth process may incrementally improve material properties in areas that experience higher stress.

Figure 1:
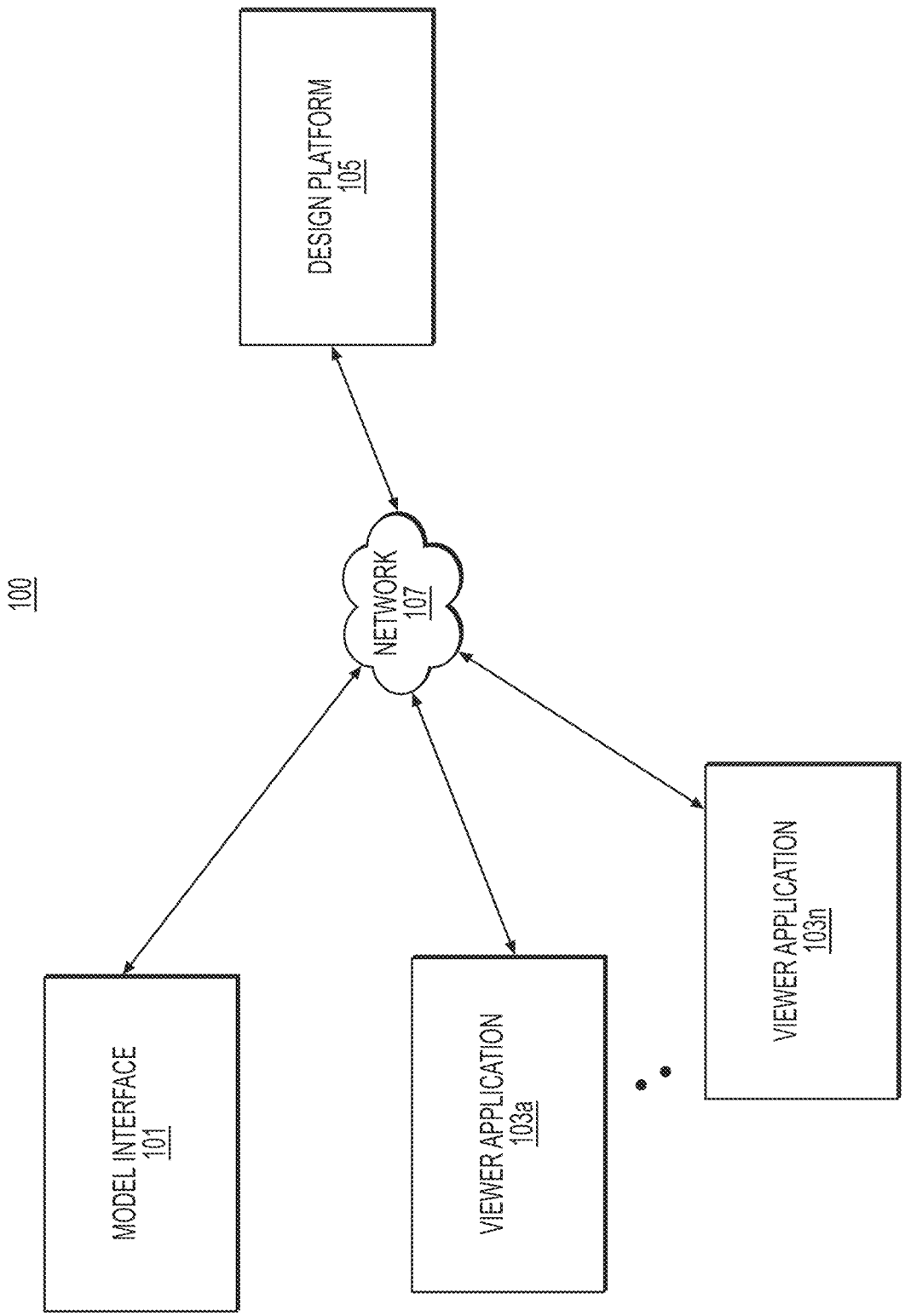
FIG. 1 is a block diagram of an exemplary growth-based design system, according to an exemplary embodiment of the present disclosure.

FIG. 1 depicts an exemplary GBD system 100, in which example embodiments may be implemented. GBD system 100 may include a model interface 101, one or more viewer applications 103a-103n ("viewer application(s) 103"), and a design platform 105. Model interface 101 and viewer application(s) 103 may be various ways to access the modeling capabilities of design platform 105. Model interface 101 may be comprised of a solid modeling or computer-aided engineering processor, e.g., CAD, that may be used to provide inputs (e.g., starting point or target location) to design platform 105. Model interface 101 may support design platform 105 as a software plug-in available on model interface 101. For example, model interface 101 may provide modeling functionalities of design platform 105 as one of multiple modeling options (e.g., solid modeling, surface modeling, wireframe modeling, etc.). In some embodiments, the model interface 101 may present a user interface where a user may input information about a part to be formed. In some cases, the user interface or prompts in the user interface may be provided by design platform 105. Viewer application(s) 103 may be interfaces that provide remote access to design platform 105.

Model interface 101 may provide access to design platform 105 analyses on a local computing device, whereas viewer application(s) 103 may access design platform 105 analyses that are performed at computing device(s) or cloud computing platforms remote from and independent of the viewer application(s). Some embodiments may include multiple model interfaces 101, e.g., where each model interface 101 may provide access to design platform 105 or include design platform 105 as a plug-in to the model interface 101. Further detail regarding model interface 101 and viewer application(s) 103 is provided in reference to FIGS. 3A and 3B. Model interface 101, viewer application(s) 103, and/or the design platform 105 may include processors (e.g., central processing units), computers, laptops, computing devices, computing platforms (e.g., cloud computing platforms), mobile devices, mobile phones, tablets, etc.

The design platform 105 may include one or more computing devices or services (e.g., cloud computing platforms). The design platform 105 may generate GBD structures for mechanical parts. An exemplary embodiment of the design platform 105 is provided below in reference to FIG. 2. The model interface 101, viewer application(s) 103, and design platform 105 may communicate via network 107. Network 107 may be comprised of a wireless network (employing, for example, wireless fidelity (WiFi) or satellite), a data network (e.g., a local area network (LAN), metropolitan area network (MAN), wide area network (WAN), the Internet, any packet-switched network, etc.), a private network, a public network, a cable network, etc. While FIG. 1 illustrates an embodiment in which model interface 101 and/or viewer application(s) 103 may communicate with design platform 105, alternative embodiments may include the model interface 101 and/or viewer application(s) 103 connecting directly to the design platform 105 (bypassing network 107), e.g., by being directly connected to design platform 105, part of design platform 105, or where at least a portion of design platform 105 may be part of model interface 101 and/or viewer application(s) 103.

GBD system 100 may also include one or more 3-D printer(s) or other manufacturing systems. For example, one or more manufacturing system(s) may be connected to network 107 and communicate with model interface 101, viewer application(s) 103, and/or design platform 105. In some embodiments, one or more of such components and/or the manufacturing systems may convert GBD structures into manufacturing instructions or specifications for the manufacturing systems. The manufacturing systems may include additive or 3D printing manufacturing systems, including, e.g., metal printing systems.

Figure 2:
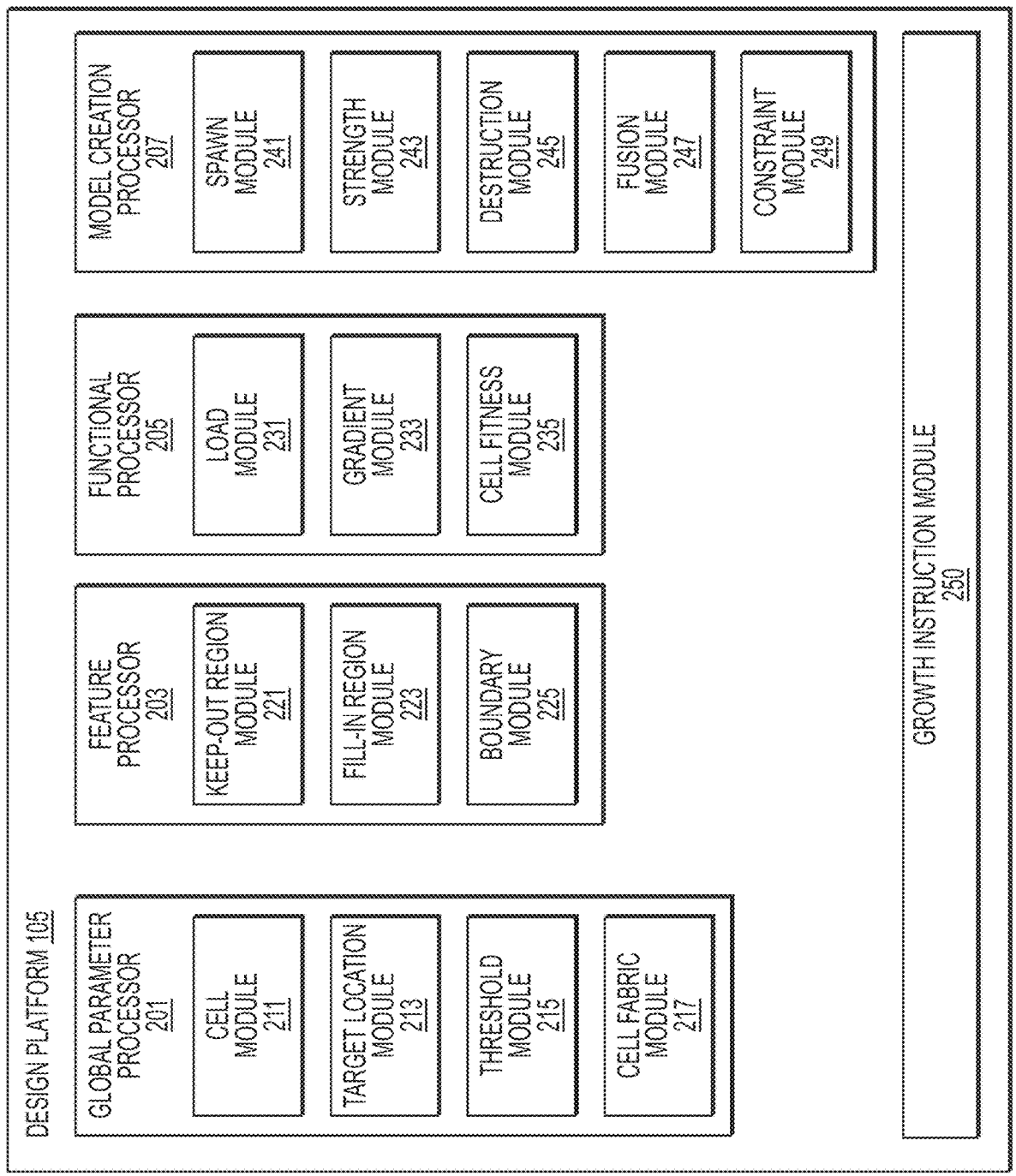
FIG. 2 is a block diagram of an exemplary design platform for generating structures using a growth-based design approach, according to an exemplary embodiment of the present disclosure.

FIG. 2 is a block diagram 200 of the design platform 105, according to one embodiment. The design platform 105 may provide a design space at a virtual workstation for generating a GBD structure. The GBD structure may comprise a model of a physical structure. The structure may be built using a cell-based approach, meaning the GBD structure may be built by an accretion of cells, either serially (e.g., cell-by-cell) or with multiple cells being generated in parallel. Each GBD structure may be made up of a plurality of cells comprising a cell population. As previously discussed, a "cell" in the context of this disclosure may refer to a mathematical and/or visual, parameterized representation of physical material properties, mechanical properties, electrical properties, thermal properties, chemical properties, or a combination thereof. Exemplary physical material properties may include elastic material properties, e.g., where a cell may be comprised of a representation of one or more physical elements, including springs, dampers, and masses, according to an exemplary embodiment. Mechanical properties may include elastic, plastic, brittle properties, etc. Electrical properties may include, e.g., conductive or insulating properties. Thermal properties may include, e.g., heat conduction, retention, or propagation properties. Chemical properties may include, e.g., reactive, corrosive, or phase change properties. Given the representation of each cell as characterized by such properties, a GBD approach may model a cell's response to different kinds of stimuli, such as heat, force, and/or chemical electrical fields, etc. The cell response may be reflected in parameter values associated with each cell. Each cell of the design platform 105 may be associated with a set of parameter values. These parameter values may dictate cell actions, e.g., spawning, fusing, destruction, etc., as will be described further below. Such cell actions combine to build a GBD structure.

A user may simply define a starting location (e.g., root cell location) and a target location, and the design platform 105 may create a GBD structure extending from the root cell to the target location. The starting location may be, e.g., a mounting surface of a GBD structure to be generated, and the target location may be, e.g., where the GBD structure must reach, as it is being created cell-by-cell. A resulting GBD structure must extend between the staring location and the target location, in a design space. A user may specify a start location for a cell as being upon a fixed surface and a target location as being on a different virtual surface, e.g., an opposite surface relative to the starting location. In some embodiments, the design platform 105 may provide a warning or prompt if a user selects a start location that is not on a fixed surface or fixed gradient in the design space. The user may thus define two points between which the GBD structure must be formed, although the ultimate form of the structure may not be known when defining the starting and target locations. In some embodiments, multiple starting and/or target points may be defined. Target and starting points may also be added at any time in the GBD process, and the target and starting points may be on flexible or movable surfaces, rather than fixed surfaces. For example, as a GBD structure is formed, target and starting points may be set on the GBD structure, rather than on fixed or mounting surfaces. Target locations may be placed on surfaces that are designated as "forced surfaces," and thus may be capable of moving as the structure grows and as cells deform and cause the GBD structure to bend.

Each GBD structure may be generated over a span of time provided in the design space. During this span of time, the design platform 105 may periodically execute processes on cells at different points in time. The processes may include processes, including cell growth, destruction, and spawning processes. Some of these processes, such as neighbor spawning, may operate within the structure of an individual cell, whereas other processes, such as "signal emitters," may operate at the level of an entire cell population of the design space.

Aside from starting location and target location, design platform 105 may provide several setup features to a user. The setup features may include global parameters, e.g., safety factor or material composition/material type. Such global parameters may dictate parameterizations for the cells of a design space. In such a way, the global parameter may be seen as a "coefficient," where the user's input on these parameters may universally affect how the GBD structure develops. The design platform 105 may select cells, a cell fabric, cell formation, and cell population growth based on the user's input regarding the global parameters. For instance, the design platform 105 may include a repository of parameterized cell representations, cell fabrics, and thresholds for cell actions (e.g., spawning, destruction, fusing, etc.). Depending on a user's selections for the global parameters, the design platform 105 may choose a cell representation, fabric, and set of thresholds. For example, a user's selection of a stiff material may entail the design platform 105 selecting stiff cells as the building block for the GBD structure. The stiffness coefficient (k) of a cell may be dictated by parameter values of springs and dampers that form the representation of the cell. The design platform 105 may also include a simulation engine, such as a finite element analysis (FEA) library, whereby one or more cell parameter values may correspond to material density, yield stresses, and stiffness factors expressed as Young's Modulus and Poisson's Ratio. Such parameter values may be passed to and used by the FEA library of the design platform 105 to form an additional physical representation of the cell. A user's selection of a flexible material may involve the design platform 105 opting for a cell with a low stiffness value, and generating a GBD structure comprised of such cells that have a low stiffness value. If a safety factor is used as a global parameter, a user's selection of a safety factor may dictate the cell representation that design platform 105 selects to form the basis of a GBD structure. A safety factor may be a margin of strength desired for a mechanical part. For example, each mechanical part needs to sustain an intended load. The safety factor may express additional strength that a user may wish to build into the design of the mechanical part, which exceeds the needed strength for the part to withstand the intended load.

The design platform 105 may further select a stored set of threshold values for cell actions, based on a user's selection of these global parameters. For instance, each cell may store a strain parameter, e.g., a value expressing a level of parameter along one or more of its boundaries. As previously discussed, a user's selection of material type may dictate that the design platform 105 select a stiff or a flexible cell as the model building block for a GBD structure. Having a stiff cell as the basis of the GBD structure may mean that cells may not experience a high degree of strain when subjected to force gradients along their boundaries (e.g., when one side of a cell feels a larger force than the other side). Thus, threshold values for generating additional cells to provide more support to the structure and reduce strain in the stiff cell design may be lower than threshold values for a GBD structure comprised of flexible cells. In these ways, a user's selection of global parameters may also drive how the design platform 105 prompts cell action.

Regarding the global parameter selection for safety factor, selection of a low safety factor may cause design platform 105 to set a high strain parameter threshold value for a cell action, e.g., cell spawning. Cell spawning may strengthen and reinforce a GBD structure. The design platform 105 may associate a low safety factor with a high strain parameter threshold value, since a low safety factor means that the user may allow the mechanical part to experience a higher degree of strain, before the GBD structure is reinforced or strengthened. A user selection of a high safety factor, however, may entail a user's desire to be conservative in building a mechanical part. In other words, the desired mechanical part would be more than capable of withstanding intended loads. In such a case, the design platform 105 may set a low strain parameter threshold value so that cell spawning takes place when the GBD structure is under even a low amount of strain. The resultant GBD structure would thus be the desired mechanical part in that it may be much stronger than needed to withstand intended loads. Through this way of using user input to inform threshold values that trigger structural changes, the GBD process may create a structure with a high safety factor.

Design platform 105 may also allow users to input initial constraints such as forces, and fixed locations. A user may also designate keep-out ("repeller"), fill-in ("attractor"), and boundary ("container") regions of a design or design space. The design platform 105 may then generate the cell population based on the user's designations. Additionally, the design platform 105 may supply various physics-based functional tests to the generated GBD structure. Users may select one or more of the tests, and the design platform 105 may apply the tests to the cell population by adjusting parameter values of the cells. Some parameter value adjustments may be in the form of gradients across values of the parameter for cells in a population.

Additionally, users may select stimuli that may be imposed on the GBD structure. The design platform 105 may then generate the GBD structure based on the stimuli. Examples of stimuli include force, heat, motion, chemical, and field effects such as magnetic, gravitational, electrostatic, and electrical effects. The GBD structure may respond to the stimuli by changing shape to form designs that sustain responses to stimuli. The design platform 105 may automate this response of the GBD structure through the use of cell parameter values. Each GBD structure may be comprised of a collection of cells (e.g., a cell population). Each cell may have a set of associated parameter values, which change in response to stimuli applied to the cells. Design platform 105 may define cell behaviors in a design space such that stimuli may cause parameters of one or more cells to change in value, and the resulting parameter values may cause the cells to respond with actions, e.g., spawn, destruct, fuse, etc. For example, the design platform 105 may prompt changes or fluctuations in parameter values of the cells in response to the stimuli, and thus prompt cell action as the parameter values meet, exceed, or fall below predetermined thresholds, which may be dictated by the global parameters. So, in some embodiments, the design platform 105 may not prompt cell actions as a direct response to cell stimuli, but rather, may prompt cell actions as a response to parameter value changes of parameter values associated with the cell representations. The design platform 105 may further prompt parameter value changes in response to stimuli modeled in a design space. In some cases, design platform 105 may include cells that may be pre-programmed to perform cell-to-cell updates of parameter values, after initial parameter value updates prompted by stimuli. The updates to parameter values may then prompt cell actions (e.g., spawning, destruction, fusion, etc.).

To illustrate, a stimuli may be comprised of a force located at one point of a cell population. Design platform 105 may detect a strain parameter for one cell of the cell population. If the strain parameter of that cell reaches or exceeds a predetermined threshold, the cell may be prompted to spawn a neighboring cell to support the original cell and help reduce the strain parameter in the original cell. If the strain parameter of that cell falls below a predetermined threshold, the cell may be destroyed, or removed, from the GBD structure as it may no longer be needed to support the GBD structure. In some embodiments, design platform 105 may apply a default set of stimuli or simulations, even if a user does not select stimuli. For example, one simulation may include a stress/strain simulation in response to gravitational forces.

In some embodiments, the design platform 105 may permit the capability to override existing model interface (e.g., CAD) settings for forces that are defined as constants, including gravity. This may be useful for a user to customize simulation settings for the GBD design space. The forces and the cell parameter responses to the forces may be shown via various indicators in the design space, e.g., with color, shading, highlighting, sound, prompts, icons, graphics, animations, etc. The design platform 105 may also offer options for users to toggle between various displays to observe different parameters or reactions of a developing GBD structure, to change different parameters or reactions, etc.

Furthermore, the design platform 105 may manage a multi-physics engine (e.g., functional processor 205 and model creation processor 207 described in further detail below) that may compute and generate cell-level reactions to the stimuli. These reactions may include changes to the positions of cells, changes in strains, stresses, temperatures, and other cell-based parameters representing responses to stimuli upon the GBD structure. As the design platform 105 implements updates to cell parameter values as immediate responses to the stimuli, the updates to those cell parameter values may also trigger changes to other cell parameters. For example, an update to a strain parameter value of a cell may further prompt a stress parameter value change. The downstream parameter value updates may take the form of parameter updates that may be influenced by relations between cells. For example, if a point load is centered at one selected cell, the design platform 105 may account for the effect of the point load on cells neighboring that selected cell. In such a case, the design platform 105 may vary the stress parameter value of the neighboring cells, in response to the increased stress parameter of the selected cell from the point load.

Design platform 105 may also permit a user to insert, into a design space, components modeled via approaches other than growth-based methods. For example, the design space provided by design platform 105 may permit a user to insert one or more solid modeled components or surface modeled components to a design space. In such a case, design platform 105 may further be configured to allow a user to initiate creation of a GBD structure on some parts of the inserted components, or dictate that the component(s) and growth-based model must mate and align. For example, one or more of a target location or a starting location may be defined on one or more inserted components. In some cases, the design platform 105 may suggest or recommend starting or target locations based on the inserted components or other components in the design space. In addition, the design platform 105 may provide a design space that can contain one or more virtual inanimate objects, such as walls, as well as static fields, such as gravity.

In summary, design platform 105 may allow a user to provide one or more initial setup selections, e.g., one or more starting and target location pairs, fill-in, keep-out, and container regions, global parameters (e.g., safety factor and/or material), simulations which may performed as a function of time, etc. Regarding the simulations, as discussed previously, since a GBD structure is created cell-by-cell, each GBD process is performed over a time progression, or span of time. Accordingly, the simulations may further include time markers within the duration of a GBD process, in which various stimuli may take place (e.g., simulation of forces, magnetic fields, wear, chemical corrosion, etc.) or where a user may wish to take a "snapshot" of the GBD structure at a particular time during the GBD process. For example, a user may define quantities (e.g., forces) as expressions which may be a function of time and position. For example, force magnitude=1000*sin(0.05*t), where t is time. This expression may define an oscillating force magnitude for a simulation which may take place in a GBD design space.

In some embodiments, the GBD process may take place once some initial user inputs are received (e.g., global parameters, starting location, target location, etc.). Design platform 105 may also include default global parameters, which may be used for the GBD process in the absence of user input, or to supplement user input. Each GBD process may be initiated with one global parameter being set, or with multiple global parameters being set. Once global parameters are defined for a GBD process, the GBD process may be initiated. At this stage, design platform 105's global parameter processor 201 and feature processor 203 may set initial parameters for a growth-based design process to take place, e.g., providing the models of cells to use for the process, the thresholds for cell actions, the underlying cell fabric, and any keep-out regions, fill-in regions, or boundaries/containers desired by the user. Setup may thus be complete and creation of the GBD structure may start. As previously discussed, the creation may take place along a given timeframe, during which design platform 105 may grow cells from seed cells in the directions of target locations to form stems (e.g., a structure of two or more cells) and thus create the GBD structure.

The design platform 105 may maintain, for each cell and/or within a cell fabric, relational cell parameters. One way to understand relational cell parameters may be morphogens, which include chemical signals which cells, in nature, use to communicate among peers. Cells may sense the presence and strength of morphogens emitted by other cells, and they may emit their own morphogens in response. In nature, morphogen concentrations may drop the further away a signal is sensed from its emitting cell. Similar to the exemplary concept of morphogens, relational cell parameters may be cell parameters that may permit interaction between cell parameter values in the cell population of a GBD structure. Each cell may maintain one or more relational cell parameters that interact with one another. These relational cell parameters will be discussed in more detail below. In some embodiments, design platform 105 may configure individual cells to emit "signals" which "diffuse" throughout the cell fabric and form gradient fields. A simple example may be a point signal whose concentration may decrease in proportion to the distance from the source location. These signals may refer to a function that may be applied to update one or more parameter values of cells neighboring the individual cell. "Attenuation" may refer to an attenuated application of the function (e.g., involving a lessened update to a parameter value), as a cell location is farther from the individual cell, given their respective positions in a cell fabric. "Diffusion" may refer to a modification of one of a cell's parameters based on the corresponding parameter values of the cell's neighbors, whereby a set of higher neighbor values may cause an increase in the cell's parameters, and a set of lower neighbor values may cause a reduction. This relationship between parameter values of neighboring cells may be conceptually analogous to how a high concentration of a chemical may diffuse across a substrate. For example, a parameter change in a first cell may extend to a parameter change in a cell sharing a cell boundary of the first cell, and cells across the cell population of a GBD structure may adjust their respective parameter values until a balance is achieved across the cell population. Such capabilities of the design platform 105 may mean that changes to GBD structures may be propagated, but also focused on specific locations or regions of the structure.

As shown in FIG. 2, the design platform 105 may include a global parameter processor 201, a feature processor 203, a functional processor 205, a model creation processor 207, and a growth instruction module 250. The global parameter processor 201 may set initial parameters for generating a growth-based model, e.g., defining cell structures and a target location for the cells to reach. The initial parameters may be based on user input, default settings of the global parameter processor 201, or a combination thereof. The feature processor 203 may define specific design parameters for a particular part that is to be modeled, e.g., keep-out regions, fill-in regions, and boundaries. The functional processor 205 may manage various functional needs of the GBD structure to be built, e.g., load-bearing capabilities, manufacturability, etc. The model creation processor 207 may define how the cells behave, given the parameters and processes provided by the global parameter processor 201, the feature processor 203, and the functional processor 205. Growth instruction module 250 may manage growth instructions provided by the interplay of the global parameter processor 201, feature processor 203, functional processor 205, and model creation processor 207. The following descriptions will describe these various processors of design platform 105. The various processors and modules shown in block diagram 200 are only one embodiment. The of the various components of block diagram 200 may be organized with any combination or distribution of functionalities and capabilities.

The global parameter processor 201 may include a cell module 211, target location module 213, threshold module 215, and cell fabric module 217. The cell module 211 may define the building block for a model generated by the growth-based design program of design platform 105. As previously discussed, a "cell" may be the most basic building block for a structure built by design platform 105. Each cell may be comprised of a representation of one or more physical material properties, mechanical properties, electrical properties, thermal properties, chemical properties, or a combination thereof. For instance, one exemplary cell may be comprised of a representation of physical elements, including springs, dampers, and masses, for example. Basic 2D cells may comprise a set of mass nodes connected by a set of boundaries and crisscrossing internal springs and dampers. In such a case, cells may be defined by their corners, e.g., the intersections of the representations of springs and dampers. Alternate approaches may include modeling cell masses at their centers, rather than at the corners of cells.

Cell module 211 may also create cells whose parameter values may fluctuate with time. The fluctuation of parameter values may simulate long-term effects of applied stimuli over the course or duration of a GBD process. In the aggregate, these accumulated and stored fluctuations in the parameter values may track the "aging" of a GBD structure through the duration of the GBD process. The "age" of a cell or GBD structure may be tracked or calculated as a function of the time at which the time is created in the GBD process, relative to the "current" time in the GBD process. For example, cell module 211 may create cells such that each cell's springs may be increased in stiffness over time or with age in order to allow the cell to resist deformation. Cell module 211 may also alter a number of springs and/or an arrangement of springs to simulate increased or decreased flexibility. This may include removing one or more of the crisscrossing internal springs and dampers. Further, cell module 211 may increase the resting length of one or more springs of a cell in order to skew the orientation of opposing boundaries. This technique may orient a cell with respect to a source of a stimuli, such as the direction of a load, light, or another cell that may provide stimuli. Parameter value fluctuations may be shown in the design space with visual indicators, e.g., color, shading, icons, text, graphics, etc. As such, the design space may also show gradients of parameter values or parameter value changes, across a GBD structure.

The cell module 211 may further provide one or more cell parameters for each cell. Cell parameter values may include at least one of a value corresponding to strain exhibited by a cell, strain exhibited by a cell, a temperature of the cell, or an age of the cell, for example. Regarding the strain parameter, cell module 211 may provide a strain parameter value for each cell by modeling the cell using a collection of springs and masses, where the springs may counteract tensile strain (compression and tension) as well as shear and torsion. The modeled mass may provide a strain value based on forces exerted at locations where the cell makes contact with external surface (e.g., fixed surfaces) as well as gravitational forces, magnetic induced forces, forces caused by interactions with gases and fluids, etc. In some embodiments, the system may utilize a finite element method (FEM) physics engine to model the behavior of cell material as opposed to modeling the behavior as a set of idealized springs, masses, and dampers.

Cell module 211 may also support various representations or physical models for cells. For example, cell module 211 may model a cell as a rigid or plastic deformable structure, rather than as an elastic structure with damping. As another example, cell module 211 may select a large cell size for the creation of a large mechanical part and a small cell size for the creation of a small mechanical part. Alternately, if the large mechanical part may undergo a wide range of local stresses, cell module 211 may still select a small cell size to permit more granularity in the creation of the GBD structure for constructing the large mechanical part. Cell module 211 may also vary cell size, for example, adapting cell size in the vicinity of fine-grained features or gradients.

For instance, depending on a material that a user may select for creating a GBD structure, cell module 211 may create different representations of cells. A selection of a flexible or soft material (e.g., aluminum) may cause cell module 211 to create cells representing springs with low stiffness, whereas selection of a strong such as stainless steel 174 material may entail cells comprised of springs of high stiffness.

Cell module 211 may also create representations for connections used to attach cells to one another. Such representations may include small attachment springs, or constraint models that allow for detachment, or tearing, once a certain force threshold is attained. For example, if a user selects a brittle material, cell module 211 may dictate weak attachment springs between cells, while a selection of a flexible material may prompt cell module 211 to set up a design space with cells that have large attachment springs. As additional or alternative embodiments, cell module 211 may set up cells as sharing one or more surfaces or corners (e.g., faces in a polygonal cell embodiment). For example, corner(s) of cells may be shared with adjacent cells. Thus, tearing may occur when component structures of a cell's representation (e.g., springs, in some embodiments) exceed their respective strain/deformation threshold limits. When such limits have been reached or exceeded, cell module 211 may prompt a representation of the cell reflecting the cell going into plastic deformation or tearing.

As previously described, a cell may comprise a set of nodes, some of which may be shared by neighboring cells. Further, cell module 211 may generate the nodes as having masses and velocities. These node masses and velocities may vary from node to node and may vary over time. In such an embodiment, the cell created by or selected by cell module 211 may move in a non-uniform manner, as its nodes may move independently. In general, cell module 211 may create cells, such that a cell may move within a physical space or cell fabric.

The target location module 213 may receive or dictate a target location within a design space. In some embodiments, design platform 105 may provide a workstation or user interface that comprises a design space. The user interface may be accessed or provided on model interface 101 or viewer application(s) 103, as described in FIG. 1. A user may input specifications, e.g., one or more target locations via the user interface. A target location may be a point or region within the design space that may present a destination for the cells to "grow" towards. As previously described, a GBD structure for a mechanical part may be comprised of the cells that populate a space between a first, "base cell," and a target location.

The threshold module 215 may define one or more threshold values for one or more parameters, e.g., cell boundary strain value, cell boundary location, heat tolerance, etc. Each cell may store values for each of these parameters maintained by threshold module 215. A comparison of the cell's parameter value between the threshold parameter stored by the threshold module 215 may dictate cell spawning, destruction, fusion, strengthening, etc. Accordingly, these thresholds drive the development and automated growth of a GBD structure.

Thresholds may also be comprised of functions, based on a series of cell parameter values or thresholds. As an example, in the process for selecting cells for removal from a GBD structure, a lower threshold may be defined as a multiplier*percentage*max yield stress. To then determine the set of cells to remove, the design platform 105 may sort the cells by least stress and filter out the ones that have a stress that is not below the minimum threshold, e.g., a threshold of 0.2*33%*max yield stress. The remaining cells may be removed from the GBD structure. Threshold values may be set for other parameters, e.g., strain, temperature, etc.

Further, threshold module 215 may define thresholds with respect to user input. For example, a user setting a high safety factor may cause threshold module 215 to set a low strain threshold for triggering cell growth, meaning cells may be spawned when design platform 105 detects that a strain parameter value of an existing cell exceeds the low strain threshold set by threshold module 215. This may be because having a high safety factor entails wanting a robust structure, more than able to sustain forces. A low safety factor setting, however, may cause threshold module 215 to set a high strain threshold value for the growth of a GBD structure. In this case, the threshold setting is set on the premise that a low safety factor means the user may allow the GBD structure to tolerate stress and possibly fail. Thus, rather than quickly strengthening the GBD structure with reinforcing structure from cell spawning, the threshold module 215 may recognize that the structure does not need to be as strong, and thus set may a high threshold value for triggering cell spawning.

The cell fabric module 217 may dictate how cells are arranged. The cell fabric may impose an ordered structure upon a population of cells. In particular, cell fabric module 217 may generate or define a grid formation by which a cell and its neighboring cells may be logically organized. This grid formation may be the cell fabric in a given design space. Cell fabrics may be square grids, hexagonal, triangular, or may follow any grid pattern represented by the node locations in space on regular polyhedrons, such as the dodecahedron. Cell fabrics may also follow irregular patterns such as a Penrose tiling formation. Cell fabrics may also follow patterns that support locally subdivided regions, where a cell grid may be sub-divided into N sub-grids that occupy it, and where some of these sub-grids are further subdivided.

Cell fabric module 217 may define a 2D or 3D cell fabric, and the cell fabric may fluctuate or change in response to a time parameter. The cells associated with a cell fabric need not be physically connected, but they may be logically related. In some embodiments, cell nodes in the fabric may be logically ordered into an x-y-z grid. The cell fabric may act as an abstract scaffolding in the sense that it can be deformed, but cell fabric module 217 may construct cell fabrics that may not allow an irregular pattern of cells to form. For example, if cells defined by cell module 211 are rectangular representations of springs and dampers, cell fabric module 217 may permit or fit only rectangular cells, rather than non-rectangular cells.

Cell fabric module 217 may define and provide nodes, which may occupy any physical position in space. Each node may have an identifier (ID) that identifies it relative to the other nodes using x-y-z notation. When the design platform 105 (e.g., the cell fabric module 217) creates a new node relative to existing nodes, the new node may receive an ID that logically places it relative to the IDs of the neighboring nodes. For example, if a new node were to be created to the right (positive x direction) of an existing node, the new node might get an ID comprised of an x, y, and z portion, whereby the x portion is 1 greater than the x portion of its immediate neighbor to the left in the x direction. FIG. 10A depicts a representative cell fabric 1005. The x, y, and z portions of a node's ID may be referred to as the location of a node in cell fabric space. This cell fabric location describing a node's location relative to other nodes in a cell fabric may be may be constant over time, whereas the physical position of a node may change as it moves around in a design space, e.g., in response to stress or strain over time, which may flex the forming GBD structure. The logical organization of cells in a fabric may remain constant, even though cells may physically move relative to one another. One purpose of a cell fabric may be to provide an un-deformed representation of cells in space, invariant over time.

Design platform 105 may generate cells such that they reside in the cell fabric. Cell fabric module 217 may generate an ID for each cell belonging to a cell fabric. The ID may be comprised of an x, y, and z index portion that corresponds to the cell's location in the fabric grid. In some embodiments, cells may not necessarily occupy slots in the fabric, but cell fabric module 217 may still provide a cell fabric in which each slot of the cell fabric may maintain or store one or more parameter values that reflect parameters associated with respective cells. Depending on the parameter values relative to thresholds defined and stored by the threshold module 215, design platform 105 may prompt cells to change position along the cell fabric, multiply, or be removed. Such changes to the cells and cell fabric may change the geometry of a GBD structure.

A cell fabric may provide an underlying structure that organizes a growing and shrinking cell population. Cell fabric module 217 may define a cell fabric as a deformable 3D grid that positions cells relative to one another as a GBD structure forms. As a GBD structure develops, a cell fabric may prevent pleats, which may be regions where sequences of cells reverse direction in space. A cell fabric may also facilitate filling of gaps in a cell population, because the cell fabric system may allow the design platform 105 to determine if a cell has any immediate neighbors simply by comparing the x, y, z indices of one cell's nodes to those of neighboring cell nodes, rather than comparing the positions of the nodes in a physical space. For example, if a comparison of indices indicated a gap of several cells wide, new cells may be created to fill the gap. Noting positions of nodes in a physical space may not as easily show where gaps may be available for cell spawning.

In some embodiments, cell fabric module 217 may define a cell fabric which supports a finite number of cells within a region (such as a gap), rather than an ambiguous number, in the case where cells can overlap. The fabric structure may then facilitate determination of whether new cells can fuse with cells on the other side of a gap in the cell fabric, or on the other side of a boundary. An example of a cell fabric is provided at FIGS. 10A and 10B. A cell fabric may maintain a map of nodes, keyed by their x, y, and z indices (e.g., at 10A). A map of nodes may allow the design platform 105 to quickly determine if a node is occupying an indexed location within the fabric, regardless as to the node's location in space. In order to facilitate the lookup of nodes in the cell fabric, the design platform 105 may maintain a hash map for getting a node based on an x, y, and z key value in the cell fabric.

Another advantage of a cell fabric is that the coordinate system provided by a cell fabric may quickly show whether cells should or can be joined (e.g., "fused"). Even though cells may move in a physical space, cells may be selected for fusion due to their proximity or due to being direct neighbors in the cell fabric. Without an underlying cell fabric, it would be harder for the design platform 105 to determine when to fuse cells together as neighbors, since it may be unclear which cells are neighbors. For example, cells may have moved sufficiently close together in space due to bending of the structure, but may not actually be neighboring cells. Without a cell fabric, a system may decide to fuse the cells even though such cells may not occupy the same row or column of the cell fabric. If fusing were done based on physical cell proximity rather than location within the fabric or if cells were fused from different rows or columns of a cell fabric, the integrity of the fabric structure and entire GBD structure could be violated. The cell fabric created by cell fabric module 217 may ensure that fusion of cells may take place along a regular grid and may maintain a logical ordering of cells of a GBD structure.

The feature processor 203 may include a keep-out region module 221, a fill-in region module 223, and a boundary module 225. The feature processor 203 may allow a user to input keep-out regions, fill-in regions, or "container"/boundary regions. The feature processor 203 may then grow, kill, or prevent cell growth depending on the user's inputs. Design platform 105 may provide visual indicators for features or elements (e.g., keep-out regions, fill-in regions, boundary regions, etc.) in a design space, e.g., highlighting the geometry of features, selecting a gradient highlight for geometry associated with features, providing arrows or vectors indicating forces acting on a structure, color-coding for seed cells/start and end points, etc.

Keep-out regions may be areas within the design space where cells are not allowed to spawn new cells, or adhere to structures. For example, a keep-out region may be defined where an aperture may be needed on the final GBD structure, e.g., to mount the final structure to a wall or to fit the structure to an assembly, etc. The feature processor 203 may prompt or allow users to define one or more keep-out regions in a design space, and keep-out region module 221 may monitor boundaries of each of the keep-out region(s) and cell populations surrounding those boundaries. Keep-out region module 221 may allow for the definition of multiple keep-out regions. A keep-out region may be specified as a 2D or 3D shape, such as a circle or box, at a specified location. The design space provided by design platform 105 may provide a means of indicating the time at which a keep-out region should be activated, such that cells may be allowed to grow and exist within the region prior to this time, and then be destroyed after this time.

For example, user may dictate or "activate" a keep-out region at time=0, or after a cell population has had a chance to develop its initial structure. For keep-out regions set at time=0, keep-out region module 221 may prevent cells from being created within the boundaries of the keep-out region during the GBD build process. In the event that a user dictates a keep-out region after a cell population has begun to form, e.g., time=>0, keep-out region module 221 may monitor the boundaries of the keep-out regions, remove cells in the user-designated keep-out regions, and prevent cells from being created within their boundaries. In some embodiments, keep-out region may have a deactivation time set by a user. For such cases, keep-out region module may remove the boundary of the keep-out region after a period of time so that cells may exist within the region.

Fill-in region module 223 may be used to fill-in regions where a keep-out region is removed. Fill-in regions (also referred to as attractor regions) may be regions in a design space or GBD structure where structure (e.g., a cell population) may be desired. Such regions may also be set by user input and/or design parameters maintained by design platform 105. For example, a user may specify an area in a design space where structure is desired. Meanwhile, the fill-in region module 223 may also internally maintain, for a GBD structure, where structure may be needed to provide an optimal design, for manufacturing purposes, usability, aesthetics, etc.

Fill-in region module 223 may prompt filling of an area of a GBD structure with a specified 2D or 3D shape, such as a circle, rectangle, box, sphere, or square. For example, fill-in region module 223 may be used to ensure that a structure of a GBD structure fills out an easily manufacture-able shape. For example, fill-in region module 223 may maintain manufacturing constraints dictating that the region around the end of a supporting bracket may need to adhere to a simple circular shape in order to be easily cut out by a machine-controlled punch. The placement and activation of a fill-in region may be specified by a growth instruction, discussed further below in regards to growth instruction module 250. The inputs to the growth instruction may comprise a location of a cell or node, a shape specification, such as a square or circle, and one or more configuration parameters to determine the size of the shape.

When a fill-in region is active, fill-in region module 223 may detect cells located within the region, and may prompt cells to spawn from (e.g., populate the regions surrounding) the detected cells, even if strain or other thresholds for spawning have not been met. In some embodiments, the fill-in region module 223 may limit the number of new cells that are spawned within a fill-in region in a given cycle so as to ensure that growth is not too rapid. Rapid growth may cause a spike in the amount of new potential energy entering the structure of the GBD structure, due to e.g., a large number of new cells whose initial spring lengths may not be the same as their natural resting lengths.

Boundary module 225 may set a boundary or a "container" for the GBD structure. The boundary module 225 may store a "container" comprising a perimeter or 3D shape provided by a user. The boundary module 225 may then ensure that the GBD structure does not extend outside the boundaries of the container. In some embodiments, boundary module 225 may perform this function by fixing nodes of cells on the boundary of the container once the node locations are found to reach the boundary surface. Alternately or in addition, the boundary module 225 may prevent or override any cell growth past the boundary of the container.

The design platform 105 may use cell relational parameters to execute keep-out, fill-in, or boundary regions. For example, cell relational parameters may include a directional parameter that may dictate one cell to spawn from a first cell, in the direction provided by the cell relational parameter of the first cell. The design platform 105 may provide the spawned cell with the same directional relational parameter as the first cell. Over time, a cell population may then grow in the direction, due to their shared directional relational parameter. Analogously, "keep-out", "fill-in", and "bounded"/container regions may be created using relational parameters, in which the parameter value of one cell may also prompt a reaction of another cell. For example, the design platform 105 may detect that a first cell is in a keep-out region and thus prompt a decrease in a cell fitness parameter value of the first cell, past a predetermined threshold value. This decrease in the fitness parameter may cause the first cell to be killed/removed. In some embodiments, the cell fitness parameter may be a relational parameter, meaning, the decrease in the first cell's fitness parameter value may prompt a cell neighboring the first cell to also undergo a fitness parameter value decrease. Design platform 105 may generate cells and cell fabrics such that, like diffusion of chemicals through a substrate, the effect of a relational parameter change may spread and may decrease (or "diffuse") as cells are farther from the initial cell which underwent a relational value change. Design platform 105 may also dictate the extent to which parameter value change may be attenuated, depending on the cell type, cell fabric type, and stimuli.

The functional processor 205 may include a load module 231, gradient module 233, and cell fitness module 235. The load module 231 may manage the possible loads that may be applied and simulated in a design space of the design platform 105. The gradient module 233 may apply changes to parameter values of cells, in response to the loads applied by the load module 231. Cell fitness module 235 may monitor the current state of each cell, depending on the parameter values of the cells. Combined with the threshold values stored by threshold module 215, the parameter updates implemented by the functional processor 205 may prompt the model creation processor 207 to activate cell spawning, strengthening, destruction, fusion, etc.

The load module 231 may apply point loads to the nodes of cells. These point loads may be varied in magnitude and direction over time (e.g., in a simulation). The load module 231 may apply a collection of point loads to a collection of nodes to simulate a boundary force on a cell structure. The load module 231 may also define "repulsive" or "attractive" forces at specified locations. In one instance, a "repulsive force" may include an area around a keep-out region. An "attractive force" may include an area neighboring a fill-in region. These forces may affect nodes by applying forces to them that are proportional to the distance of each node to the source location of the force, and directed from the node towards or away from the source location.

In some embodiments, load module 231 may provide finite element analysis (FEA) simulation tools, which may enable testing multiple load cases on a GBD structure. For example, a user or the design platform 105 may determine that a bracket should be subjected to an upwards force, and, in another case, a downward force. Without multiple load cases, if a user added these forces together, the net effect would be zero.

However, multiple load cases may not address the real-world behavior of parts. In real-world environments, parts transition from one load case to another over time. Parts may not simply undergo isolated load cases. This means that if a design calls for an upward and downward force, design platform 105 may model that scenario as not just two isolated load cases, but the following: a) an impulse that changes from up to down abruptly, b) a low frequency oscillation, c) a vibration that might generate fatigue, and/or d) a randomized collection of changes. In the real world, forces may behave like waves in the ocean, which may build up to create a "perfect storm," causing unexpected outcomes. Example embodiments may enable parts to be grown to handle these perfect storm cases, because parts are able to become stronger over time as they experience these dynamic transitional forces.

Because a cell population may react to changes at each iteration step or cycle (whereby a step represents one "tick" forward in time) (e.g., with design platform 105 updating parameters of each cell after each step or subset of steps and potentially prompting cell action), load module 231 may update forces for each particle mass associated with each cell, at each iteration. This may allow design platform 105 to provide real-time behavior simulation whereby cells in the design space continually adapt to changing forces in the design space. For example, when a collection of growing cells forms a stem, the weight of the cells may cause the stem to bend, thus causing strain to build up and cells to spawn in order to grow stronger and resist the bending.

At each time step, the load module 231 may update forces on particles as a result of solving for the positions, velocities, and/or accelerations in a multi-physics engine. For example, design platform 105 may compute forces within a cell population, e.g., restoring forces between cells (e.g., from spring representations of each cell), and also compute damping (e.g., from damper representations of each cell) in order to remove or transfer energy from a GBD structure that is being generated. Load module 231 may also update external forces on cells with each iteration. Load module 231 may define external forces applied to cells as expressions that are a function of time, position, and/or neighboring cell state. Thus, a force need not have a fixed direction and magnitude over time and position during the simulation. The ability for forces to change continuously may be referred to as "dynamic transitional forces."

One example of dynamic transitional forces are gravity forces. The load module 231 may define gravity waves to be expressions that incorporate time and position as in the following:

"gravity":["0.4*cos(0.4*t)","(t<1000)"-5.0:-0.5","-0.4*sin(0.4*t)"]    Gravity force:

Here, the magnitude of gravity in each of 3 directions may be defined as a function of time. Gravity in the y direction may be a step function that decreases after a certain amount of time has passed. Gravity in the x and z directions may be a periodic oscillating function of time. These gravity forces may serve to subject cells to constant undulating forces that combine with other user-defined forces. It is possible that the additive effects of forces on a cell may combine in important ways, similar to the way waves may add up to create a "perfect storm" effect where a rogue wave forms due to unexpected combinations of forces.

The following are examples of how load module 231 may simulate application of dynamic transitional forces to cells by external objects:

"magnitude:"(floor(t/150)%2==0)?80:-80"    Periodic Impulse Force:

Here, the force may be defined to abruptly change in magnitude from +80 to -80 every 15 time steps. It may be defined to apply in a "pushing" or "pulling" manner to a surface such as the inner surface of a bearing:

"magnitude":"1200.0","direction":["0.0","-1.0*cos(0.04*t)","1.0*sin(0.04*t)"]    Oscillating Force:

Here, the magnitude may be fixed, but the direction of the force may change as a function of time. This force may also be applied to a surface as in the previous example.

"magnitude":"(abs(x)+abs(z))*10.0"    Static Position Varying Force:

Here, the force may be a function of the position of a cell and its particles in space. If this force is applied to a table top surface centered at the origin (X=0) (Y=0) then the force may grow stronger at the edges of the table.

Force expressions of the load module 231 may be as complex as desired, and may be defined for both magnitude and direction at the same time. load module 231 may also simultaneously apply multiple forces to a cell. At each time step, when a cell is subjected to forces, load module 231 may determine the magnitude and direction of each force given the time and the position of the cell. The load module 231 may apply the unique values of force and magnitude to each of the cell's components (e.g., representations of spring(s), damper(s) corner(s), node(s), etc.). These forces may also be calculated at different levels of granularity where the position of each particle is taken into consideration, rather than just the position of the cell. Forces may also be defined as expressions that take other state variables into consideration. For example, an expression may define the force as a function of a cell or particle's velocity, which is a vector, similar to a particle's or cell's position. This may give the force a damping behavior on a cell's motion.

The load module 231 may use dynamic forces as a way of simulating multiple use case and the transitions from one to the other. For example, for a defined vertical force on a shaft (i.e., cylindrical surface), the load module 231 may make the components of the direction of the force vary as a function of time in order to replicate an oscillation or impulse. This will cause the GBD structure to grow in a unique way to support multiple forces and their transitions over time rather than just static directions and/or magnitudes. In another embodiment, the load module 231 may simulate vibrations that test the modal frequencies of a GBD structure's shape and material characteristics. For example, load module 231 may simulate high frequency responses to vibrations or other forces that interact with resonant frequencies of the part.

Alternatively or in addition to using transitional force analyses, the design platform 105 may test or perform simulations on a developing GBD structure using finite element methods (FEM). For example, design platform 105 may send independent load cases to an embedded FEM module or evaluate independent load cases via a module which may be part of design platform 105 (e.g., functional processor 205). Each load may be solved for independently and results may be returned showing independent stress results. Based on the results of the FEM analysis and/or the dynamic transitional force analysis, the design platform 105 may prompt changes to cell parameter values to account for one or more independent forces.

The load module 231 may support at least one internally defined material and one objective function. For example, the load module 231 may map user-specified forces to compatible forces stored by the design platform 105, and trigger cell growth and death based on user-specified minimum and maximum strain thresholds that are either specified by the user, or preset or determined by the design platform 105 (e.g., by the threshold module 215). In some embodiments, the load module 231 may implement a FEM engine to run in parallel with a fast real time physics engine. This may enable users to additionally define both material properties in terms of Young's Modulus, Poisson's ratio, and compressive and tensile yield strengths, along with objective functions such as safety factor as a multiple of maximum observed Von Mises Stress, maximum allowed strain energy or maximum allowed displacements.

One unique property of the design platform 105 is its capability of repairing and reconstructing a GBD structure. For instance, if a user exerts a damaging load on a model, e.g., by virtually grabbing a portion of a GBD structure in an attractor gradient and pulling it until it partially tears, the design platform 105 may repair the tear and remove the unnecessary remaining excess cells that may be in the repaired region. In other words, the design platform 105 may automatically connect fixed regions to forced regions and automate repair of a GBD structure. Objects produced by old fashioned topology optimization tools cannot generally self-repair in this fashion. An extension of this capability of the design platform 105, is its ability to respond to such damage by varying cell composition throughout a GBD structure. For example, if a user specifies locally different cell properties in regions where cells would not trigger growth, design platform 105 may generate a GBD structure with locally bendy or elastic regions that blend into rigid regions. The design platform 105 may perform this operation based on the idea that certain areas, especially keep-out areas, may be where other features of an assembly are inserted. Thus, the design platform 105 may respond by creating more elastic regions at these connection points with other assembly parts. This type of feature may be especially useful for creating designs for plastic and rubber parts, such as flexible hinges.

In some embodiments, load module 231 may run simulations by breaking a GBD structure into discrete pieces, testing the pieces, and aggregating the test results of the pieces to render an analysis for a GBD structure. Such an analysis method may be more accurate than analyzing an entire GBD structure as one integral structure.

The gradient module 233 may manage relationships between cells and their parameter values. For example, a parameter value change in one cell may trigger parameter value changes in its neighboring cells. The gradient module 233 implements such downstream parameter value changes among neighboring cells. At least two categories of parameter values updates may occur in such chain reactions: (1) parameter value updates in the same type of parameter, and (2) parameter value updates for varying parameter types. One example of the first category of parameter value updates, may include gradient module 233 detecting a strain parameter value increase in a first cell, and prompting a strain parameter value increase for a cell neighboring the first cell. Both parameter value updates were for the same type of parameter: strain. The second type of parameter value update may include gradient module 233 prompting parameter updates for different parameter value types, e.g., a strain parameter value change prompting a change to a stress parameter value. Exemplary scenarios of this category of parameter value update may include the gradient module 233 prompting a change to a strain parameter value, in response to receiving a stress parameter value update, either within a single cell, or between cells. Depending on the location on the stress, gradient module 233 may further prompt an increase or decrease to a shear stress parameter value or tensile stress parameter value in response to the strain parameter change, for a single cell or a plurality of cells. In such ways, gradient module 233 may manage a tiered system of parameters for each cell and load type. In other words, the gradient module 233 may store a multi-layered chain reaction of parameter value (e.g., relational parameter value) updates that may be triggered when one parameter is updated.

The gradient module 233 may further account for relationships between cells in triggering the cascade of parameter value updates. For example, gradient module 233 may initiate a series of parameter value updates to cells neighboring a cell responding to stimuli. Since cells may be interconnected, gradient module 233 may implement the series of parameter value updates at cells directly neighboring the responsive cell (e.g., cells sharing a boundary with the responsive cell), whereas cells spaced farther from the responsive cell (defined by the cell fabric) may experience less change to their parameter values. For directly neighboring cells, gradient module 233 may implement a series of parameter value updates that most closely resemble those of the initial responsive cell, while far away cells may experience fewer or more attenuated changes to their parameter values.

In some embodiments, the gradient module 233 may define "signal sources" within a GBD structure or design space to carve out unique geometries. Signal sources may perform local changes by performing parameter updates at specific locations or regions of a GBD structure. Examples of signal sources may include a location in space, a concentration function, a direction function, and/or a signal signature. The concentration function may be comprised of an update the gradient module 233 makes to a cell parameter value, based on a function of the values of that parameter for the cell's neighboring cells. In one example, a concentration function of gradient module 233 may receive the location of a node in space and may return a parameter value proportional to the inverse of the square of the distance between the node and the signal location. In the same example, a direction function a gradient module 233 may receive, as input, the location of a node in space and return a normalized vector from the signal location to the node location. In some embodiments, this direction function may have a signal signature, e.g., "A."

Alternatively or in addition, the signal signature may denote the cells that have parameters that may have undergone a change due to a signal source, e.g., the previously-described direction function. For example, in some embodiments, cells that have parameters that have changed due to the direction function, may be tagged with a signal signature, "A." The signal signature "A" may then prompt other cell parameter updates, for example, in cells neighboring the cells tagged or "emitting" the signature "A."

Several signal sources may be combined to define gradient fields in space. For example, two signal sources (e.g., cells or user-designated points in a GBD structure) might both emit signatures of "A." If a cell were to measure the signals from sources emitting signal "A," it would find a maximum combined concentration along the line joining the two sources. As previously discussed, a "concentration" may be comprised of a parameter value update expressed as a function. As such, a maximum combined concentration along a line may entail a chain reaction of parameter value updates, starting from the line where the concentration is highest. In some embodiments, the parameter value updates may trigger cell actions (e.g., spawning). For example, a cell may be spawned at the line, due to the parameter changes prompted by the gradient module 233. In such cases, spawning may be at the highest density or highest rate closest to the line where the concentration is highest, and spawning may lessen or slow when farther from the line. The design platform 105 may use multiple signal sources of the same signature to define complex shaped areas.

The design platform 105 may implement a progression of state changes (from cell actions) that simulate aging of the cell population of a GBD structure over time. Each state change may be called a "frame." In some embodiments, each GBD structure may undergo various tests to simulate the design's response to the various stimuli. When the forces on a cell change from one frame to the next, the change may cause the cell (and all others in the system) to respond by stretching or twisting (strain) relative to its prior stretched or twisted state. This strain may cause one or more of the parameters to increase in value by an amount proportional to the strain (or change in strain) multiplied by a "reaction rate" coefficient. Reaction rate may denote a factor by which one parameter is affected by a stimuli. For example, a force stimuli change that prompts a large change in a strain parameter value may entail a high reaction rate, whereas a force change that prompts a small strain change may be associated with a low reaction rate. In some cases, these reaction rates may be based on the material type or composition modeled by the GBD design.

At each time step of a simulation, gradient module 233 may monitor the parameter values of groups of cells, across cell fabric slots. Simulations of force, position, and/or velocity may be applied to each of the cells' representations of masses and springs. At each time step, the gradient module 233 may update each cell's parameter values and those of neighboring cells. Since an update to a neighboring cell may prompt a downstream update to additional cells bordering that neighboring cell, gradient module 233 may create a cascade of parameter value updates. Gradient module 233 may create cell population responses to stimuli such that the farther a cell is from a location of a load or stimulus, the less drastic its parameter value update may be. This may comprise an attenuated effect, e.g., where the farther a cell is from another cell that is undergoing a parameter value change, the less the parameter value change will be felt in the farther cell than in a nearer cell. Gradient module 233 may also create a cell population which may undergo an effect of neighboring cells changing parameter values, e.g., when a cell has a higher or lower value of a parameter relative to its neighbors' value of the parameter. In such cases, if parameter values for neighboring cells are higher than the parameter value for a given cell, the parameter value of the given cell may increase (e.g., to correspond to the values of the neighboring cell parameter values). If the cell's neighbors have lower parameter values than the cell, the cell's parameter value may also decrease in proportion to the difference. This effect may be similar, conceptually, to diffusion, for example, where imbalances in concentrations of a chemical may even out throughout a substrate.

In some embodiments, the gradient module 233 may also store parameter values as being associated with locations or slots in a cell fabric, so that as cells are formed, they may assume the most recent parameter values.

The cell fitness module 235 may monitor the properties of each cell. As previously mentioned, each cell may be comprised of a representation of springs, dampers, and masses. Cell fitness module 235 may thus measure properties of each structural element of each cell, including, but not limited to, measuring the average stresses and/or strains experienced by a weighted combination of the cell's springs. Cell fitness module 235 may also average the stresses and strains. These measurements may furthermore be averaged over time to filter out rapid fluctuations in values. Cell fitness module 235 may keep track of the age of each cell tracking a time parameter during a simulation, relative to the timing of a cell's formation. In some embodiments, cell fitness module 235 may monitor the age of the cell and prompt destruction of the cell when it reaches a threshold age. Other thresholds may also trigger the cell fitness module 235 to engage the model creation processor 207. For example, the cell fitness module 235 may track a cell's boundary strain parameter value and prompt model creation processor 207 to spawn a new cell adjacent to a boundary of the cell when the parameter value exceeds a predetermined threshold.

Design platform 105 may compute a collection of strain or strain parameter values for each cell. The parameter values may indicate the amount of distress that the cell is experiencing. For example, design platform 105 may compute the internal strain of a cell as a measure of the percentage of stretch relative to the resting length of internal diagonal springs, e.g., of two internal diagonal springs. When cells become sheared or twisted, the internal springs may stretch and compress—in some instances, one stretches and the other compresses. The design platform 105 may measure the absolute value of each percentage of stretch and may add these values together. The absolute value means that stretching and compression both add to form a non-canceling composite value for strain. This measure may be referred to as i_strain.

In further embodiments, cell fitness module 235 may track parameter values in the form of cell state changes and may accumulate this data over time. This accumulated data may indicate the test events and responses that a cell experienced in the course of formation of the GBD structure. The cell fitness module 235 may use this accumulated knowledge to make decisions such as when to spawn neighboring cells or when to terminate. No other system such as topology optimization enables elements to acquire knowledge derived from events over time and use this information to affect behavior.

Cell fitness module 235 may maintain a unique parameter which tracks a cell's response to simulations including, for example, changes in pressure, velocity, and/or acceleration. This parameter may be referred to as a fitness parameter, and each cell's fitness parameter value may increase or decrease over the course of a growth-based design process. The fitness parameter tracks a cell's actions through time and iterations of the simulations. The fitness parameter may also be used by the cell fitness module 235 to monitor cell fitness levels across a population. Cell fitness module 235 may define the cell fitness parameter such that, if one cell's fitness parameter value is high, its surrounding cells may also experience an increase in their respective cell fitness parameter values. The cell fabric may store respective fitness values for various locations within the cell fabric. Fitness module 235 may further dictate a system in which cell fitness parameter values decrease over time.

In execution, for example, a cell fitness parameter value of a given cell may spike from infrequent surges in strain across an entire GBD structure. However, because this increase may be infrequent, gradual reduction of the cell fitness parameter value may maintain the cell's fitness parameter value below the threshold value that would trigger the cell to spawn a neighbor, or to be removed from excess fatigue.

On the other hand, a high frequency vibration could stimulate a cell with frequently occurring strain distortions, and this stimulus may cause the cell fitness parameter value of the cell to increase faster than the diffusion rate reduction set by the cell fitness module 253, as the cell fitness parameter value of that cell begins to be shared with its surrounding cells. As a result, the spawning of a neighbor to the cell may be prompted to help relieve the strain, or alternatively, the cell fitness parameter value increase may prompt destruction of the cell if the parameter value crosses a threshold value indicating that the cell is too fatigued to stand up to the high frequency vibration.

In some aspects, cell fitness module 235 may dictate that a selected cell's fitness parameter value prompt an heightened rate of increase to fitness parameter values of cells neighboring the selected cell, e.g., the increase of fitness parameter values may "diffuse" across a cell population. The higher the increase to the selected cell's fitness parameter, the more cells of the cell population may experience an increase of fitness parameter values. Cells nearest to the selected cell may experience the most fitness parameter value change, while the fitness parameter value change in neighboring cells may be lower when moving away from the selected cell. For the other cells, the increase to the selected cell's fitness parameter may increase their respective fitness parameter value, or another parameter value. Cell fitness module 235 may permit cell-to-cell communication and accumulation of state over time to enable cells to act autonomously. For example, cells may maintain a collection of state variables X, Y, Z. The variables maintained by cell 1 may be different from the variables in cell 2.

In some cases, cell fitness module 235 may prompt a cell to change state or properties, in response to its combination of parameter values. For example, in addition to prompting spawning or destruction of neighboring cells, cell fitness module 235 may prompt a cell to change mechanical properties, including its stiffness or damping characteristics.

In some embodiments, the functional processor 205 may provide simulations of various stimuli or loads that a cell/cell population may be under. A strain value may be calculated for each cell, at each iteration of the simulation, and the design platform 105 (e.g., the model creation processor 207) may use the strain values to determine if a cell is overstrained or under-strained. The cell module 211 may create cells that automatically spawn neighboring cells when their strain parameter values exceed a predetermined threshold value (e.g., as dictated from the threshold module 215). The spawning of neighboring cells may increase the structural integrity of the GBD structure. Design platform 105 may also automatically remove cells based on cell strain values, e.g., by removing the least-strained cells of a GBD structure. Removing these low-strain cells may make the GBD structure more efficient, without harming its structural integrity. The steps of spawning or removing cells may be performed by the model creation processor 207, as described in detail below.

The global parameter processor 201, feature processor 203, and functional processor 205 may all provide conditions for cell actions. The model creation processor 207 may perform the cell actions. The model creation processor 207 may include a spawn module 241, a strength module 243, a destruction module 245, a fusion module 247, and a constraint module 249, according to an exemplary embodiment. The initial phase of building a GBD structure may be called stem growth. During stem growth, each seed cell may be added to form a stem. Forming the stem may be one of the first operations of a model creation processor 207.

A stem may be comprised of a group of connected cells that serve to span two regions of a GBD structure. These spans may be a collection of cells where at least one cell touches a fixed surface, and at least one cell touches a forced surface. A forced surface may include a surface selected by a user, where a user may also indicate that a force may be applied to cells that touch the selected surface. Exemplary forces may include linear, pressure, or rotational forces. For a linear force, for example, a user may specify a vector direction and a magnitude as constants and/or expressions (e.g., functions of position and time). The force may be applied evenly to the entire selected surface, and any cells that touch the surface may be affected by a subset of the force, e.g., based on an area of the cell face touching the force as a percentage of the area of the entire selected surface. For pressure forces, for instance, the force at each point of a surface may include a normal vector to the surface at that point. Rotational forces may be modeled like the pressure forces (e.g., as vectors), but the direction of the force may be tangent to the surface. In some cases, the direction of this tangent direction may be the cross product of the normal vector at the surface and an axis. To illustrate, for cylinders, rotational forces in some embodiments may be analogous to a twisting of the cylinder, e.g., a the force needed to unscrew a jar lid or a nut on a bolt.

The purpose of stem growth may be to establish connectivity of vital regions of the part that form the skeleton, or basic structure. Additionally, a span may be comprised of a collection of cells that connect two fill-in regions (e.g., attractor zones). Initially, each stem may start from a single seed cell and a location in 3D space designated as the target. The model creation processor 207 may continue to then develop the GBD structure, spawning one or more cells in directions that reduce the distance of the cells within the stem (or group of stems) to the target. Stem growth may be complete once all the stem(s) (or groups of stems) have reached their targets.

During stem growth, the model creation processor 207 may create or kill cells based on stress or strain. The model creation processor 207 may generate the stem, while taking into account a simulation comprising body forces on the developing stem, such as gravity. The force may be applied in the form of stimuli within the design space, and model creation processor 207 may trigger growth in areas of high strain, in response to this stimuli. Growth in such areas may permit the growing stem to resist bending from the applied force. In the aggregate, such model building may enable creation of a design that may resist bending. The stem growth phase may be analogous to when a plant sends a shoot out looking to grow towards the sun.

During stem growth, the model creation processor 207 may cause new cells to be spawned, and the model creation processor 207 may detect, of the new cells, cells that are located inside a fill-in (or "attractor") zone. Upon the next frame update when cells may be selected for killing or spawning, these detected cells in the fill-in regions may automatically be selected for spawning. New cells may be spawned relative to each selected cell, in any direction where the cell has an exposed exterior face, as long as the new cells also fall within a fill-in/attractor region. These new cells may also be noted by the model creation processor 207. Once a selected cell has spawned a new neighbor, it may be removed from selection. In some embodiments, the model creation processor 207 may limit the number of cells that are spawned in each frame into attractor zones in order to control the rate of "filling in" of the attractor zones. In some embodiments, model creation processor 207 may delay any cell destruction/removal until after certain fill-in regions are filled in with cells. This delayed-onset cell destruction may allow the GBD structure to first take shape, before it is tested with stimuli.

During all phases of growth, if a prospective cell is deemed to fall within a keep-out, or "repeller" region, then model creation processor 207 may ensure that that new cell is not spawned. Additionally, if a cell is deemed to fall outside the bounds of a boundary, or "container" zone, then it is also not spawned.

As the GBD structure is created, it may significantly deform in reaction to the applied forces. The model creation processor 207 may determine if cells fall within keep-out, fill-in, and boundary zones by comparing their undeformed positions relative to the zone boundaries. Alternatively, the model creation processor 207 may compare the deformed positions relative to the zone boundaries. As one default, model creation processor 207 may build GBD structures by ensuring that cell locations in the undeformed state adhere to the restrictions of the zone boundaries. In another default mode, the model creation processor 207 may build GBD structures by ensuring that cell locations in both the deformed and undeformed states adhere to the restrictions of the zone boundaries.

Once the rate of cell growth and killing begins to taper off, the model creation processor 207 may detect that the GBD structure had entered a mature phase of growth. The model creation processor 207 may decrease the growth rate parameter at this stage to slow further changes to the design structure. When the growth rate parameter is set to 0, the model creation processor 207 may stop spawning and killing cells altogether. In some embodiments, the design platform 105 may provide a user interface comparing and tracking the number of cells spawned versus those killed. This interface may provide a user with an indication of the maturity or completion level of the GBD structure. The completion level may change if additional stimuli are introduced to the GBD structure and design space.

In some cases, cells spawned during the stem growth phase may not exist at the arrival of the mature growth phase. As new cells are spawned, model creation processor 207 may remove cells created during the stem growth phase. A stem's visual appearance may have the effect of splitting into multiple structures, with some of these structures dissolving away, while other structures may have the effect of "walking" along a fixed or forced surface. This walking effect may be caused by cells repeatedly being killed on one side of a stem while being spawned on the opposite side of the stem.

Example embodiments provide an design space where a 3D cell population spawns new cells and destroys existing cells in a real-time simulation. At each iteration of the simulation, strain may be calculated for each cell, and the model creation processor 207 may use the strain values to determine if a cell is over-strained or under strained. Cells that are over-strained may benefit from the spawning of neighboring cells to provide more structural integrity, while cells that are under-strained may be destroyed without harming the structure. In order to calculate the strain on cells, the model creation processor 207 may associate a cell with a collection of springs and masses where the springs may counteract tensile strain (compression and tension) as well as shear and torsion. The masses may also experience forces exerted at locations where the cell makes contact with external surfaces, as well as gravitational forces, magnetic induced forces, or forces caused by interaction with gases and fluids or other elements. The following paragraphs detail how one embodiment of a model creation processor 207 comprising a spawn module 241, a strength module 243, a destruction module 245, a fusion module 247, and a constraint module 249 may generate a growth-based model.

The model creation processor 207 may use one or more cell parameters in determining whether a cell should be killed or if it should trigger cell spawning in the cell's immediate neighborhood. For example, if a cell is less than a certain age, it may be spared from killing. The user may assign one or more material properties to regions of cells within the cell population. Material properties may include elasticity and maximum yield stresses. When updating the stimuli (e.g., forces) and propagating the effects throughout the GBD structure, the design platform 105 may use an FEA module to analyze the geometry defined by the cells or the faired cells, and pass the material properties to the FEA module. The FEA module may return results in the form of stress or displacement parameter change to a cell. Each cell may maintain parameters to represent the "reaction"/"diffusion"/"sink" behavior of changes to stress and displacement over time. For example, there may be a parameter that represents a moving average of the stress. This stress may be localized by reducing the "diffusion coefficient." The "reaction"/"diffusion"/"sink" behavior and "diffusion coefficient" will be discussed in more detail.

Spawn module 241 may create new neighboring cells along boundaries of an existing cell. If compression or stretch parameter values for the boundary of a cell meet a preset threshold (e.g., provided by threshold module 215), spawn module 241 may prompt spawning of a neighboring cell along that boundary. This spawning may counteract deformation of the existing cell, since two cells sharing a boundary may provide two boundary springs between corner nodes. The two boundary springs may permit the structure of the two cells to resist compression and stretching better than if only one cell occupied the boundary. Spawn module 241 and threshold module 215 may dictate one or more conditions for spawning. For example, one condition for spawning a new cell may include detecting that a boundary not already have a neighbor, and that the boundary spring be experiencing compression or tension strain in excess of a specified threshold.

Spawn module 241 may attach a spawned cell to an existing neighbor by causing the spawned cell to share one or two boundary nodes with the existing neighbor. This boundary point attachment approach may reduce tearing between cells. To support cell tearing (e.g., if a selected material has a low shear modulus), spawn module 241 may provide an attachment constraint which may be used to bind non-shared nodes of two cells and provide a threshold for separating. Once the threshold is met, the coincident nodes may be released, allowing the cells to move apart.

When new cells are spawned next to a fixed structure, spawn module 241 may attach at least one node of the new cell to the structure, along one or more boundaries. A cell may have a point force attached to it via one or more of its nodes, and a cell may be subjected to one or more force fields such as gravity. For spawning cells into a cell fabric, spawn module 241 may constrain the cells to attach to their immediate neighbors, and fill up the scaffolding of the cell fabric, e.g., by eliminating gaps in a coordinate system of a cell fabric. Cell fabrics may present a known number of "slots" available between any two cells in a certain direction. By comparing the IDs of two cells in a cell fabric, spawn module 241 may determine the number of cell "slots" that separate the cells in one or more dimensions. In a 2-dimensional rectangular fabric, slots may be analogous to rows and columns. Another type of cell fabric may form a rectangular grid wrapped onto a cylinder. In other embodiments, cell fabrics may form geodesic domes, and/or may exhibit hexagonal or other patterns. The spawn module 241 may detect gaps or slots available for populating with cells, regardless of the cell fabric type.

Similarly for 3D cell fabrics, spawn module 241 may spawn a new cell in the x or y direction along a cell fabric, by determining whether the new cell should be fused to any pre-existing cells. For 3D volume-filling structures, a cell fabric may be volumetric and may have three dimensions. The integer offsets among the x, y, and z portions of cell IDs may provides a quick way for the spawn module 241 to determine the number of slots separating cells, without having to compare the physical locations of cells in space. In some embodiments, a cell fabric may support sets of interconnected cubes or space filling tetrahedrons. In another embodiment, cells may be allowed to connect to form non-uniform grids with branching cell fabrics.

In some cases, the spawning of cells may cause cells to deform in ways where the structure of the cell is permanently damaged, and the structural support from more spawning cannot repair the cell. For example, the parameterized representation of a cell may cause a cell to become inverted, similar to how the plastic bumper on a car may become popped in. The boundary stress from such an inversion may cause the cell to trigger cell spawning around it, whereby the spawned cells will also be inverted inside out. This behavior may cause runaway growth of cells in a region. The spawn module 241 may detect this kind of growth and may prevent the runaway spawning of cells. In some embodiments, the spawn module 241 may detect a cell as "malignant," e.g., if it has massive deformation or is inverted. Spawn module 241 may define massive deformation as a cell strain parameter value being above a certain threshold, or by the inversion of cell corners that indicates that a corner of a cell has been pushed deep into the interior of the cell such that it cannot return to its normal shape. Spawn module 241 may then prompt for the cell to be removed or killed, e.g., by destruction module 245. This cell may be spawned again once more cells have been created and the GBD structure may be in a shape where no cells are massively deformed.

In some embodiments, spawn module 241 may modify the cell parameters of successive cells based on value(s) corresponding to the cell parameters of neighboring cells.

New cells adjacent to the successive cells may be generated as a function of the cell parameters of the successive cells following the modification. A successive cell may be adjacent to the face of an existing cell. As previously discussed, successive cells may progress from a given start location to locations that form a shortest route from the cells in the GBD structure to a given end location. Design space stimuli that may affect the progression may include at least one of a growth rate (e.g., a rate of cell spawning), a gravity force, an applied force (e.g., a force applied to a surface adjacent to the GBD structure), a magnetic force, a friction force, heat, or a pressure force. Forces may be applied to a GBD structure in a linear, rotational, at an angle, or normal manner, and forces may be applied as reactions to contacts between a GBD structure and components of an assembly within the design space. Forces may also be applied relative to surfaces. For example, applying a pressure force inside a surface may cause the GBD structure to "carve out" areas along the force.

In some embodiments, various conditions may define a surface of an assembly within a design space, the surface applying a simulated stimulus to cells adjacent to the surface. The conditions may define a volume requiring occupation by the GBD structure (e.g., a fill-in region or zone), or may define a volume prohibiting occupation by the GBD structure (e.g., a keep-out region or zone). The conditions may 1) define a volume, 2) enable growth of the GBD structure within the volume, and 3) prohibit growth of the GBD structure outside of the volume following occupation of the GBD structure within the volume. Such conditions may be set by a user. Exemplary conditions may include one or more of a maximum thickness of the GBD structure, a minimum thickness of the GBD structure, and a growth direction.

A violation of the conditions may be detected, the violation including at least one of 1) a failure of the GBD structure to occupy a required volume, 2) an occupation of a prohibited volume, and 3) failure to connect a start location and/or an end location via the GBD structure. Modifying the GBD structure may include modifying the GBD structure to correct the violation. Modifying the GBD structure may include the spawn module 241 adding further successive cells to the GBD structure, the location of the further successive cells being determined based on the design space parameters and the at least one force. Modifying the GBD structure may include removing a subset of the successive cells from the GBD structure, the subset being determined based on the conditions and the at least one force.

Further, locations for the successive cells may be calculated. To do so, an existing cell of the GBD structure may be selected, and a growth direction from the existing cell to an end location may be defined. A set of locations for potential new cells adjacent to the existing cell may be determined, and one of the set of locations may be selected based on at least one of: 1) a relative deviation from the growth direction, and/or 2) strain exhibited by a face of the existing cell.

Each of the successive cells and the at least one initial cell may define a respective volume within the simulated design space. The geometry for the object may correspond to the respective volume of each of the successive cells and the at least one initial cell. Defining the geometry for GBD structure may include generating a modified geometry of the GBD structure, the modified geometry having a plurality of additional slant faces at the surface of the modified geometry.

Completion of the GBD structure may be determined based on 1) an indication that at least one expression involving the conditions evaluate to true, and 2) an indication that the modification of the GBD structure has decreased below a threshold. Defining the geometry for the GBD structure may occur in response to the determined completion.

An immediate strain parameter and a strain concentration parameter may be determined for each cell of the GBD structure, the immediate strain parameter indicating a degree of simulated strain at the cell. The strain parameter value for each cell may be modified based on the corresponding immediate strain parameter and strain parameter values of neighboring cells. The degree of simulated strain at the cell may be determined based on an effect on the cell, the effect being related to the simulated stimulus. At least one of a strain, a stress, and a displacement may be simulated in reaction to the simulated stimulus.

New cells adjacent to the successive cells may be selectively spawned as a function of the cell parameters of the successive cells following the modification. Cells may be selectively terminated based on a measure of at least one simulated relational parameter at cells of the GBD structure. Cells adjacent to the successive cells may be selectively terminated as a function of the cell parameters of the successive cells following the modification.

As an exemplary default mode, spawn module 241 may create newly spawned cells as having spring resting lengths that match those of the existing stretched neighboring springs. In such cases, the strength module 243 may employ a process to gradually, over-time, restore the resting lengths of these cell springs to some preset default values. Alternatively, the strength module 243 may initially alter the spring constant, thus making a spring initially more flexible, and then over time, modify this constant in order to make the spring stiffer. In some embodiments, strength module 243 may recognize a correlation between a cell's spring strengths (e.g., its spring constants) and the masses of the nodes of the cell, in order to account for the extra "cost" associated with carrying heavier duty springs. The strength module 243 may also generate cell structures and relationships between cell structures, such that the masses of the cell's nodes may increase proportionately with an increase of the strength of a cell's springs. This may be because an added level of strength may come with a bulkier material, in a physical world. Alternatively, the strength module 243 may or a user may modify the material of the cell, substituting, for example, a material such as wood, aluminum, or plastic with that of steel. In some cases, mass of a cell may be not be directly related to its strength. The design platform 105 may use cell strengthening as opposed to cell spawning as a means of preventing a cell structure from bending excessively.

In addition to strengthening cells, the strength module 243 may apply conditions that may prompt the cell strengthening parameter values to change as described above. In some embodiments, the strength module 243 may initiate a strengthening phase for the design process when the strength module 241 detects that all stems have reached their targets. For this phase, the strength module 243 may apply forces associated with attractor zones and designated force surfaces to cells that either are inside these attractor zones or are touching these force surfaces. The strength module 243 may gradually increase the applied forces over a number of frames using a control parameter that may ensure that the stress and/or strain-based growth may be given time to increase the strength of the cell structure and to resist bending due to these forces.

The destruction module 245 may remove, or "destroy", cells from a GBD structure. The destruction module 245 may maintain one or more parameters that may prompt cell destruction. One such parameter may include location. For example, the destruction module 245 may detect cells as being located in (or within a specified distance from) a keep-out region and may remove these detected cells. Another parameter may include cell age. For example, the destruction module 245 may select cells for destruction by age order, from oldest first to youngest last. In such a case of destroying oldest cells of a population, the cell destruction for a growth-based model may commence from the center or core of the structure of the growth-based model and may gradually work towards the outer surface of the GBD structure. This pattern may be consistent with the growth pattern that created the GBD structure, whereby cells may have grown along a central axis or curve, and then out towards the perimeter of the cell population. In such a case, destruction module 245 may maintain a policy whereby the first cells generated are first candidates for termination.

Yet another parameter may include symmetry constraints. For example, a symmetry factor may be applied to a GBD structure once a cellular structure has reached a certain cell age (e.g., based on elapsed time and time of cell creation) and/or a level of mature growth. In such a case, the destruction module 245 may remove cells (and the spawn module 241 may insert cells) based on symmetry planes.

The destruction module 245 may also remove cells based on certain cell parameter values or cell fitness criteria. One such criterion is low strain or low value in a strain chemical parameter, whereby a cell having a low strain parameter value may indicate that the cell is not contributing to the ability of the GBD structure to sustain loads or impacts. In many cases, cells created early in the design process may no longer be needed to support the structure. Because the overall cell population may have changed, cells that may have formed at the core of a "stem" structure early on may end up with little or no strain, as younger cells on the outside of the stem take up the shifting loads. To optimize the GBD structure (e.g., for weight minimization or to reduce the amount of material needed to make the part), destruction module 245 may destroy older or cells, cells with strain parameter values that fall under a preset threshold value, and/or some percentage of the cells with the lowest strain parameter values.

As cells die, neighboring cells may experience increased average loads per cell. This may cause the design platform 105 to enter a phase whereby cells are both destroyed and spawned simultaneously in order to reach equilibrium. The design platform 105 may activate these cell-terminating processes at different points in time in the same way it activates and configures loads, mounting structures, and/or cell-signaling sources, at different points in time. When the destruction module 245 removes a cell, it may check to see if there are neighboring cells using the cell's nodes. When destruction module 245 detects that no other cells are using a corner node of a cell that is to be destroyed, it may destroy the corner node when the cell is destroyed.

The fusion module 247 may attach cell structures to one another. This may be called "fusing." Once a cell has fused, new cells may not be created along the fused boundary because the boundary may be occupied by neighbors or constraints, such as a wall. The fusion module 247 may fuse cells by attaching one or more of a cell's nodes to the nodes of another cell via constraints, e.g., of the cell fabric. Alternately or in addition, the fusion module may fuse cells by causing cells to share nodes. In such a case, the fusion module 247 may detect nodes in a cell fabric already used by existing cells, before creating new nodes for a new cell. If the fusion module 247 finds nodes already used by the neighboring cells, it may use these nodes as end points for the springs in the new cell. Fusion module 247 may prompt cell fusion when cells from separate stems are near one another. In doing so, fusion module 237 may "stitch" various stems together to form an integral GBD structure.

Fusion module 247 may also evaluate the possible success of a fusion instance, and may prompt cell fusion only if the fusion will not damage the GBD structure. For example, sometimes during stem growth, multiple stems may grow towards the same target location. One of these stems may reach a target first and may cause the stem to deform. When a second stem gets close, a cell may be spawned to "fuse" the cells of the second stem to the cells of the first stem. In some embodiments, fusion module 247 may detect instances where the spawned connecting cell would be massively deformed due to the different level of bending of each stem. (Picture two stems growing towards each other and bending such that when the connecting cell is spawned, it may be stretched many times its resting size.) In such a case, fusion module 247 may defer spawning the connecting cell and may use temporary "tractor forces" (e.g., selected or defined pulling forces) to "pull" or "draw" the two stems together sufficiently that the new connecting cell may be added without creating a cell that is initially massively deformed. The fusion module 247 may automatically prompt the tractor forces to join two stems when it detects the distance between two stems falling under a predefined threshold (e.g., stored in the threshold module 215 and/or determined based on user inputs). The tractor forces may also be initiated by a user, and the fusion module 247 may then performing the cell fusion on the GBD structure.

As another example, the design platform 105 may decide not to create a fusing cell that bridges the gap between two long stems that are extensively bent. To illustrate, when two base cells have spawned long shoots, there may be significant bending that causes the cells at the ends to have moved significantly far from their unbent positions. In this case, the fusing process may create a new cell whose nodes on the first boundary are far from the nodes on the second boundary, sometimes at a distance of several times the size of an unbent cell. However, fusion module 247 may also opt to not fuse cells in this instance if the resulting cell would infuse too much stretched spring energy into the GBD structure. This assessment may be based on a comparison of a prospective spring energy, to a spring energy threshold maintained by the threshold module 215. The design platform 105 may instead apply a temporary restoring force between the base cells at the ends of each shoot to help restore the positions of the shoot ends to their unbent positions. After several cycles, when the cells have moved into closer alignment, the fusion module 247 may create the fusing cell. When base cells fuse, they may generate an event that allows the system to trigger other actions in the main loop. For example, the fusion module 247 may apply a point load to a cell when a set of base cells has fused.

The fusion module 247 may reference a cell fabric. One advantage of a cell fabric is that the coordinate system provided by a cell fabric may quickly show whether cells should or can be joined due to their proximity of being direct neighbors in the cell fabric, even though they may have moved around arbitrarily in space due to bending of the cell structure. Without an underlying cell fabric, it may be more difficult to determine when to fuse cells together as neighbors, and still maintain a regular grid of organized cells. For example, cells may have moved sufficiently enough close together in space due to bending of the structure, for the design platform 105 to fuse the cells. At the same time, such cells may not occupy the same row or column of the cell fabric. If fusing were done based on physical cell proximity rather than by location within the fabric, the integrity of the rectangular fabric structure could be violated if cells were fused from different rows or columns of the cell fabric.

Fusing may be accomplished by having two cells share some of the same nodes. For example, if fusion module 247 designated new nodes to use for a prospective new cell, such as 35-112-0 and 35-113-0 (x, y, z index notation), and these nodes were already being used by another cell, then the new cell could be made to share the nodes—thus fusing it to the neighboring cell. If no pre-existing cell were using these nodes, fusion module 247 may create new nodes and assign them to the new cell. This way, the design platform 105 may automatically "stitch up" gaps in a cell fabric by creating new cells and attaching them to neighboring cells, by way of using the common nodes. The cell fabric may facilitate determination of whether a new cell has potential neighbors based on the fabric positions of the cell nodes.

The constraint module 249 may define one or more constraints in generating a GBD structure. One type of constraint may be comprised of adhesions. For example, cells may be attached to fixed structures such as walls via cell adhesions. In such an embodiment, the constraint module 249 may model the attachment to the fixed structure by setting the positions of some of a cell's nodes to "fixed" in the physics engine, so the node positions do not change, regardless of the simulations and forces applied to the design. For moving structures, the constraint module 249 may set the velocities of a cell's affected nodes, to correspond with the velocity of the adhered-to object. For example, cells may be attached to other cells via cell adhesions. One type of cell adhesion involves two cells sharing one or more boundary nodes. When cells pull apart against a common boundary node, the constraint module 249 may prevent tearing, or it may allow the cells to split apart by creating a new node, and reattaching springs from one cell to the new node. If cells are organized according into a cell fabric, the constraint module 249 may also enable cell tearing by allowing a cell in a chain to be destroyed. This effectively allows the cells on each side of the chain to move independently.

Another type of constraint may be a symmetry constraint. In some embodiments, the constraint module 249 may apply a symmetry constraint to a growing structure during all phases of growth. For example, the constraint module 249 may ensure that the model creation processor 207 spawns and kills cells while abiding by mirror and/or rotational symmetry planes. Mirror symmetry may comprises a plane and a point on that plane. When a cell is spawned and it lies within a threshold distance to the point on the mirror plane, constraint module 249 may prompt spawning of a "symmetry cell." To accomplish this, the constraint module 249 may evaluate the original cell and direction that were used to spawn the new cell, and find the corresponding mirror cell on the other side of the symmetry plane and the mirrored direction of the original direction. If this mirrored direction is not precisely aligned with one of the mirror cell's face directions, then the constraint module 249 may select the closest face direction for spawning the new cell. Additionally, if there is no existing cell corresponding to the mirror cell, constraint module 249 may create a set of bridge cells in order to designate a suitable mirror cell. If there is no cell nearby to spawn from and establish the mirror cell, then the mirroring operation for the original cell may be abandoned. This approach may allow for symmetry to be maintained in regions that are close to symmetrical, but in other regions where symmetry may not be possible to maintain, it may be abandoned.

Figure 32:
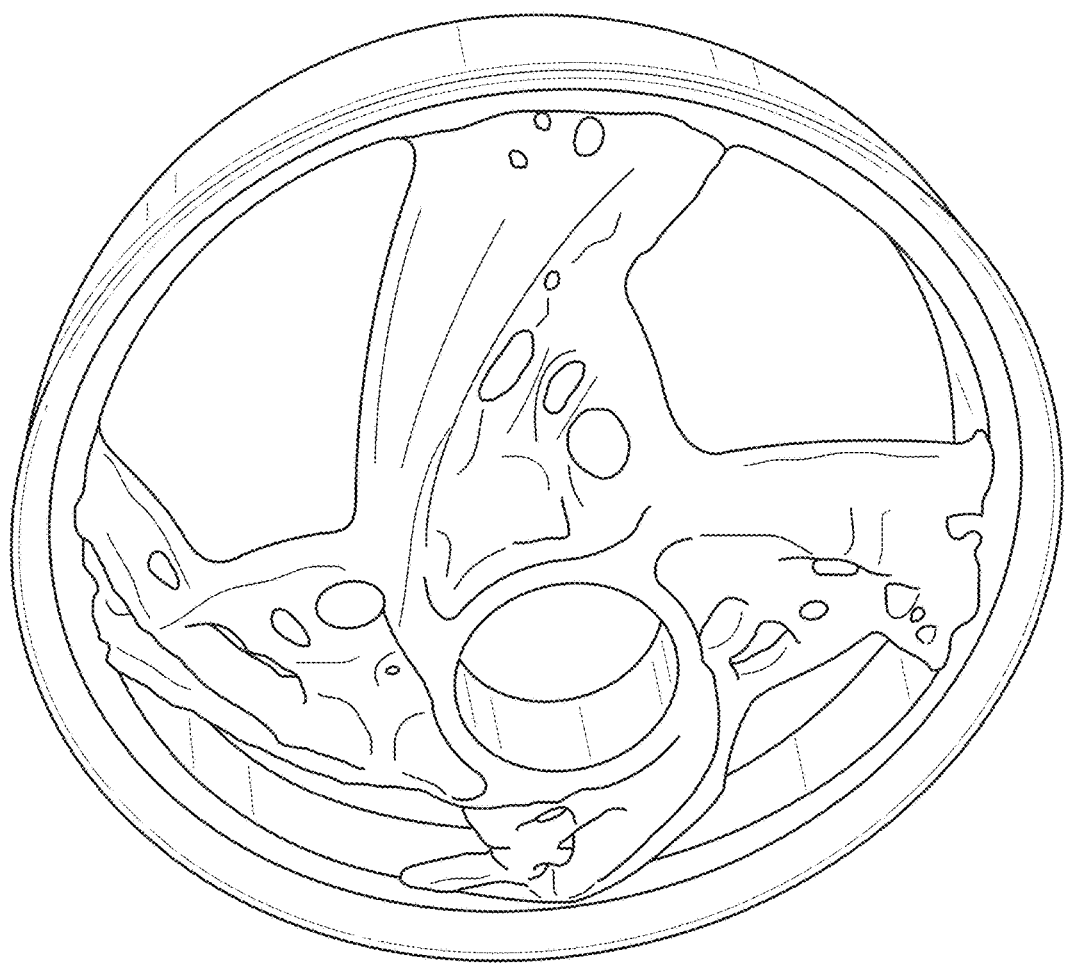
FIG. 32 illustrates an exemplary wheel part, where rotational symmetry may have been defined about an axle axis.

Rotational symmetry may be like mirror symmetry except that rotational symmetry may additionally define an axis lying in the plane and passing through the point. Rotational symmetry may also define a rotation angle, such as 90 degrees. Constraint module 249 may internally define additional planes relative to the primary plane, where each additional plane is rotated about the axis by the rotation angle relative to the prior plane. These planes may then be used to ensure that when a cell is added and falls within the threshold distance to the symmetry point, that symmetry cells are spawned about each of the rotational planes. Thus, for example, if a cell were spawned on a wheel part where rotational symmetry had been defined about an axle axis (e.g., as shown by FIG. 32), constraint module 249 may prompt spawning of 3 additional cells in each of the other three quadrants, assuming 90-degree rotational symmetry. In the same manner that symmetry cells may be spawned relative to symmetry planes, constraint module 249 may prompt removal of cells relative to symmetry planes as well.

When a seed cell is defined, a user may associate it with a combination of fill-in/"attractor" zones, fixed and forced surfaces, or points, in order to define the start and target locations. In the case where the user specifies attractor zones or surfaces, the design platform 105 may auto-generate the start and target locations by evaluating the specified zones (volumes) or surfaces, and picking points that either minimize the distance between the start and target locations, or fall on the centers of surfaces of attractors or surfaces associated with fixtures and forces. The design platform 105 may also reference the symmetry planes defined by constraint module 249 to pick start and end locations that may fall on the symmetry planes. This step may ensure that, as stems grow, they may not start off wildly out of sync with the placement of symmetry planes.

The growth instruction module 250 may provide various "growth instructions," comprising externally supplied inputs prompting the automatic creation of a GBD structure. Each growth instruction may comprise a set of conditions used to determine when to start execution of the growth instruction instance. For example, the growth instruction module 250 and global parameter processor 201 may define conditions that prompt cell actions from the model creation processor 207. Based upon conditions, growth instruction instances may be triggered to execute at multiple and/or different times. For example, one growth instruction instance may place a wall in the design space at time=0. Another growth instruction instance may add a force to a cell node when two base stems have fused together. Another growth instruction instance may place a keep-out region after a certain amount of time has passed. A set of growth instructions defines the recipe for a particular growth process.

One type of growth instruction may be a force whose components of magnitude and direction (e.g., a vector) may be defined as expressions that take frame time and position into consideration. For example, the direction of a force may be defined to have a component in the Y direction that is $1000.0*\sin(0.01*t)$, where t is the frame time. Furthermore, this growth instruction may define a surface such that any cell touching the surface will feel the force if it is "pushing" against the surface, based upon an evaluation of the expression at each cell's location and current frame time. In this example, when the force direction may be evaluated at different times, the force direction may oscillate from having elements of positive to negative Y direction. If the force surface were a cylinder with a horizontal axis, this may cause the set of cells feeling the force to vary from a collection of cells touching the bottom of the cylinder surface to a collection of cells at the top of the cylinder surface. As such, a growth instruction of the growth instruction module 250 may have expressions that may be evaluated at each time frame in order to update the region of impact.

In some embodiments, a user may create a growth instruction document that defines a growth process, and may supply this composition as an input to the design platform 105 prior to execution of a growth-based design process. At any point in the editing of growth instructions, the GBD process may be tested by applying the growth instructions into the design space, and triggering the propagation of time to see the effects of the growth instructions as they execute and operate on the design space (e.g., fixed surfaces or components inserted into the design space). The GBD process may also be tested by applying the growth instructions and observing the effects of the growth instructions on processes (e.g., cell spawning) that operate within the design space. A user may stop the time propagation, edit the growth instructions, and/or repeat the growth simulation. The growth instruction module 250 may also allow users to define their own growth instruction actions. For example, the growth instruction module 250 may supply a core set of growth instruction actions that may place cells, define structures, such as walls, define forces, and define keep-out regions. The growth instruction module 250 may thus allow a user to create a new growth instruction action that removes a clump of cells in a circular shape, at a specified location. The growth instruction action may be implemented and stored in a location accessible to the design platform 105.

As described above, the input parameters for growth instructions may include references to entities in a design space. This may include the IDs of entities. For example, a growth instruction might accept the ID of a cell as a location to remove a clump of cells. The design platform 105 may assign IDs to entities (e.g., cells and/or GBD structure(s)) in the design space that are derived from the IDs of the growth instruction instances that create the entities respectively. If a growth instruction creates multiple entities, then these entities may each be given an ID comprised of the growth instruction's ID plus a serial number that denotes each time the growth instruction instance creates a new entity (e.g., a new GBD structure). In some embodiments, the serial number may increment each time the growth instruction creates a new entity. In this way, the growth instruction's impact or influence in development on the GBD structure may be tracked and monitored.

It may be beneficial for the entities in a design space to incorporate the IDs of the growth instruction instances that created them, in cases where the design platform 105 may rebuild the contents of the design space. For example, the first time the design platform 105 executes a set of growth instructions, a user may stop the process and edit one of the instructions to include a reference to an entity in the design space. The growth instruction referencing this entity may obtain the in-memory representation of the entity with that ID, and use it. However, the next time the design platform 105 executes the same set of growth instructions, the entities may have different IDs. If the IDs are different, the growth instruction in question may get a different entity than it did in a first round, and this may cause the growth instruction to fail. One way to address this issue is to have a growth instruction that creates an entity assign an ID to the new entity that reflects both the ID of the growth instruction, and a serial number corresponding to the count of entities created by that instruction. With this approach, the design platform 105 may re-execute a set of growth instructions, and the entity IDs passed as inputs may likely correspond to the same entities as in previous executions. This method of assigning IDs to design space entities that are derived from the creator's IDs may be referred to as ID invariance. Users may also define their own libraries of entities that reside in the design space, by implementing classes that extend the existing entities, such as cells.

Growth instruction module 250 may further provide a component library with an API that allows users to build programs that execute their own growth scripts. The design platform 105 may produce a graphical 3D representation of the GBD structure, including a view of the growth instructions, and the design space containing the grown structures and supporting artifacts.

In addition to storing the growth instructions defining a particular growth process in a document, the growth instruction module 250 may store the contents of a design space in their final state in a document as well, possibly the same document. The combined document comprising the persisted form of growth instructions along with the design space contents produced by the growth process may be referred to as a model. This model may also comprise the value of the time variable indicating the amount of time that executed during the growth process.

The design platform 105 may open a model and read the growth instructions to produce an in-memory representation of growth instruction instances. In addition, the design platform 105 may read the persisted design space, and may recreate the in-memory representation of the design space as it was at the end of the growth process. A user of the design platform 105 may be able to immediately view the contents of the design space without having to re-execute the growth process from scratch. The design platform 105 may also provide a user interface for creating new models and editing them. Editing tasks may comprise adding new growth instructions to the model, configuring their inputs, and defining the order of instructions. In addition to providing an editing interface for growth instructions, the design platform 105 may provide commands for starting the execution of the growth process at a certain time, stopping the growth process after some amount of time has passed, and reversing (e.g., "rewinding") the direction of time increments.

The editing interface for specifying input values to growth instructions may include a selection mechanism whereby a user may select an entity and the design platform 105 may determine the entity ID and set it as the input value to a growth instruction. The user interface may ensure that no entity be selectable as an input to a growth instruction unless the entity in question has been created by a growth instruction occurring prior to the growth instruction being edited. During the initial creation of a set of growth instructions, this may not be an issue, because any entity that's selectable as an input to a new instruction must have been created by a previous instruction. However, in the case where the design platform 105 allows a user to roll back the design space to an earlier time and edit the inputs to an instruction mid-sequence, design platform 105 may prevent the user from selecting an entity existing after this mid-sequence instruction. If this policy is not enforced by the design platform 105, issues may arise when the growth sequence is executed from scratch on an empty design space because an instruction will be invoked with a reference to an entity that has not been created yet.

A user of the design platform 105 may have direct control over the advancing of time, as represented by the time variable. In some embodiments, the design platform 105 may automatically advance time sequentially, after the user has issued a start command. The user may also issue a stop command to halt the incrementing of time. The user may also issue a command to change the direction of the time increments from advancing to decreasing. Through these and other commands, the user may control the forward and reverse progression of time, similar to the way a user might interact with the controls of a video player.

When the design platform 105 modifies the value of the time variable, the cells in the design space may be triggered to execute processes that may affect the state of the cell itself, as well as any other aspect of the design space. For example, after cell parameter values change in response to stimuli through the "reaction" process described above, they may undergo a "diffusion" and "sink" process.

For example, after cell parameter values change in response to stimuli through the "reaction" process described above, they may undergo a "diffusion" and "sink" process. During the "diffusion" process, the value of a parameter in a selected cell may be compared to the values of the same parameter in the cell's direct neighbors. The difference in the values may contribute to an accumulated delta, which may increase the value of the parameter in the selected cell if the cumulative values of the neighbors are higher. In other words, some of the parameter value of the neighboring cells may be diffused into the selected cell if the values in the neighboring cells are higher. This process is described in more detail in reference to FIG. 7.

The amount of the diffusion may be controlled by a "diffusion rate" coefficient. This "diffusion rate" coefficient may be a form of characterizing a GBD structure's reactivity to stimuli, or how interactive cells of the design may be. A user or the design platform 105 may control the "diffusion rate" coefficient. If the "diffusion rate" is automatically implemented by the design platform 105, the design platform 105 may set the diffusion rate based on the design material type, length of time of the simulation, stimuli applied, etc. For example, a design simulating a flexible material may be very reactive, relative to a harder material. In such a case, an impact on one cell may more readily affect its neighboring cells, prompting design platform 105 to set a higher diffusion rate coefficient when modeling flexible material rather than hard material. A short simulation run time may also cause a fast diffusion rate, so that the impact of stimuli may take place across a cell population more quickly. Stimuli applied may affect a diffusion rate in that some stimuli prompt more reactions in the cell population than others. For example, for one scenario, applying a compression load may correspond to the design platform 105 applying a high diffusion rate coefficient, whereas applying a temperature increase may be associated with a relatively lower diffusion rate coefficient. Continuing on this scenario though, the design platform 105 may create a design space where the diffusion rate for applying a temperature suddenly increases as the material for the GBD structure approaches a phase change temperature.

During the "sink" process, the values of parameters in cells may be reduced in order to systemically remove concentration caused by the reaction process—which may cause values of parameters to increase over time. In some embodiments, the value of a parameter may be reduced by a percentage, while in another, it may be reduced by an absolute amount. The amount of the reduction may be controlled by a "sink rate" coefficient.

The reaction/diffusion/sink model for mapping changes in stimuli to changes in cell parameter values may be tuned based on the values of the coefficients. It is also notable to point out that this mechanism has the effect of averaging values over time (frame steps). Furthermore, by reducing the reaction and sink rates, the value of a parameter may represents the cumulative effect of state changes in stimuli over a longer period of time (frames). By increasing the diffusion rate, the effect of state changes to stimuli may propagate to a larger neighborhood of cells. For example, a spike in force on a cell may cause a cell parameter value to suddenly increase. Due to a high diffusion rate, this value may quickly propagate to a large number of cells in a larger radius.

At the end of the reaction/diffusion/sink processes or cycle(s), the design platform 105 may sort cells based on their parameter values. In the case where there is a parameter representing, e.g., the strain sensed by each cell, the design platform 105 may select the N least strained cells and kill them, and select the M most strained cells and spawn neighbor cells on faces where there are empty adjacent slots in the cell fabric. As previously described, the cell fabric for such a case may be comprised of a 3D grid index that identifies where there are cells versus empty voids. The cell fabric may enables the design platform 105 to determine, for example, if there is an empty slot on the X facing face of a cell, whereby the X facing face may have the highest strain of all the cell's external faces.

As seen from the descriptions above, generating a GBD structure may involve simultaneous analyses of multiple parameters and factors. Each decision to spawn or kill a cell may be based on parameter values for a single parameter or a combination of parameters. Below are some example embodiments of some parameters and combinations of parameters used to construct a GBD structure.

One combination of parameters may include a stress parameter value and a safety factor. In some embodiments, in the process of selecting cells for killing or spawning, the design platform 105 may first sort the cells based on a parameter such as stress, and then further filter out cells based on whether the stress is above or below a threshold defined by the material properties and an engineering safety factor. For example, if the user wanted the part to have no stress larger than 33% of the maximum yield stress of the material, then the user may specify a safety factor of 3. The design platform 105 may then sort the cells based on their respective stress parameter values from highest to lowest, and only select a cell for spawning if the stress parameter value of the cell was greater than 33% of the max yield stress. In some embodiments, a cell may be selected for spawning if the stress parameter value of the cell was greater than 33% of the max yield stress multiplied by a tuning coefficient. For example, it may be the case that to ensure that no cells have a stress larger than 33% of the max yield stress, the design platform 105 may select cells that exceed 0.7*33%*max yield stress. This may be because spawning cells next to the cells exceeding the stress threshold may relieve the stress, but may not immediately drop this stress sufficiently. The premise here is that if a cell is stressed and has an empty slot in a neighboring direction, spawning a cell in the neighboring slot may increase the localized cross-sectional area (thus reducing stress), and may increase the strength of the collection of cells versus the single stressed cell. As will be recognized, although a safety factor of 3 multiplied by a max yield stress of 33% is described, any suitable safety factor or max yield stress percentage may be selected by a user or set by the design platform 105. Further, any suitable parameter other than, or in addition to, safety factor may be used.

For safety factor, a safety factor may contribute to generating a GBD structure such that, in some embodiments, the maximum stresses in the structure should fall below the safety factor multiple of the yield stress for the selected material. For example, if a yield stress experienced by a region of the structure is 220 MPa and the safety factor is set to 2, the structure may not experience more than 110 MPa of stress once the structure is developed.

Safety factor may also be combined with other parameters to prompt changes to a GBD structure. For example, analyses of a GBD structure may include measuring displacement of at least a portion of the GBD structure (e.g., via FEA). The displacement of each cell relative to the cell's undeformed position may prompt a change in a displacement parameter value. If the displacement parameter value then exceeds a certain threshold defined for the entire GBD structure, in some embodiments, design platform 105 may trigger an increase in the safety factor to spur model growth. For some such cases, design platform 105 may cause model growth to continue until the displacement value of one or more cells is within a predefined allowed tolerance (associated with the safety factor), at which point the safety factor may also stop increasing.

Another parameter (or set of parameters) may be symmetry. For example, cells may be selected for spawning that match symmetry constraints relative to other cells. So if a cell is selected for spawning, the design platform 105 may evaluate if this cell is within a threshold distance to a point in a physical space or in a cell fabric, and if so, find the corresponding cell on the other side of a symmetry plane and select it for spawning as well. This way, the growth of a cell population may be controlled so as to promote symmetrical growth or killing behavior.

Another parameter may be a "thickness" parameter. In order to control growth of cells in areas of a GBD structure that may be too thick or too thin, the design platform 105 may establish a "thickness" parameter. Cells buried inside the cell population (e.g., that have no externally facing faces) may have a significant reaction (or production) of this parameter. These internal cells may also have a 0 sink rate for this parameter. Meanwhile, cells that do have external faces may have a 0 reaction rate for this parameter but a significant sink rate. By setting a non-zero diffusion rate, this parameter may build up high values in the thicker regions of the cell population. As the parameter value diffuses across a cell population and reaches the outside of the cell population, the sink rate may stabilize the values in the externally facing cells. However, the values of this thickness parameter in the thick regions may be higher than in the thin regions. The design platform 105 may additionally select cells for spawning or killing based on the value of this thickness parameter in combination with the other parameters, such as stress and strain.

Another example of a parameter may include a "flux." In order to control the growth of cells in areas that become fragile and where cell destruction may break the cell population into separate chunks, the design platform 105 may establish a "flux" parameter which may be analogous to a blood oxygen level. Cells that are touching fixed surfaces may have a significant reaction rate (e.g., parameter value changes with respect to time) for this parameter and a 0 sink rate. Likewise, cells that touch a forced surface may have a 0 reaction rate for this parameter but a significant sink rate. By setting a non-zero diffusion rate, the cell population may exhibit a "normal" healthy behavior where there is an unconstrained flow of high concentrations (or values) of this parameter due to diffusion from the fixed to the forced regions of the cell population. In the case where cell killing may cause the cell population to "neck down" or "hourglass" in a region, the values of the parameter in the constricted region may drop due to the sink rate on the downstream side causing the values to drain out at a faster rate than the diffusion from the higher concentrations on the other side of the constriction may allow. The constriction in the cell population may cause the constricted region to have a lower value of this "flux" parameter due to the restricted diffusion across the constricted region, whereas there may be a high sinking rate in cells on the other side. When the system selects cells for killing it may filter out cells that have a sufficiently low "flux" parameter value.

The design platform 105 may take into account manufacturing method(s) when generating GBD structures and their respective cells and parameters. For example, the design platform 105 may further may establish a "downward sensitivity" parameter to control the growth of cells in areas that may require internal supports. Internal supports may entail external geometry structures that may be used in 3D printing to support part geometry during the printing and sintering processes. For instance, in 3D printing, overhanging portions may require support structures. For example, in printing the letter E in an upright position, the middle and horizontal arms may require supports that extend downward and touch the lower arms of the letter. In a cell population, the design platform 105 may identify cells that have an exposure of faces in the downward direction and which are also obstructed by other cell faces below them. The design platform 105 may then apply a form of stimuli to these identified cells, meaning the design platform 105 may prompt an increase in the "downward sensitivity" parameter that may be proportional to a reaction rate multiplied by the number and orientation of external faces. In the case where a cell has a combination of faces both parallel and perpendicular to the downward facing direction, the parameter increase may be less than if a cell has only a face parallel to the downward facing direction. Due to diffusion, the increase of this parameter value in a set of cells may prompt downward sensitivity parameter values of neighboring cells to also increase. This may mean, for a cell population, that downward sensitive parameter values are higher for cells in the generally more downward facing and obstructed regions, and will be lower for cells in the generally more vertical regions that are parallel to the downward direction and are thus unobstructed. When the design platform 105 selects cells for spawning, it may select cells if they have a value of this parameter above a specified threshold, even if the stress or strain or other parameters in the cells may not meet required thresholds. The threshold for selecting a cell may be defined by a user-specified support angle input, or by the design platform 105 (e.g., based on global parameter inputs, such as material type or safety factor). A support angle of 0 indicates that any non-zero value of the downward sensitivity parameter in a cell may cause it to be selected for spawning. In some embodiments, a support angle of 90 may indicate that no values of this parameter—no matter how high they are—qualify a cell for selection. The cells that are selected for spawning may further be constrained to only spawn cells in the direction parallel to the downward facing direction. When the design platform 105 selects cells for killing, it may select cells that only have an upward facing face, or additionally select cells that have a downward facing face but do not have any obstructing cells below them—meaning that they would be supported by a raft Overall, during the stem growth phase of simulation or general building of a GBD structure, a cell or subset of cells may be selected for spawning based on the value of a parameter that measures the highest concentration of multiple gradient fields of fluctuating parameter values. During stem growth, cells may be selected for spawning and the spawning face direction may be selected based on obstacles and target locations. The stem may need to grow around obstacles and reach a target. The design platform 105 may measure the distance and direction from a cell to the closest point on the surface of the nearest attractor and keep-out region(s). It may then use these values as stimuli to determine a direction to spawn a cell so as to move towards the nearest attractor while avoiding penetration into a keep-out region.

Figure 3A:
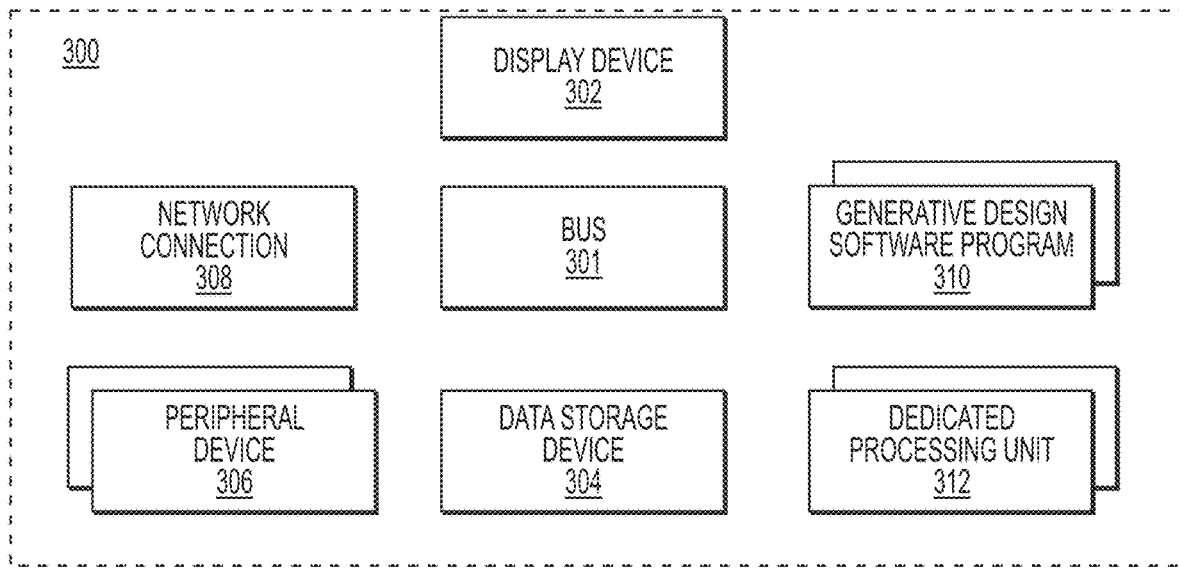
FIG. 3A is a block diagram of a hardware and software environment in which example embodiments may be implemented.

FIG. 3A is a block diagram of a hardware and software environment 300 of an exemplary model interface 101 and/or viewer application 103a-103n, including a possible version of design platform 105 (which may be analogous to or part of generative design software programs 310). Software environment 300 may comprise a computer comprising and/or running the one or more components shown at FIG. 3A. The software environment 300 may additionally be a mobile device, such as a smart phone, tablet, or embedded device on a machine. For some embodiments, model interface 101 and/or viewer application(s) 103 may include a bus 301, a display device 302, a data storage device 304, one or more peripheral device(s) 306 (such as pen/tablet, mouse, and/or keyboard), a network connection 308, one or more software program(s) (e.g., generative design software program 310), and/or one or more optional dedicated processing unit(s) 312, such as a hardware implemented physics processing engine. The generative design software program 310 may include one or more types of design software, including software employing topology optimization methods, a GBD approach (e.g., design platform 105), or a combination thereof. In some embodiments, generative design software program 310 may also be design platform 105.

Figure 3B:
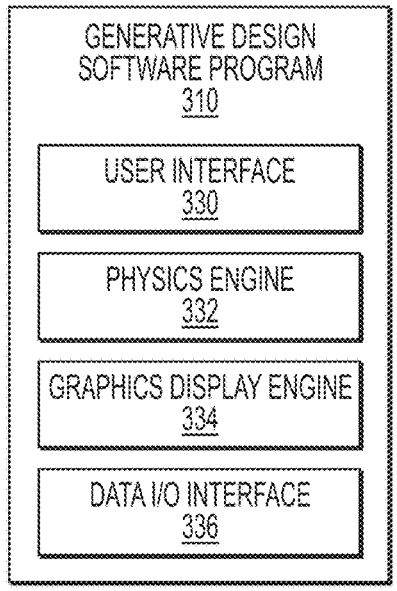
FIG. 3B is a block diagram of components of a software program that may be implemented in example embodiments.

FIG. 3B is a structural block diagram illustrating components of a generative design software program of the software programs 310, according to an example embodiment. The generative design software program 310 may offer various generative design approaches (including the design approach of design platform 105) or, in some embodiments, the generative design software program 310 may be design platform 105. The generative design software program 310 may comprise a user interface 330 supporting input commands supplied by a user via peripheral devices 306 (e.g., keyboard, mouse, or touch screen). The generative design software program 310 may also comprise a physics engine 332, optionally utilizing a dedicated processing unit 312 (of FIG. 3A). The generative design software program 310 may also comprise a graphics display engine 334 for optionally rendering or prompting rendering of 2D and 3D graphical displays, e.g., displays of a GBD structure or of various user inputs, parameters, cell history information, etc. to the display device 302 (of FIG. 3A). The generative design software program 310 may also comprise a data input/output interface 336 for reading and writing data to and from the data storage device 304 (of FIG. 3A). Example embodiments may also comprise a standalone software implementation (a computer program product). Those skilled in the art may appreciate that the example embodiments may be implemented as a "plug-in" extension to a CAD tool, such as SOLIDWORKS, Pro/ENGINEER or Creo from Parametric Technology Corp., 3ds Max from Autodesk Corp., or Sketchup from Google Corp, for example. In some embodiments, user interface 330, physics engine 332, graphics display engine 334, and data I/O interface 336 may be common components across all generative design approaches offered by generative design software program 310. Design platform 105 may include one or more of the components illustrated as part of generative design software program 310. For example, physics engine 332 may be part of or analogous to functional processor 205 of design platform 105, in some embodiments. For example, design platform 105 may execute a physics engine (e.g., physics engine 332, physics engine 332 including or interacting with a FEM, etc.) as functional processor 205, or run functional processor 205 in conjunction with a physics engine separate from design platform 105. One or more components illustrated as part of the generic, generative design software program 310 may also be part of, or work with, design platform 105.

Figure 4B:
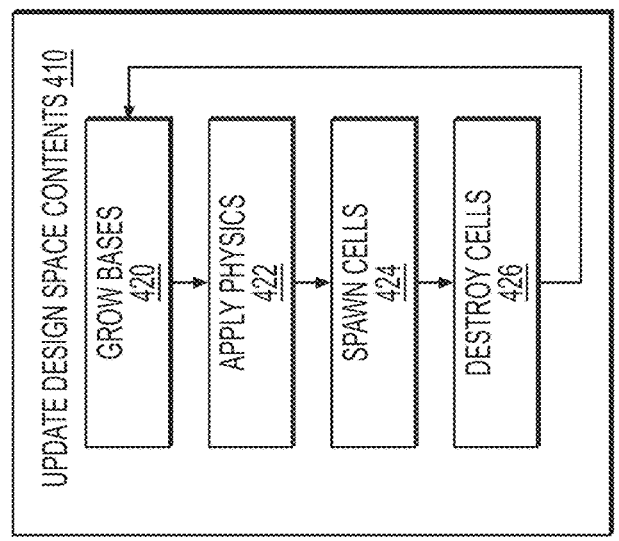
FIGS. 4A-4B are flow diagrams illustrating exemplary control processes.
Figure 4A:
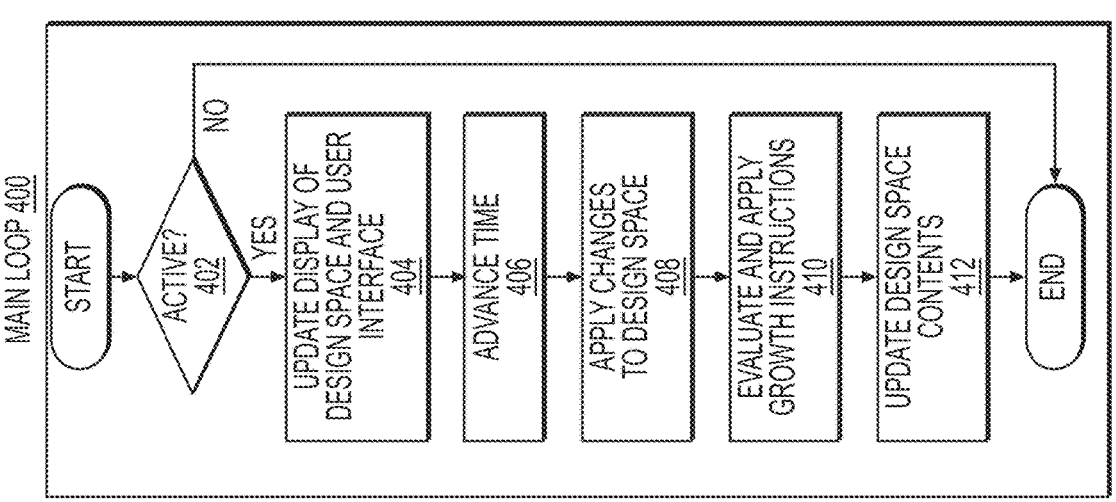

FIGS. 4A and 4B are flow diagrams providing an overview of processes that may be carried out by design platform 105, according to an exemplary embodiment. FIG. 4A illustrates a main loop 400 that may be carried out to generate and maintain a design space. A design space may provide interfaces for initial user inputs comprising initial configuration parameters for a mechanical part, e.g., material type or safety factor. The design space may provide growth-based design capabilities, including automatically generating designs for a mechanical part by generating one or more cells that are programmed to grow towards a target location, and simulating one or more loads or forces on the cells. FIG. 4B provides various operations that may be iteratively performed to generate a GBD structure, including growing base cells, applying physics-based simulations to test generated designs, and then spawning and/or destroying cells based on the results of the physics-based simulations. This process may be repeated as many times as needed or desired until a GBD structure is formed or reaches maturity. While FIG. 4B illustrates the operations sequentially, the operations of FIG. 4B may take place simultaneously or in any order. Further, although spawning and destroying cells are shown as steps in these FIG. 4B, it is recognized that in some cycles, only cell spawning may occur, only cell destruction may occur, these cell spawning and cell destruction processes may occur simultaneously, or neither cell spawning or cell destruction may take place.

Figure 7:
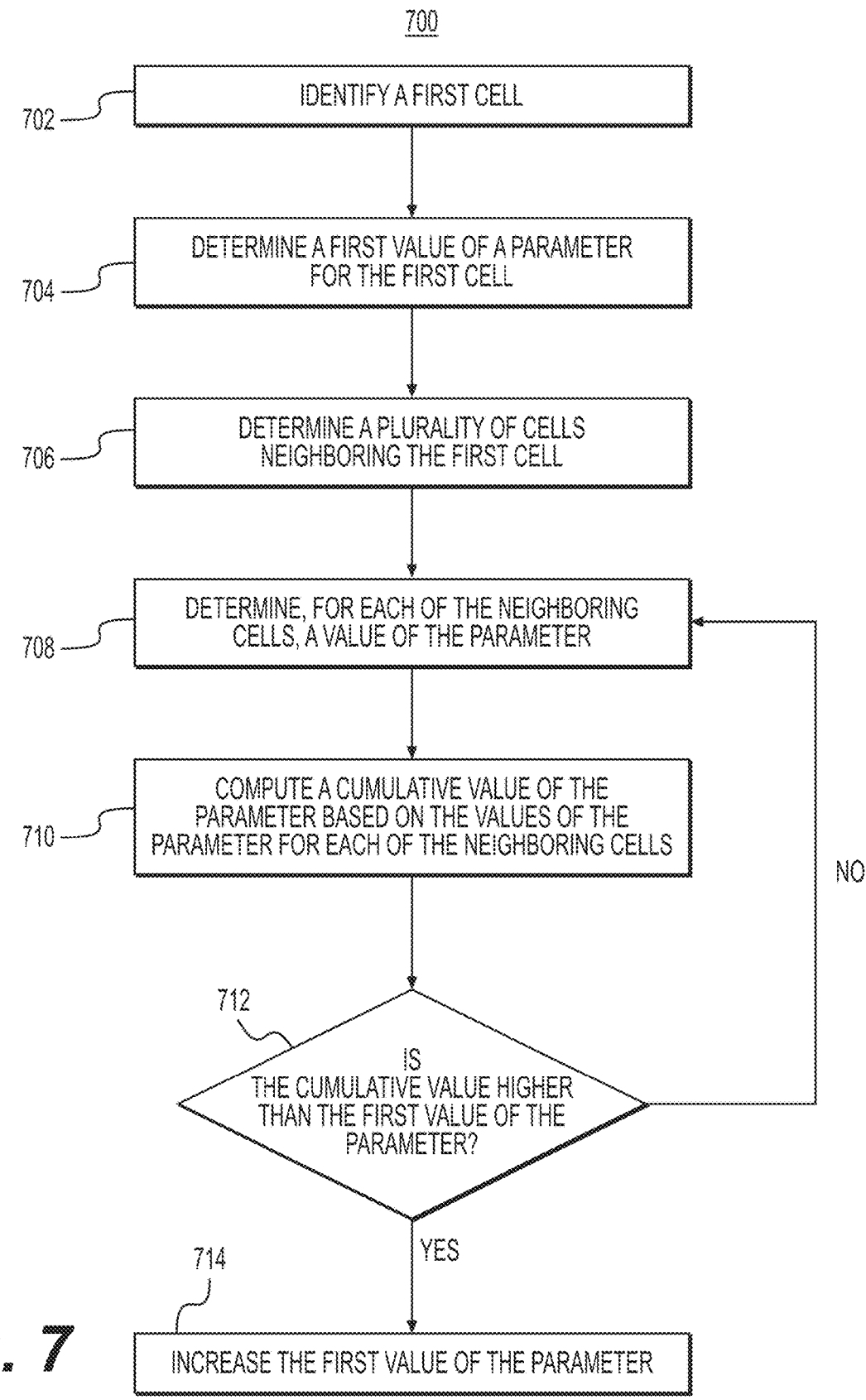
FIG. 7 is a flow diagram of an exemplary "diffusion" process of adjusting parameter values across a cell population.
Figure 8:
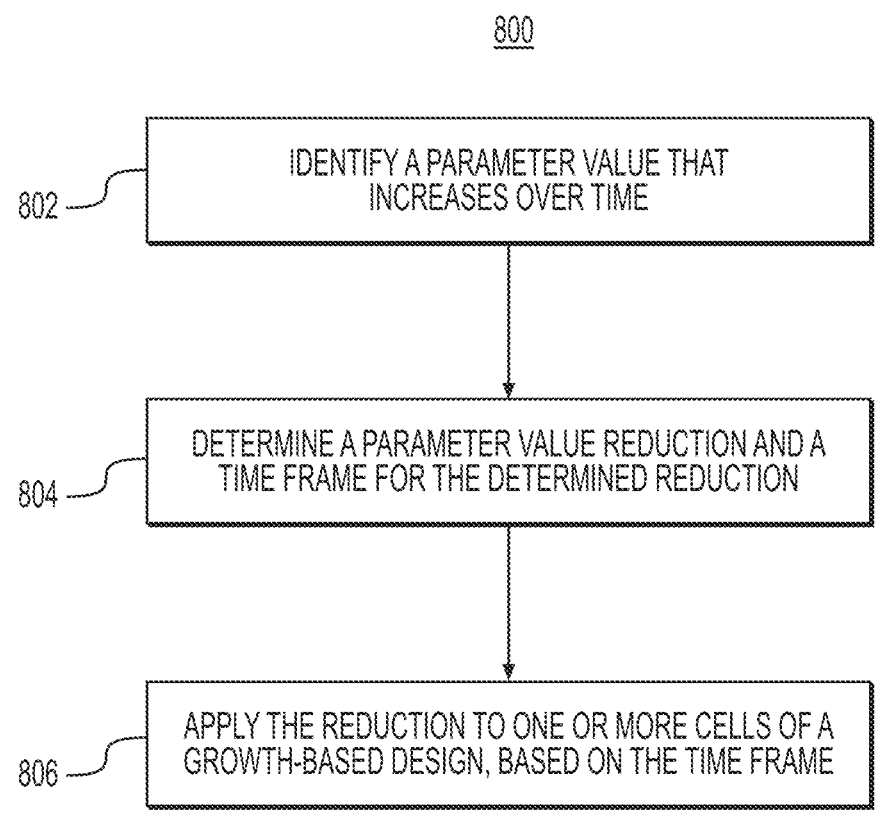
FIG. 8 is a flow diagram of an exemplary "sink" process for adjusting parameter values of a cell population.
Figure 9:
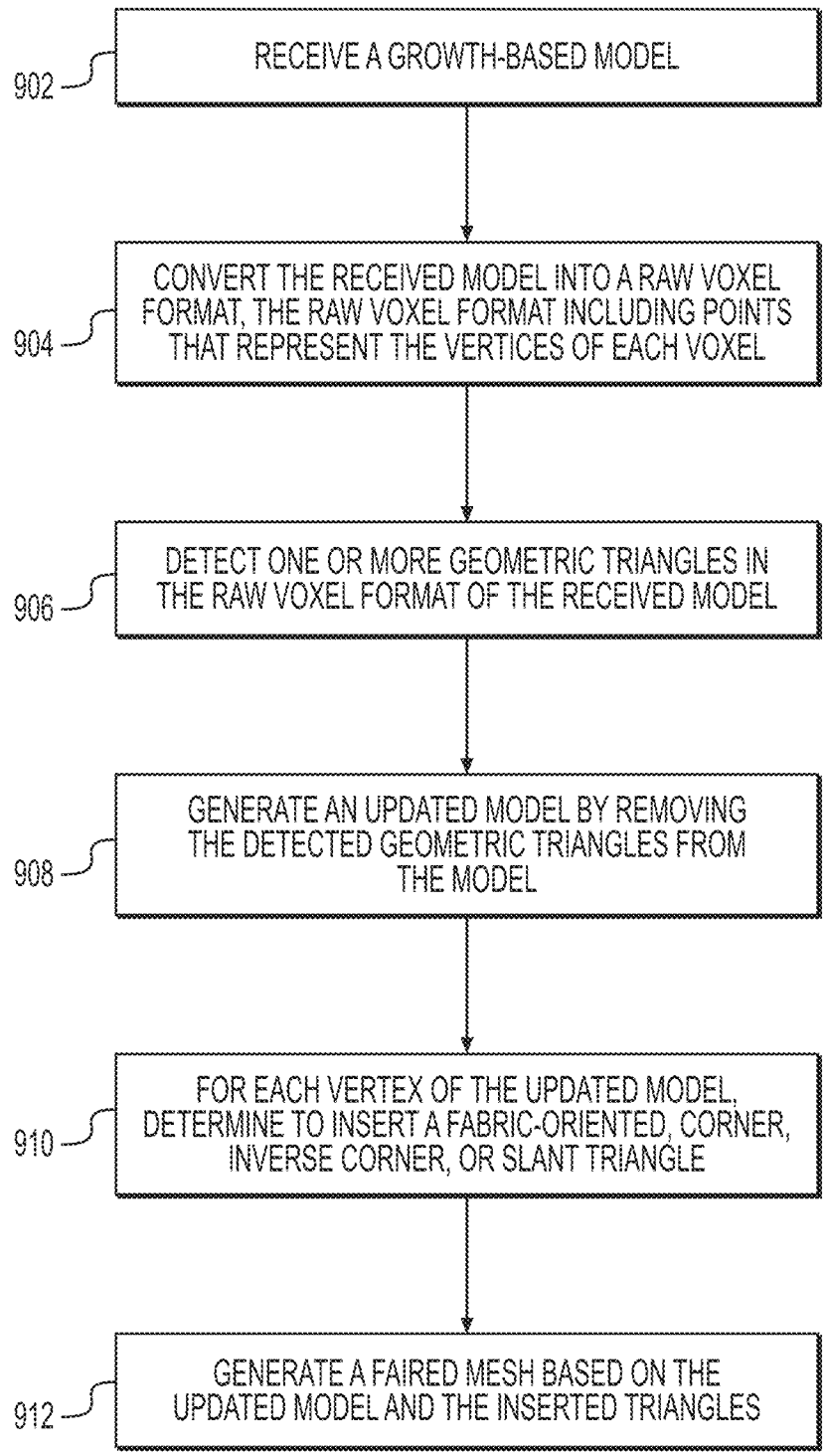
FIG. 9 is a flow diagram of an exemplary voxel fairing method.

Flow diagrams 5A-6E provide additional detail on each of the operations of FIG. 4B, according to an exemplary embodiment. For example, FIGS. 5A and 5B describe growing base cells, and FIGS. 6A-6E detail processes for cell spawning and destruction. FIGS. 7-8 discuss various operations in relation to physics-based simulations that may be applied to the cell population to create the GBD structures, according to various embodiments. Specifically, FIG. 7 discusses a method underlying the automatic generation of a growth-based structure, by which an impact on one cell may be propagated to its neighboring cells. FIG. 8 describes a method 800 for "resetting" the impact to allow a growth-based structure to stabilize. FIG. 9 describes a process for finalizing a GBD structure by voxel fairing, according to various embodiments.

All of the disclosed methods may be performed by any component of system 100, e.g., by design platform 105, and accessed over network 107. Because many cells in a cell population may be free to move about in space over time, their physical positions (which may change) may not coincide with their cell fabric positions (which may be fixed to specific indices in the cell fabric coordinate space). The disclosed methods may use either cell fabric positions or physical positions for their various operations.

Referring to FIG. 4A, the main loop 400 may perform operations including: a) determining if the loop is active (402), and if so, b) updating the display of the design space and user interface (404). For example, the initial design space may be a workspace comprising an empty screen that a user may view at one or more angles and orientations. The initial update may include displaying a base cell and a target location. The target location may dictate a "destination" in which cells may start to extend from the initial base cell to the target location, thus initiating the start of the growth-based design process. Loop 400 may further include advancing a time parameter (406) (e.g., a time marker within the duration of the GBD process) and applying changes to the design space (408). The changes to the design space may be comprised of simulations, e.g., assigning a point load with an initial value and a direction to a portion of the GBD structure.

The main loop 400 may then proceed to evaluate and apply growth instructions (410) and update the design space contents (412). For example, a point load may be programmed to activate when two seed cells have fused together and stopped growing. The point load generated by two seeds fusing may cause design changes, e.g., additional cells to strengthen the design in the vicinity of the point load. Each instruction may also include activation and deactivation times, or other conditions for determining when to be active in the main loop.

Design platform 105 may execute the main loop 400 until interrupted by a user, meaning a design for a mechanical part may evolve until a user intervenes or saves a design at a certain point in time. The operations of loop 400 may be viewable by a user, or in a mode without a graphical user interface. For example, a user may initiate a GBD process, run the process for some time, and when a threshold is met (e.g., as the GBD structure or cell growth rate tapering to 0), the GBD structure may be saved, the geometry of the GBD structure may be exported or converted to manufacturing instructions, and/or the loop 400 may be shut down.

In some embodiments, design platform 105 may interrupt main loop 400, e.g., when it detects that mature growth has been achieved and user constraints for the GBD structure have been met, when a pre-set duration for the GBD process has ended, due to a user command, etc.

In some embodiments, the design space provided by a design platform 105 may be connected to or associated with a neural network, where the network may vary the values of reaction, diffusion, sink parameters (discussed in further detail below), as well as other growth behaviors, such as internal spring damping, and then may have scoring functions rank the results for GBD structure mass, strain energy, number of holes (e.g., holes may be undesirable), etc. In some such embodiments, the neural network may run many iterations of the disclosed GBD process by tuning the inputs and ranking the outputs in order to generate better quality designs based on user supplied forces and constraints. Such iterations or neural network-paired GBD processes may improve the GBD process and resulting GBD structure(s).

FIG. 4B illustrates a process 410 for updating design space contents (410) in further detail. The process 410 may include: growing base cells to form stems that extend in the direction of target locations (420), applying physics simulations to the cells (422), spawning cells (424), and destroying cells (426).

The operation of growing stem bases 420 may include providing base cells at a location in a design space or a location of a GBD structure. The operation 422 of applying physics is described in more detail at FIGS. 5A and 5B. A base cell may be a cell whose boundaries permit placement of new cells. This cell creation may take place in a specified direction aligned with a signal source. The operation 420 may comprise evaluating each base cell in a cell population to see if it is able to spawn a new cell.

The operation of applying physics 422, may involve repeatedly incrementing a physics engine (e.g., functional processor 205 of design platform 105) a number of steps (e.g., iterations of applications of the physics-based assessments, time increments, etc.) such as 10 steps, whereby the step size may be a small value on the order of 0.0005 seconds. Operation 422 may be performed or iterated several times during a single execution of the main loop 400. One example of operation 422 may involve propagating concentrated stresses that may have arisen due to the sudden spawning or destruction of a cell whose elastic member (e.g., a spring) resting lengths may differ from those of its neighbors by an amount greater than a specified threshold, such as 1%. Operation 422 may also include managing the positions, velocities, and/or accelerations of cell nodes, along with springs and dampers representing the cell boundaries and internal supports. Operation 422 may further include managing a set of attachment constraints among nodes, rigid body constraints along cell boundaries, collisions between cells, and soft body dynamics to support deformable behavior. Yet another instance of operation 422 may include modeling the behavior of cell material using the finite element method and a set of applied material properties to each cell, including Young's Modulus, the compressive and tensile yield stresses of the material, Poisson's Ratio, and material density. Exemplary aspects of operation 422 are described in more detail at FIGS. 8 and 9.

Operation 424 of spawning cells may include triggering the creation of new cells along empty boundaries of any existing base cell. For example, operation 424 may involve iterating over the population of cells and executing a "spawn cell" method on each cell. In some cases, operation 424 may be skipped on a cycle of process 410 or loop 400 in order to slow the rate of base cell growth. For example, the rate of skipping may be a quantity such as 95%, meaning that growing bases may be triggered only 1 in 20 cycles.

The operation of destroying cells 426 may involve determining the highest priority cell candidates for destruction based on cell parameter values, and then destroying at least a subset of these cells. Operation 426 may be performed iteratively over a population of cells. Operation 426 may include computing, for each cell, a measure of its strain or a parameter in response to the physics applied at operation 426, and removing some cells based on the computed measure or parameter. For example, if the parameter involves strain, operation 422 may include removing 0.5% of the cells having the lowest strain values. The number to remove may, for example, be a maximum of 0.5% of the total population, or a maximum of between 1-3 cells per cycle, e.g., if the GBD structure has entered a slowed cell destruction period. These values may also be varied, according to threshold parameter values, e.g., defined by threshold module 215 of design platform 105. FIGS. 6A-6D provide additional detail on the spawning cells operation 424 and the destroying cells operation 426.

FIGS. 5A and 5B depict flowcharts of operation 422 for growing base cells, according to an exemplary embodiment. FIG. 5A details a broad method of constructing (or "growing") a GBD structure from a base cell, and FIG. 5B describes detailed steps on a cell-by-cell level for creating a new cell from a base cell.

Method 500 of FIG. 5A broadly describes the steps of constructing a GBD structure. A GBD process may start with an initial cell, referred to as a root cell. The root cell may be a base cell. Design platform 105 may provide one or more base cells and may pre-program the base cells to create adjacent cells in a specified direction. For example, design platform 105 may store, for each base cell, a vector extending in a growth direction (e.g., toward a target location). The cell creation may be referred to as "base growth." Operation 502 may include defining a first cell of a GBD structure, the first cell being a base cell having a position ID and a growth vector. The position ID may dictate the position of the base cell, and the growth vector may define directions in which cells may be generated alongside the base cell. The first base cell may further be defined as a root cell, meaning the cell may have a fixed position. In other words, operation 502 may first include generating a mechanical part modeling design space including one initial cell, the cell comprised of a parameterized representation of springs, dampers, and masses. Operation 502 may then include determining, for the initial cell, fixed location parameters and a first growth vector. In particular, operation 502 may include receiving user input specifying a start location upon a fixed surface in a modeling design space. To provide the fixed position, operation 502 may include setting a position of one or more nodes of a cell as fixed over time. For example, operation 502 may include setting the nodes of the cell as coordinates on a fixed structure or surface. The cell with fixed nodes may then be designated as the root cell.

Figure 11:
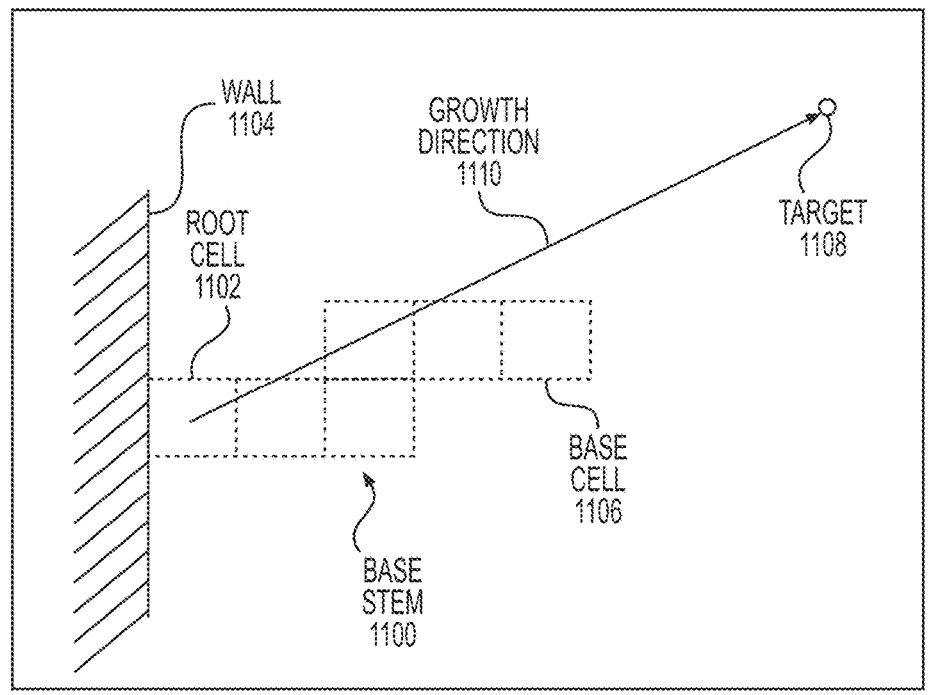
FIG. 11 illustrates a lateral 2D view of an exemplary base stem growing from a wall.

Operation 504 may include receiving a target location. The target location may be received via user input. Operation 506 may include associating the received target location with the growth vector of the root cell to dictate the growth direction for a second cell. Associating the received target location with the growth vector may entail generating a growth vector that extends from the root cell to the target location. This generated vector may be the growth vector of the root cell. A depiction of these steps is provided at FIG. 11. FIG. 11 illustrates a lateral 2D view of a base stem 1100 growing from a wall 1104 towards a target location 1108. The base stem 1100 may be made up of one or more base cells 1106. The original base cell in a stem 1100 may be designated as the root cell 1102. Root cell 1102 may be attached to a wall 1104 or other fixed structure or surface by setting the positions of two or more of its nodes to be fixed over time. The target location 1108 may be associated with the base stem 1100 (with operation 506), causing the target location to dictate a growth direction 1110 for the base cell in the stem.

Operation 508 may include creating a second cell along the growth vector of the first, root cell. Generating the second cell may be based on a parameter value of the first cell. As previously discussed, generating new cells may be prompted by reaching predetermined thresholds stored by the design platform 105. In some embodiments, operation 508 may include receiving a predetermined strain parameter threshold value and generating the second cell based on a comparison of a strain parameter value of the first cell to the predetermined strain parameter threshold value.

The second cell may be positioned between the first, root cell and the target location. In some embodiments, the second cell may be adjacent to a boundary of the first cell. The second cell and root cell thus begin to form a "stem," forming the beginning of a GBD structure. The GBD structure may start from these first two cells and eventually take shape after multiple stems are created. Operation 508 may further include creating the second cell as a base cell, or the root cell transferring its designation of being a "base cell" to the second cell. The second cell may then also have a growth vector. For example, operation 508 may include generating a growth vector for the second cell, such that the growth vector of the second cell may extend from the second cell to the target location. A third cell may then be created from the second cell, the third cell being positioned between the second cell and the target location, along the growth vector of the second cell (operation 510). The structure of a mechanical part (e.g., a GBD structure) may be defined by the initial cell, the second cell, and the third cell. The location of each cell may continuously be tracked by design platform 105. In particular, the design platform 105 may monitor the location of the base cell at the tip of the base stem, as shown by base cell 1106 of base stem 1100 of FIG. 11. Location may be one parameter included in a set of parameter values that may be associated with each cell. For example, operation 500 may include associating a set of cell parameter values with each generated cell (e.g., the first cell, second cell, and third cell). The cell parameters may include at least one of a value correspond to strain exhibited by a cell, a temperature of the cell, or an age of the cell.

By transferring the "base cell" designation to newly created cells, a base cell may continuously remain at the tip of a growing stem. A collection of multiple growing base stems may form initial structures in a cell population and GBD structure. The initial structures may form a lattice or scaffold upon which additional cells and stems may be grown. Each of the structures may extend towards the received target location. In some embodiments, the structures or stems may fuse upon meeting or upon reaching the target location.

Further, as cells spawn neighboring cells in a certain direction, and grow into a stem, the cells at the end of the stem may sag as the structure bends under the stimulated force of gravity. This may cause the cell fabric to warp because cells at the end of the stem may not lie in the same physical line as those in the base of the stem, even though all cells in the stem may lie in the same logical row of the cell fabric. The warping may cause further spawning to increase the strength of the stem and counter the warp.

FIG. 5B is a flow diagram elaborating on operation 420 of growing bases from existing base cells. Specifically, FIG. 5B describes a method 520 for computing where to place a cell adjacent to a base cell and creating the new cell. Method 520 may be comprised of various path-finding techniques. In some embodiments, operation 522 may include selecting an existing base cell. While cells may be any shape, in embodiments where cells are geometric shapes having corners (e.g., rectangular cells), operation 522 may include computing cell fabric coordinates of the selected base cell, using the base cell's corner node locations in the cell fabric space. In particular, operation 522 for such embodiments may include summarizing the cell fabric coordinates as the "center" of the cell by deriving a "center coordinate" from the base cell's corner node locations. With cubic cells, for instance, the center of a cell may be computed in undeformed space as a cell's fabric location value(s) multiplied by the cell's edge length(s) plus a half cell length in each direction. For example, if a cell in a design space is 1 mm on a side and it has a fabric location of 300, 400, 500, the center of the cell may be at 300.5, 400.5, and 500.5 mm. For deformed space, a cell center may be at the centroid of 4 corners in the deformed space. Some embodiments of cell actions may use undeformed centers, e.g., in comparing locations to stationary or fixed features in a design space, such as keep out zones.

As previously discussed, a cell's cell fabric location may remain constant over time, even if the physical location of the cell in space or in a design space may change. This is because the cell's cell fabric location may be defined relative to other cells in the cell fabric, whereas a cell's physical position may change. A cell's cell fabric location may thus be stored and repeatedly used throughout the generation of a GBD structure.

Figure 12:
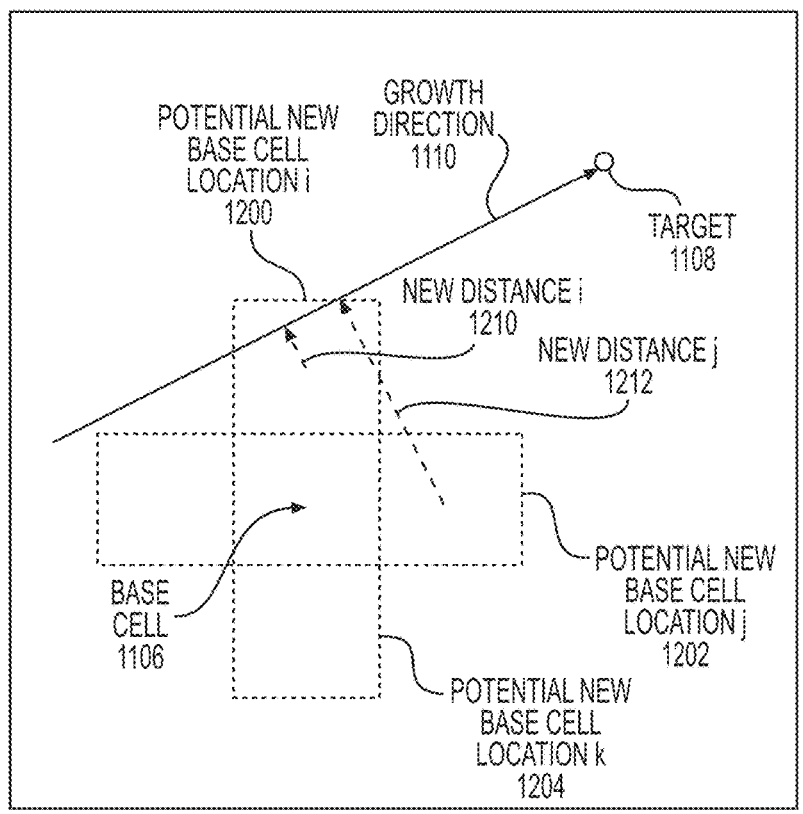
FIG. 12 illustrates a lateral 2D view of an exemplary base stem in a process of determining a best direction to create a new base cell.

Operation 524 may include computing locations of new cells. For example, operation 524 may include computing centers for potential new cell locations within a cell fabric. For each new cell location, operation 524 may be performed by adding the selected base cell's center location to each new cell fabric slot's boundary normal vectors, multiplied by the side length of the vacant slot of the cell fabric. A new cell center may be computed as a base cell center, plus a unit normal vector of the boundary face multiplied by a cell size. For example, the center a cell to the right of a base cell may be found by adding the base cell center point to the right unit normal vector, times the cell size. To illustrate, if cells in some GBD processes are 1 mm and an exemplary base cell is at 300, 400, 500 of a cell fabric, the cell center of a cell to the right (e.g., increasing x axis) of the base cell may be 301, 400, 500. FIG. 12 shows a depiction of operations 522 and operation 524, in which an existing base cell 1106 may be chosen, and method 520 may be operating to determine the best direction in which to create a new base cell to fit a growth direction 1110 and track towards a target location 1108. FIG. 12 also illustrates a scenario including three potential new locations for a new base cell to be created. These locations may correspond to the three empty boundaries of the existing base cell 1106. The three potential new base cell locations may be referred to as locations i 1200, j 1202, and k 1204.

Operation 526 may include evaluating each potential base cell location of operation 524, based on the cell location's indication of growth towards the target location. For example, operation 526 may include assessing each of the potential base cell locations and finding the base cell location closest to the target location. Operation 526 may further include rejecting potential base cell locations that do not advance a base step to the target location. For example, location k 1204 of FIG. 12 may indicate growth away from target location 1108. Operation 526 may take into account scenarios where normal vectors of the base cell's boundaries may not align precisely with the base cell's growth direction or growth vector. In such a case, operation 526 may include comparing the boundary normal vectors of the selected base cell with the growth direction and choosing or computing a boundary normal vector. For cubic cells, for instance, each cell face may be comprised of a plane. In such embodiments, there may be 6 boundary normal, e.g., vectors perpendicular to each of the 6 faces. One embodiment of computing a boundary normal vector may include determining a normal vector (e.g., of the 6 normal vectors) which best aligns with the growth direction. The face of the cubic cell which corresponds to the normal vector best aligning with the growth direction may then be selected as the face from which to spawn a next cell. One or more path finding algorithms may also be used to determine cell spawning directions. A new cell may then be built along the boundary normal vector.

Operation 528 may include selecting one of the locations of the potential base locations, where the selected location has the shortest new distance from the selected base cell (of operation 522) to the target location. In FIG. 12, for example, new distance i 1210 is shorter than new distance j 1212. Operation 528 for the instance in FIG. 12 may thus select location i 1210 as the location for a new base cell. In instances where the boundary normal vectors of a base cell do not precisely align with a growth direction, building the GBD structure towards the target location may be achieved incrementally. For example, one base cell may create a neighbor in the upwards direction, while its successor may create one in the horizontal direction. FIG. 11 illustrates one such scenario of a stepwise nature of a base stem, where cells may be created sometimes upwards and sometimes horizontally to track the growth direction. Over time, a collection of new base cells may form a line that matches the specified grown direction (e.g., growth direction 1110 of FIG. 11).

Operation 530 may include creating a new base cell at the location selected in operation 528. Operation 530 may further include determining whether the new base cell should be attached to any neighboring cells. For example, operation 530 may include detecting existing neighboring nodes in the cell fabric relative to the selected base cell of operation 522, prior to creating new nodes for the new base cell. If such nodes exist, operation 530 may include attaching the new base cell to existing cells using these common shared nodes. The act of stitching a base cell to other cells (including other base cells) may cause this and other base cells to have no empty boundaries, which could prevent such a base cell from growing a new base cell in the future.

Operation 532 may include determining if there are additional base cells to process (not including new base cells created during operation 530). If there are additional base cells, the method 520 may proceed to operation 522; otherwise method 520 may terminate. A design space of design platform 105 may support multiple base cells, with each base cell causing growth in a different direction. One or more base cells may be attached to a wall.

Figure 13:
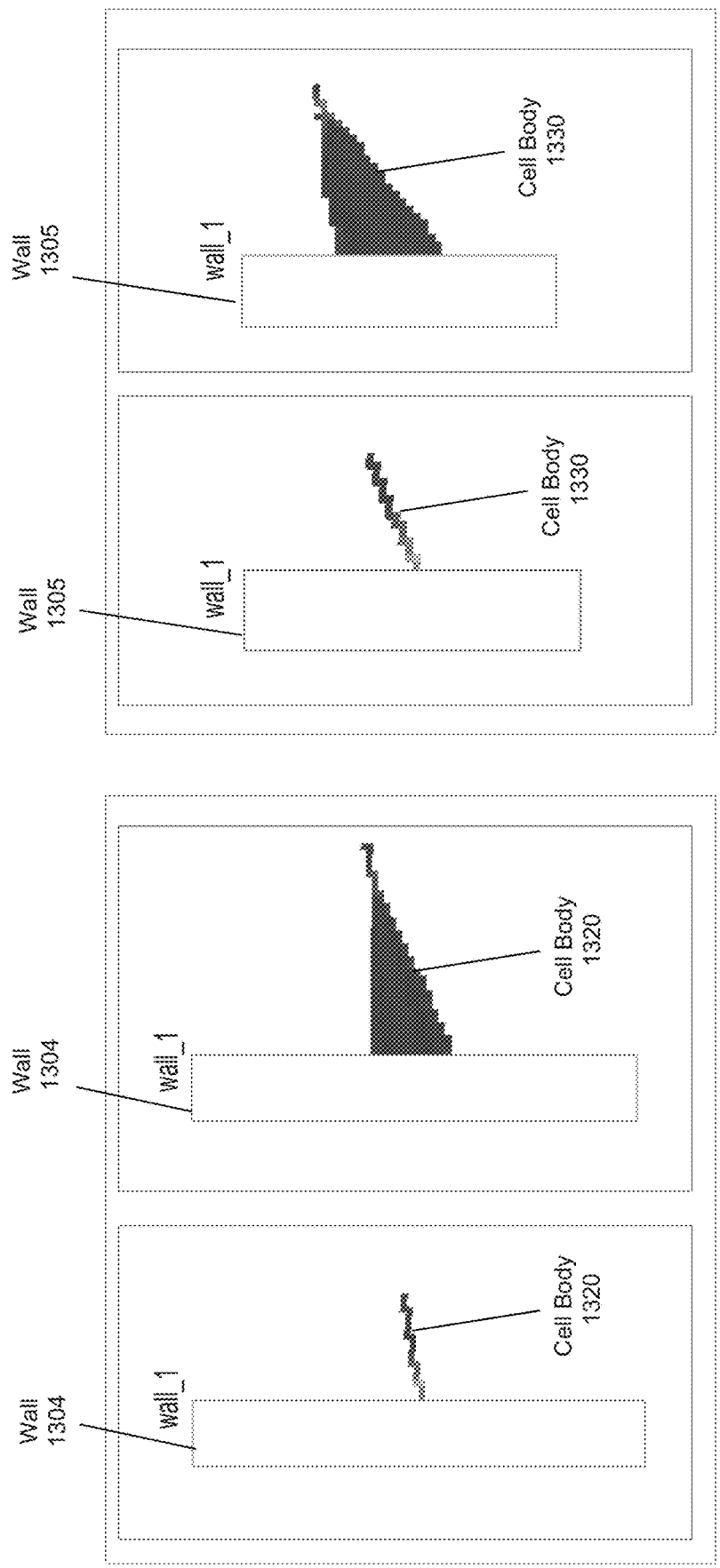
FIGS. 13A and 13B illustrate lateral 2D views of exemplary GBD structures growing from respective walls in further examples.

Methods 500 and 520 may use either cell fabric positions or physical positions to determine the best direction for growing new base cells. For example, a base stem might extend horizontally in the positive x direction in cell fabric space. This means that each subsequent cell in the stem may have nodes with increasing x ID indices, and unchanging y ID indices. As previously discussed, the growth-based modeling of design platform 105 may include applying physics-based simulations (e.g., gravitational forces) to the GBD structures created by growing cells from base cell(s). As stems of the GBD structures (or entire GBD structures) flex and bend in response to the simulations, the physical positions of the nodes in each stem might sag out of perfect horizontal alignment. In other words, the physical x and y positions of the nodes might change non-uniformly further out on the stem, even though the y ID indices (and possibly x ID indices) remain unchanged. FIGS. 13A and 13B illustrate methods 500 and 520. In particular, FIGS. 13A and 13B depict lateral 2D views of a population of cell bodies 1320 growing from a wall 1304, and a population of cell bodies 1330 growing from wall 1305. Here, as in FIG. 11, base stems are grown from an initial seed base cell attached to a wall. The direction of growth for the cell bodies may be designated as a vector pointing upwards or downwards or laterally within a design space of a workstation. For some cases, the direction of growth may be fixed. For other cases, the direction of growth or growth vector may also change over time, for example, in scenarios where a base cell stem is tracking towards a moving target such as the base cell at the tip of another base stem.

The first frame of each of FIGS. 13A and 13B show that cells towards the base of the stem begin to experience higher strain due to bending, as the stem grows outwards from the wall. Base stems may grow outwards from a base cell, but they may also grow thicker as a means of resisting bending and collapse. Methods 500 and 520 may be a process by which cells spawn neighbors along their uninhabited boundaries as a way to strengthen these boundaries and resist stretching or compressing. FIGS. 13A and 13B also illustrate how cells near the root of a base stem may spawn new cells in order to reduce the level of bending in the stem, due to gravity pulling downwards on all of the cells.

Figure 6E:
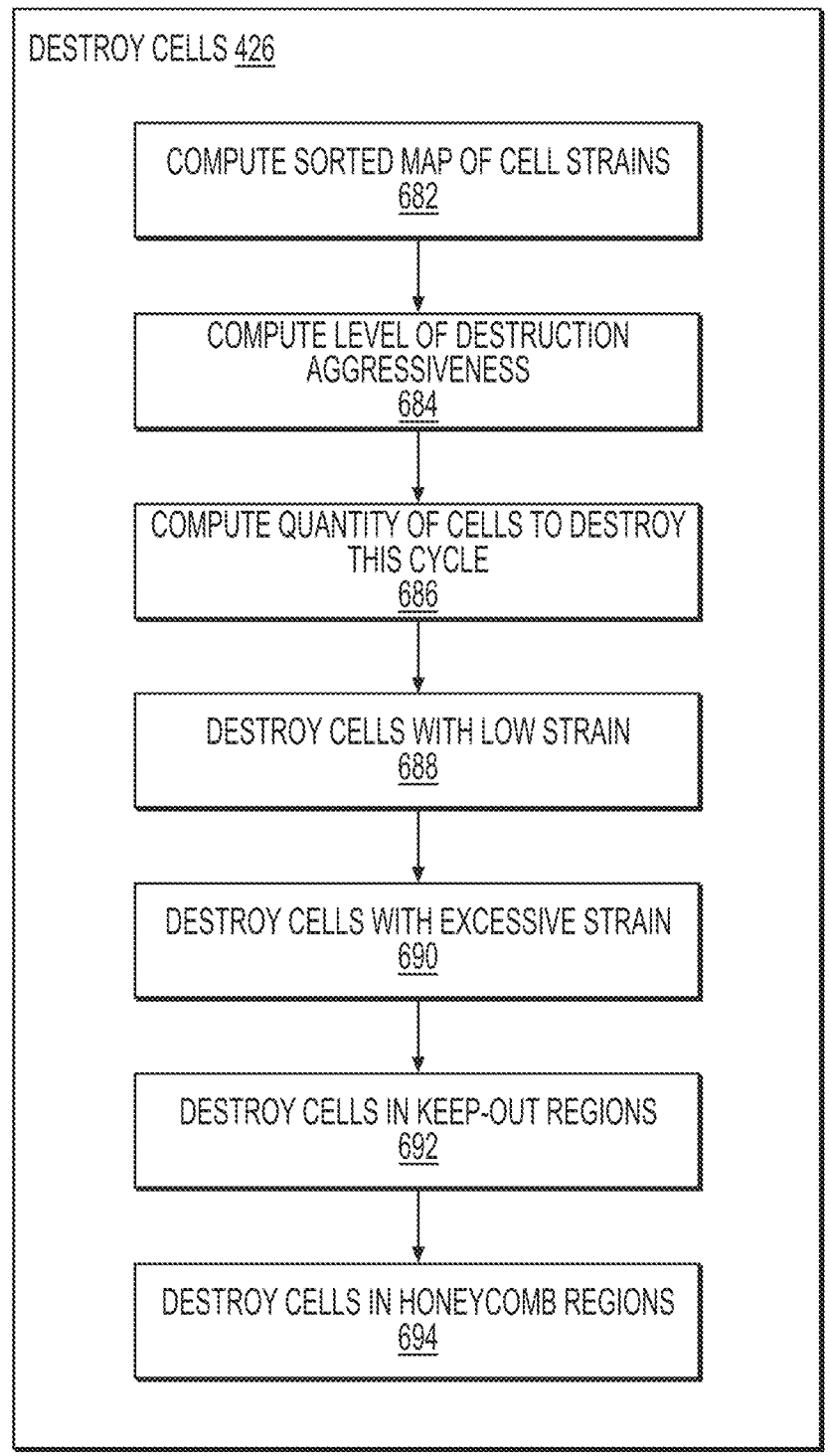

FIGS. 6A-6E depict flowcharts of operations for spawning and destroying cells (e.g., operations 424 and 426), according to one embodiment. FIG. 6A details building a cell fabric to accommodate cell spawning and FIG. 6B discusses initiating growth or reduction in a cell population. FIGS. 6C and 6D describe specific steps for spawning cells in a GBD structure, and FIG. 6E discusses computations and steps that cause cell destruction.

Method 600 of FIG. 6A broadly describes the steps of building a GBD structure, according to one embodiment. Operation 602 may include defining or creating a cell fabric comprising a plurality of cells and a plurality of nodes. As previously discussed, a cell fabric may include any scaffolding or reference system that may be used to organize cells. Cell fabrics may be square grids, rectangular, hexagonal, triangular, geodesic domed, cylindrical, or follow any grid pattern represented by the node locations in space on regular polyhedrons, such as the dodecahedron. Cell fabrics may also follow irregular patterns such as a Penrose tiling formation. Operation 602 may include selecting or defining a cell fabric to model and create a GBD structure. This operation may be performed by a user or by design platform 105.

For method 600, the cell fabric may be comprised of a logically-defined relationship between the cells, e.g., as located in an x-y-z grid. For such a scenario, operation 604 may include generating, for each existing node, an ID that identifies its position relative to one or more other nodes. In the instance where the cell fabric is defined as an x-y-z grid, operation 604 may include generating a node ID using an x-y-z notation. Operation 606 may include creating a second, new node to build the cell fabric, or detecting that a second node has been built.

Operation 608 may then include generating an ID for the second node, which logically places the second node relative to the IDs of its neighboring nodes. For example, if a new node were to be created to the right (positive x direction) of an existing node, the new node might get an ID comprised of an x, y, and z portion, whereby the x portion is 1 greater than the x portion of its immediate neighbor to the left in the x direction. The x, y, and z portions of a node's ID may be referred to as the location of a node in cell fabric space. Operation 610 may include generating an index comprising the node ID(s) of existing node(s) and the node ID of the second, new node. Cell spawning or fusion may be prompted, based on the index (operation 612), e.g., spawning a cell into the indexed position of the cell fabric.

Design platform 105 may use cell fabric positions, rather than physical locations of nodes. This means that the non-deformed representation of cell positions may be used to determine a direction for cell growth. Using the cell fabric location may more accurately build a growth-based model from a base cell to a target location, than using the physical locations of nodes. This is because, over time, a structure may bend back and forth. If growth directions were based on local deformations, the overall growth direction might over compensate for a temporarily large deformation. For example, if a base stem were sagging, it might grow many base cells in the upward direction in order to maintain tracking to its target direction. However, if later in time, the structure had returned to a non-deformed state, then the base stem would appear to have overshot growth too much in the vertical direction. Using non-deformed positions of cells may cause the growth of a base stem to have less erratic behavior.

Figure 14:
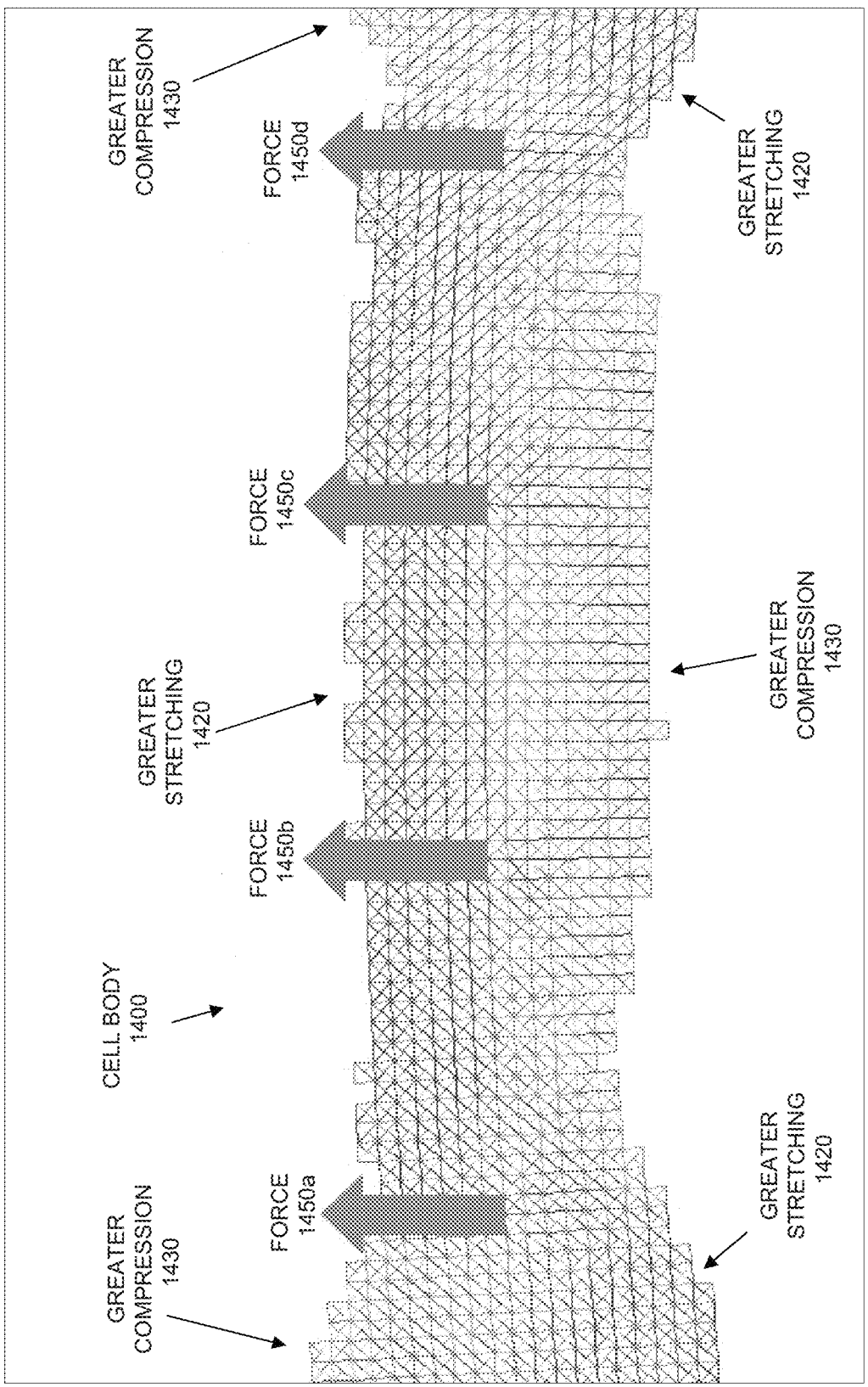
FIG. 14 is a lateral 2D view of an exemplary population of cells displayed with only their boundary and internal springs.

Method 620 of FIG. 6B describes various factors that may drive cell growth or destruction. For example, operation 622 may include receiving one or more simulated forces, e.g., from users, by detecting forces to be placed onto a GBD structure, given the structure's form or constraints, etc. Step 624 may include defining a cell population comprising a first cell and a second cell. The first cell may be adjacent to the second cell. An example of a cell population is depicted in FIG. 14. FIG. 14 is a lateral 2D view of a population of cells (a GBD structure) 1400 displayed with only their boundary and internal springs. As shown by FIG. 14, cells may experience varying levels of strain, where some portions experience varying degrees of stretching 1420, while other portions experience varying levels of compression 1430. The upward forces 1450a-d applied to certain cells in the population are causing the upper cells to experience horizontal tension, while the lower cells are experiencing horizontal compression. Some cells may not experience a high level of strain along their boundaries, but may experience high levels of strain on their internal springs due to diagonal forces. Method 620 may include determining the strain that a cell is under, determining if the strain of a cell exceeds a specified threshold, and prompting the cell to spawn a neighboring cell if its overall strain exceeds that of a specified threshold.

Operation 626 may include computing a measure of boundary strain of at least the first cell and the second cell of the cell of the population. The measure of boundary strain may be referred to as "b_strain." In example embodiments involving cells comprising 4 springs, b_strain may take into consideration the 4 boundary springs on each cell. Operation 626 may include measuring, for each cell, a weighted composite of both the internal strains and the boundary strains. For one embodiment of operation 626, the internal strain of a cell may be given double the weight of the boundary strain when computing the weighted composite strain, as there are only 2 internal springs, versus 4 boundary springs. Another reason for giving the internal strain twice the weight of the boundary strain, may be that internal shear is more critical to the distress of a cell than simple compression or stretching. Shear, or twisting, of a cell may indicate a non-uniform deformation within the cell population. This may correspond to instability, versus uniform compression or stretching, which often corresponds to a loaded, but stable population. In some embodiments, the measurement of overall strain may be represented by the formula strain=(i_strain+2*b_strain)/3.0. At a broader scale, operation 626 may include computing, for each cell in a cell population, a cumulative boundary strain as the sum of the strains of each outer spring. Operation 626 may be performed where the first cell is adjacent to the second cell, along a common growth vector with the second cell, or a combination thereof.

Operation 628 may include computing the average strain of the first cell based on the measured boundary strain of the first cell. Operation 628 may further include computing the average strain of the second cell, based on the boundary strain of the second cell. In the aggregate, operation 628 may include computing a rolling average of several strains on several cells, updated periodically at staggered times in the past. In some embodiments, a set of strains measured with different frequencies in the past may be updated when the cell's age values are multiples of 1, 7, 11, 14, 18, and 20 time cycles, as examples of multiples picked at random. This means, for example, that a strain parameter called "strain6" may be updated each time the cell's age is a multiple of 20; strain5 may be updated when the cell's age is a multiple of 18, and so forth. A time-based average of strain may be computed as the average of strains: strain6, strain5, strain4, and so forth. In other words, rather than continually updating parameter values across all cells in a GBD structure, design platform 105 may form groups of cells and set the parameter value(s) for those groups of cells to only update at given time points, e.g., when the ages of the cells in the group reach a multiple of a number, e.g., 20. At these updates, averages of the parameter values may also be calculated by averaging the parameter values across each group of cells. Cell parameter value averaging may also occur through the use of "reaction", "diffusion", and "sinking" operations, described in more detail at FIGS. 7 and 8. Reaction operations of the design platform 105 may increase a value to a parameter based on stimuli (e.g., applied strain stimuli) and sinking operations may decrease a parameter value. These operations may facilitate having a rolling average of parameter values across one or more cells (or a portion of a GBD structure). As previously discussed in relation to gradient module 233, reducing reaction and sink rates may prompt parameter values of multiple cells to reach an average value, to be over a longer span of time.

One purpose of averaging the strain over time is to mitigate any negative effects from rapid changes in time-localized strains. When multiple cells are added or removed in a single cycle, new energy in the form of initial stretching may be added to a GBD structure in the form of a spike in cell parameter values. This new energy may cause the strain of the entire design to fluctuate emphatically over subsequent cycles, and take on the form of strain waves that move through the cell population. A strain wave may be visible when a cell experiences high strain at cycle N, but passes this strain to a neighboring cell at cycle N+1. This may happen when a cell spawns a neighbor cell on a heavily compressed or stretched boundary. The new cell may experience an instantaneous increase in potential energy that's caused by the difference in the un-stretched resting length and the current length of the boundary at the moment the new cell is attached to the neighbor. During subsequent cycles, the new cell may snap back into non-deformed shape, and pass this deformation on to its neighbors in a wave-like fashion.

Use of the averaging of strain may improve the GBD structure. Otherwise, cells might be removed or added prematurely in areas where a local strain might temporarily exceed or fall below a certain threshold, but might average out to a normal value over time. Averaging the strain may permit the design platform 105 to add and remove cells only where there is a lasting reason for growth or atrophy of the cell structure.

Operation 630 may include prompting cell spawning, fusion, or destruction based on a comparison of the average strain of the first cell relative to the average strain of the second cell. For example, if several gaps were to be found in a cell fabric where cells did not exist, operation 630 may include prompting design platform 105 to create new cells that populate the gap. In other words, operation 630 may include detecting that a cell is undergoing excessive strain on one of its boundaries and prompting spawning of a new cell along that boundary of the original cell. The new boundary cell may help counteract the compression or stretching that the original cell is experiencing, because the new cell may provide an additional boundary spring spanning the two boundary nodes of the original cell. This additional boundary spring along the two boundary nodes may provide double the counteractive force to alleviate the strain.

Alternately or in addition, operation 630 may include prompting cell spawning, fusion, or destruction based on a comparison of the average strain of the first cell to a specified threshold strain. As previously described, design platform 105 may store and manage a collection of predetermined thresholds that correspond to cell spawning, fusion, and/or destruction.

FIG. 6C is a flow diagram illustrating a detailed method 640 of spawning cells, according to one embodiment. Operation 642 may include selecting a cell to process from the set of all cells in a cell structure or population. For the selected cell, operation 644 may include selecting a boundary to assess. Cell spawning may take place in one of the directions orthogonal to a cell's boundaries. For 2D rectangular cell fabrics that span an x, y index space, such spawning may correspond to spawning in the positive and negative x and y directions in the grid, or spawning in 4 directions corresponding to the four boundaries of a square cell or in three directions of a triangular cell. In some embodiments, operation 644 may include evaluating the condition of the modeled spring and modeled damper corresponding to that selected cell boundary. Additional detail for operation 644 is provided at FIG. 6D.

The design platform 105 may use multiple techniques for determining if a boundary exceeds the threshold (operation 646) for spawning a new cell. One technique may involve measuring the strain of the boundary spring and checking if it exceeds a specified threshold such as 1%. Alternately or in addition, design platform 105 may measure and utilize the stress parameter value expressing a level of stress experienced by the boundary spring. If a boundary spring is not exceeding a threshold, but the overall selected cell is in distress, design platform 105 may take into consideration the overall measure of strain on the cell as a composite of all of the individual spring strains as an overriding factor. For example, there may be times when a boundary spring is not very deformed, but the cell may be horribly twisted. Such a cell may be distressed. In these cases, the threshold for spawning a new cell along the boundary may not be met, but due to the overall distress of the cell, design platform 105 may perform operation 646 to spawn a new cell despite the threshold not being met.

If the design platform 105 determines that the boundary conditions for spawning a new cell are met, it may proceed to determine if overall cell-level spawning conditions have been met (operation 648). Operation 648 may involve checking if the cell is fixed, occupying a keep-out region, or if the cell is too young. Furthermore, operation 648 may include ensuring that the cell boundary has no pre-existing neighbor in a given direction.

In some embodiments, design platform 105 may prevent a cell from spawning a new cell (or behaving as a base cell) until it has reached a given age, e.g., an age of at least 20 cycles, where 20 may be a variable value. This way of executing operation 648 may prevent overly aggressive growth of the growth-base design. A newly spawned cell may undergo a high level of strain early in its life, due to the fact that it will have been created along a boundary that is already stretched or compressed beyond the spawning threshold. If operation 648 does not permit time for a new cell to exert its own restoring force to its neighboring cells, a new cell may show an immediate strain that may cause additional cells to be prematurely spawned from the new cell. This can lead to runaway growth of the cell population. By giving a cell some number of cycles to exert a restoring force, a new cell may partially snap back to its resting shape, and so that the early strain measurements of a new cell do not prematurely spawn new cells.

If the conditions for spawning a new cell are met, a new cell may be spawned (operation 650). Operation 650 may include first, attaching a cell to a wall if any of its new nodes penetrate walls. For example, operation 650 may include fixing the position of a node in space (e.g., attaching a node to a fixed wall). As another example, operation 650 may include adding a constraint between the node and the wall such that the node may move with respect to the wall. Additionally, operation 650 may include stitching the new cell to neighboring existing cells, as defined by their proximity in the cell fabric.

Operation 650 may also comprise invoking the physics engine to advance the physical simulation some number of cycles in order to allow or prompt the newly spawned cell to dissipate some of its initial potential energy, caused by the initial spring lengths of the new cell not coinciding with the new cell's spring resting lengths. If the design platform 105 spawns too many cells without advancing the physics engine between each new cell, then the GBD structure being created may build up too much potential energy concentrated in the new cells. Advancing the physics engine (e.g., solving for one or more simulated forces in the design space) may allow the GBD structure to dissipate a new cell's potential energy into some of its neighbors before the design platform 105 spawns cells off of the neighboring cells.

When forces are solved, positions and velocities of the modeled cell material may change. With each iteration of solving for the simulated forces, cells of a GBD structure may move or be modified based on computed positions and velocities. If a simulated force is changed, the cell population of a GBD structure may move until the motion damps out and the GBD structure stops movement or reaches an equilibrium. When a new cell is added to the GBD structure, the cell may pull or push on its neighboring cells—applying forces to them. This push/pull may cause motion, e.g., conversion of the new cell's stored potential energy to kinetic energy, which may dissipate over time steps due to damping in the material represented by the cell. If cells are added to a GBD structure too quickly (e.g., forces from the physics engine are not solved for/applied to the GBD structure enough times between cell additions), a GBD structure may not have a chance to dissipate this energy added from the new cells. When the energy is not given the opportunity to dissipate, motion or kinetic energy may build up in the GBD structure (e.g., as provide by functional processor 205), unleash strain threshold triggers built into design platform 105 (e.g., at threshold module 215), and cause runaway cell creation (e.g., by model creation processor 207).

Operation 652 may include determining if there are more boundaries to process for possible new cell positions. Once all the boundaries of one or more cells of a cell population have been processed, operation 654 may include determining or detecting more cells to process as potential cells to spawn cells from. If more cells are detected, method 640 may repeat operations 642-650 for at least one of the detected cells. Cell spawning may terminate once all the cells of a growth-based model are processed.

Figure 15:
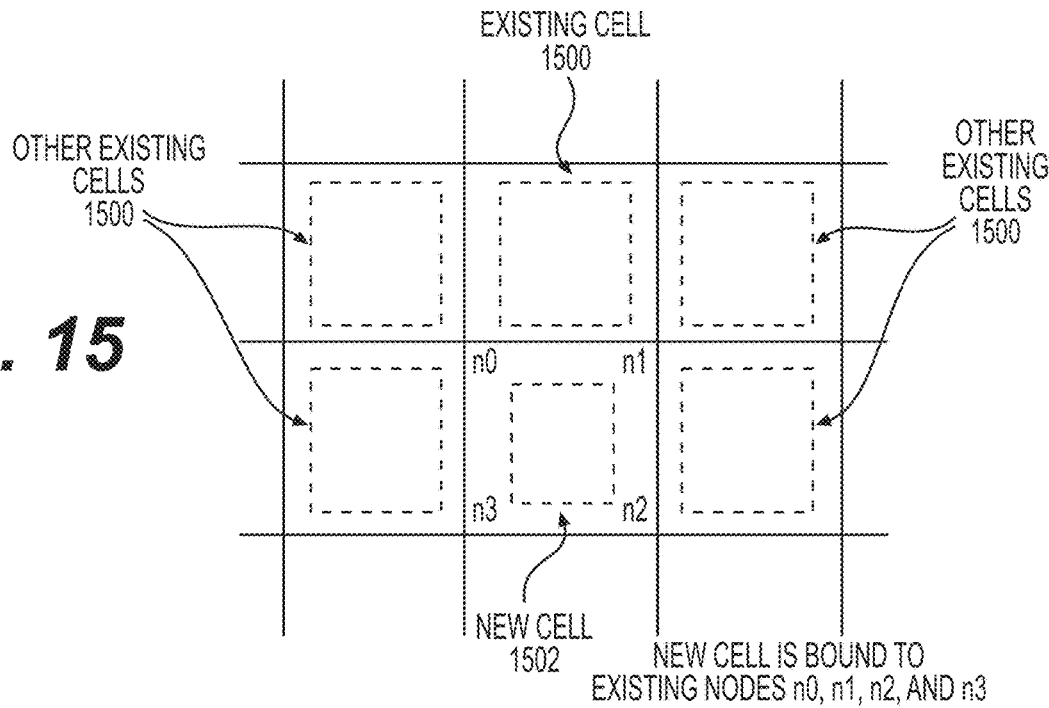
FIG. 15 illustrates one of a number of exemplary existing cells in the process of spawning a new cell along one of its boundaries.

FIG. 6D is a flow diagram illustrating a detailed method 660 of selecting boundaries at which to spawn cells (e.g., operation 644 of FIG. 6C), according to one embodiment. When design platform 105 determines that a cell should have a new cell spawned along one of its boundaries, there are several steps that may take place in order to ensure that the new cell is properly stitched to any existing neighboring cells. Method 660 describes these steps. Operation 662 may include determining a location of an existing, selected cell with respect to a cell fabric. The location may comprise node information (e.g., a node ID) along a boundary of the cell. For example, FIG. 15 provides an illustration of an existing cell 1500 with a boundary defined by nodes n0 and n1.

Operation 664 may then include determining a prospective location in the cell fabric for a second cell, where the prospective location may be adjacent to the boundary of the existing cell. Operation 666 may include detecting if nodes exist at the prospective location. For instance, operation 666 may include querying a cell fabric or accessing an index of a cell fabric to see if nodes (e.g., nodes n2 and n3 of FIG. 15) exist. If the nodes exist, operation 666 may include looking up cells that share the boundaries that would connect the nodes and the boundary of the existing cell (e.g., looking up cells that share the boundaries spanning nodes n1 and n2, the boundary spanning nodes n2 and n3, and the boundary spanning nodes n3 and n0). For rectangular cells, there may be up to 3 existing neighboring cells in addition to the original, existing spawning cell that the new cell must be stitched to.

Operation 668 may then include spawning a new cell at the prospective location. Operation 668 may involve stitching the new cell to the existing cell. This operation may involve first creating the new cell such that it shares any existing nodes (e.g., n0-n3 of FIG. 15), and second, marking the existing cells and the new cell as neighbors. This marking may be performed by updating the cell fabric with new node IDs or cell IDs to indicate the relation between the new cell and the existing cell(s).

If no nodes exist, operation 670 may include finding new node(s) at the location or creating node(s) in the cell fabric. Design platform 105 may determine the cell fabric locations of these nodes, without actually creating the nodes and storing them in the cell fabric. In some embodiments, design platform 105 may store a map in each cell containing nodes as keys and neighboring cells as values. Such a map may enable a cell to quickly determine if a neighboring cell exists along any boundary corresponding to a selected node ni, where the assumption is that a neighboring cell will span nodes ni and neighboring node nj, moving in a clockwise direction with respect to one face of the cell along a growth vector.

FIG. 6E illustrates a method 680 of selectively destroying cells, which may correspond to operation 426 in FIG. 4B. In example embodiments, design platform 105 may provide a modeling environment or design space with several types of more aggressive or less aggressive cell destruction behavior, depending upon the time progression of a given simulation or input from a user. Early in the GBD structure growth process, cell destruction may inhibit the formation of basic cellular connecting structures among walls and forces. During this time of the simulation or "life" of a GBD structure, design platform 105 delay aggressive cell destruction processes until some threshold indicating adolescent maturity of the GBD structure has been met. In some embodiments, this value may be a fixed amount of time having passed, or in another embodiment, aggressive cell destruction may be prompted when design platform 105 detects that average age of cells in the population has reached a predetermined age or a target location has been reached.

Once cell destruction has begun, there may be varying degrees of aggressiveness that the cell destruction process may have in pruning the cell population in each cycle. One embodiment of method 680 may include initiating aggressive pruning of a GBD structure. This may include setting a low cell destruction standard, so that with each simulation cycle, many cells are destroyed. The cell destruction standard may simply refer to conditions that are met for a cell to be destroyed. For example, design platform 105 may designate, at the cell destruction standard, that the bottom 5% least strained cells be destroyed during a simulation cycle applying stress/strain forces to the GBD structure. Aggressive pruning may cause the structure of a GBD structure to wretch violently in the course of simulations (e.g., stress/strain simulations) since the structure may buckle from the loss of strength that comes with cell loss, and then spring back as cells are spawned in response to the strain on the existing cells.

Another embodiment of method 680 may include setting a high cell destruction standard, entailing a scenario where it may rare for a cell to be destroyed. For this type of case, only a small percentage of least strained cells may be destroyed in a simulation cycle. One example may include, design platform 105 designating the cell destruction standard as, the bottom 0.2% of least strained cells be destroyed during a simulation cycle applying stress/strain forces to the GBD structure.

Yet another embodiment of method 680 may include combining a violent and aggressive cell destruction process with an aggressive cell spawning process. For example, a low cell destruction standard (e.g., destroy bottom 10% of least strained cells) may be combined with an aggressive cell spawning process (e.g., spawn cells for 10% of most strained cells). The rapid and simultaneous creation and destruction of cells may cause strains in the system to "flow" rapidly. This may create a robust cell population, better geared towards supporting the loads imposed on the GBD structure. In other words, the fluctuating cell population from such an embodiment of method 680 may better handle dynamic forces than populations that are relatively static.

Method 680 may further include varying levels of aggression for cell destruction during the process of generating a GBD structure. For example, a phase of low aggression cell destruction may follow a stage of highly aggressive cell destruction. For this type of case, the highly aggressive cell destruction stage may test and shape the general structure of a GBD structure, and the low aggression stage may trim the design to remove cells that have least strain. The lower aggression phase may permit the dynamic waves of strain of the aggressive cell destruction phase to settle, and to dampen out some of the energy introduced in the cell population during rapid addition and removal of cells. The resultant GBD structure may thus be strong but efficient, not retaining cells that are not supporting much load bearing.

Finally, method 680 may include a "cleanup" or "scavenger" phase of cell destruction, whereby only a small percentage of cells is culled in each cycle. During this phase, the GBD structure may have reached equilibrium, and design platform 105 may work to "neaten" the structure. For example, areas where "honeycomb" gaps exist may be hollowed out so that the structure takes on a cleaner form.

Method 680 describes a process of destroying cells based on a parameter involving strain: computing the sorted map of cell strains (682), computing the level of destruction aggressiveness (684), computing the quantity of cells to destroy this cycle (686), destroying cells with low strain (688), destroying cells with excessive strain (690), destroying cells in keep-out regions (692), and destroying cells in honeycomb regions (694). The parameters may also be combined to form a complex set of conditions for destroying cell(s).

The operation of computing the sorted map of cell strains (682) may involve determining a value denoting strain for a given cell of a cell population. Operation 682 may include updating the strain value for each cell at a selected time and ranking the cells by their strain value. For example, operation 682 may include creating a sorted array of strain values, with each strain value corresponding to a cell. The strains may be sorted from most strained to least strained. A number of different measurements for cell strain may used.

Computing the level of destruction aggressiveness (684) may include determining the percentage of cells or a number of cells that may be destroyed in a single cycle. A simulation may include several phases of applied forces or triggers that may cause the model to change. If the time is prior to initiation of an aggressive cell destruction phase, operation 684 may include setting an aggressive cell destruction threshold value at 0. During an aggressive cell destruction phase, operation 684 may include setting this value at a maximum of 0.5% of the total cell population. During a slow cell destruction phase, operation 684 may set a cell destruction threshold as a fixed number of cells, rather than a percentage of cells. One example of a fixed number cell destruction threshold is setting the threshold as a maximum of 3 cells destructed per cycle. During passive cell destruction, this value may be a maximum of 1 cell per cycle. Computing the quantity of cells to destroy in a cycle (686) may comprise using the measure of cell destruction aggressiveness obtained in operation 684, the existing computed or received cell strain values from operation 682, and the total number of cells, to determine a maximum number of cells to destroy.

Destroying cells with low strain (688) may comprise selecting a subset of cells from the sorted map obtained in operation 682. In some embodiments, if the maximum quantity of cells to destroy is N, operation 686 may include selecting the N least strained cells from the map, and beginning with the least strained member of this set, destroy the cell if its value of strain is lower than a threshold. In some embodiments, this threshold may be 0.01. Moving from least the strained to the most strained cell in this set, operation 686 may include evaluating, one-by-one, if a cell should be destroyed.

One embodiment of destroying cells with excessive strain (690) may include selecting a subset of cells from the sorted map obtained in operation 682, whereby the strain must exceed a specified threshold. In some embodiments, this strain threshold may be 11%, or 0.11, and all cells whose strain exceeds this threshold may be destroyed. This operation can provide a means of slicing out "out of control" cells whose high strain may cause a cascade of uncontrolled growth. This process may remove dangerous cells early so that they can be replaced when the GBD structure has settled towards or reached a state of equilibrium. Highly deformed cells may be unable to return to a less deformed shape without exerting violate strain wave through a GBD structure, so one embodiment of operation 688 may include removing highly deformed cell(s) early in the growth process of a GBD structure.

Destroying cells in keep-out regions (692) may include evaluating each keep-out region with respect to each cell to determine if the keep-out region applies to the cell. A number of different test formulas may be employed by keep-out regions in general to indicate if a cell lies within a region. In some embodiments, a keep-out region may comprise a location in space, along with a shape function such as a circle or rectangle, for example. A cell may fall within a region if its current location falls within the shape. In another embodiment, a keep-out region may have a location specified with respect to a cell fabric (i.e., have an x, y, z index in the fabric). In such a case, a cell's location in the fabric may be used to determine if the cell should be removed.

Figure 18A:
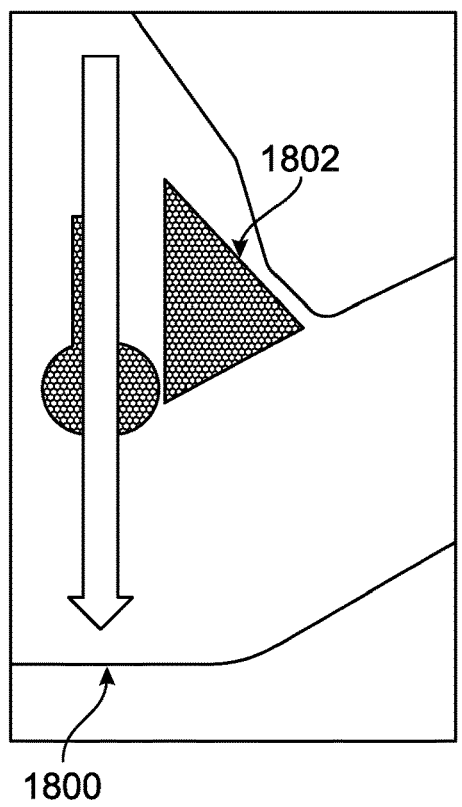
FIGS. 18A and 18B depict an exemplary GBD structure undergoing cell destruction.
Figure 18B:
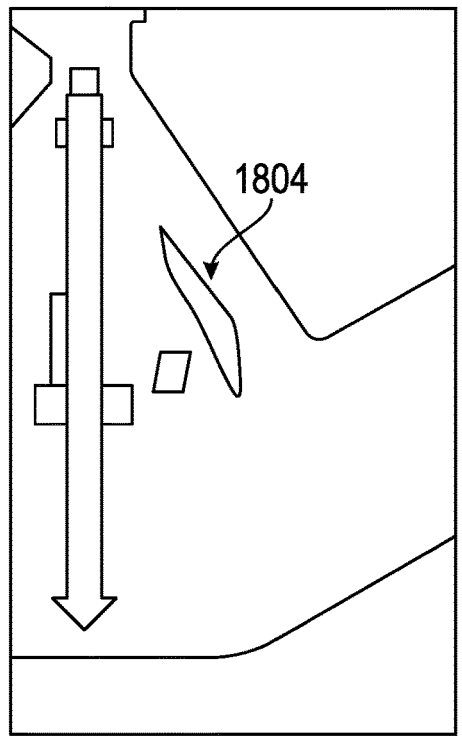

Operation 692 may also select cells as candidates for destruction in keep-out regions by first sorting the cells by their age. In some embodiments, cells may be added to an array as they are created. Some embodiments of operation 692 may include destroying by their age (e.g., destroying older cells prior to destroying younger cells). Selecting oldest cells first as candidates for keep-out region destruction may provide good results because older cells may more likely be located near the core of growth structures. In the same way that a structure grows from the inside towards the outside, cell destruction in keep-out regions may take place from the inside towards the outside as well. In some other embodiments, the operation 692 may include selecting cells as candidates for destruction using a random selector. In yet another embodiment, operation 692 may include selecting cells that have no neighboring cells. For example, as illustrated in FIG. 18A, GBD structure 1800 may have a honeycomb region 1802 comprising several small cavities between cells. Destroying cells in honeycomb regions 1802 may include selecting cells as candidates if it is determined that they have no neighbors. A cell may have no neighboring cells, yet, still be attached at its corners, forming a honeycomb or checkerboard-like structure. Destroying cells in honeycomb regions 1802 may be triggered during the "cleanup" or "scavenger" stage of cell destruction whereby it may be desirable to clean up a cell structure so that it becomes more suited to manufacture. A structure that is potted with small holes is generally harder to manufacture than a contiguous structure. This may lead to the removal of cells attached to neighbors only at corners, and not along edges. As the cells are removed, the neighboring cells take up the increased loads and may spawn cells—potentially resulting in larger holes. FIG. 18B illustrates the same GBD structure region shown in FIG. 18A after operation 694 has caused the cleanup of the honeycomb region 1802, leaving a larger cavity 1804.

FIGS. 3A-6E describe the mechanics for GBD structure, from the creation of the designs, to applications of physics-based simulations to the GBD structure, and the cell actions that may occur in response to the simulations, according to exemplary embodiments. FIGS. 7 and 8 describe processes that may follow the parameter value changes that are brought on by responses to stimuli. Such processes may ensure stability in a forming GBD structure and that parameter values for each cell are interlinked with its neighboring cells. Such methods may further allow the parameter values to be continually "reset," rather than being constantly increasing (or decreasing) in the course of a design process. FIG. 7 discusses, at a general level, a method 700 underlying the automatic generation of a growth-based model. FIG. 8 describes a method 800 for calibrating and "resetting" the automated processes performed by design platform 105. In particular, method 700 of FIG. 7 describes a "diffusion" process of adjusting parameter values across a cell population and method 800 of FIG. 8 describes a "sink" process.

Method 700 of FIG. 7 includes identifying a first cell (702), and determining a first value of a parameter (e.g., a strain parameter) for the first cell (704). Neighboring cell(s) of the first cell may then be determined (706) and a value for the parameter may be determined for each of the neighboring cell(s) (708). For example, a strain parameter value may be determined for each of the neighboring cell(s). Operation 710 may include computing a cumulative value of the parameter based on the values of the parameter for the neighboring cell(s). For example, operation 710 may include computing an average boundary strain value surrounding the first cell by averaging the determined strain parameter values of the neighboring cell(s). If the cumulative value is higher than the fist value of the parameter (of the first cell), the first value of the parameter may be increased (operations 712 and 714).

As previously discussed, cell spawning and destruction may be related to strain on the modeled cell. Method 800 of FIG. 8 includes steps for a "sink" process, according to an exemplary embodiment. In some embodiments of the "sink" process, the values of parameters in cells may be reduced in order to systemically remove parameter changes caused by the reaction process. For example, if a reaction process causes parameter values to increase over time, the "sink" process systematically reduces the parameter values to model the GBD structure responding to the reaction and thus reducing the effect of the reaction over time. For example, once cell parameter values have been updated in response to a reaction, the design platform 105 may spawn new cells, kill existing cells, and modify the connections of these cells with neighboring cells and supporting structures. One purpose of the sink process's secondary modification of parameters based upon the values of the same parameters in neighboring cells may be to average or damp out the immediate changes to cell parameters based upon changes in stimuli. Another purpose may be to allow responses to stimuli to propagate through a cell population. For example, if a cell updates by dramatically increasing its strain parameter, the diffusion and decay into other cells may serve to signal to neighboring cells a high strain. This may enable the GBD structure to effect cell growth in a general area where a single cell may experience a high strain. By increasing the diffusion rate upon each frame tick, this signal may be propagated to a wider area of neighboring cells spurring a more regional growth. Alternatively, by increasing the decay rate of the strain chemical parameter, the size of the signal area may be reduced causing a more localized growth. In some embodiments, the value of a parameter may be reduced by a percentage, while in another it may be reduced by an absolute amount. The amount of the reduction may be controlled by a "sink rate" coefficient.

Steps for performing the "sink" process may include, for example, identifying a parameter value that increases over time (operation 802), determining a parameter value reduction and a time frame for the determined reduction (operation 804), and applying the reduction to one or more cells of a GBD structure, based on the time frame (operation 806).

Method 900 of FIG. 9 describes a process of finalizing a GBD structure, according to one embodiment. In particular, method 900 describes voxel fairing. Voxel fairing may include an approach to applying a pseudo-smoothing algorithm to a model comprised of voxels that serves as a step in between the raw voxel format of the GBD structure and a fully smoothed form of the GBD structure. The algorithm may analyze each point and its neighboring points to create a geometric mesh of triangles around the outside of the voxels with "fabric-oriented," "slant," "corner," and/or "inverse corner" triangles filling in areas of the raw voxel model to provide a smoother model that retains the features of the original model. FIG. 21K shows an example of a model that underwent the process of voxel fairing. Model 2180 is an exemplary model prior to a fairing process, and model 2185 is model 2180 after fairing. The model may be represented by a grid of points, as shown by FIG. 21L.

The following embodiments may improve the current smoothing methods by applying a rough stage of pseudo-smoothing to an original raw voxel model while preserving features desired in the end model. When current smoothing methods are applied to this "faired" model, the result may be a cleaner model that retains feature size better than applying the smoothing method to the raw voxel model.

It may be advantageous to bring the generated parts from their initial voxel-based format into a smoother format for production and use by the end user. Current methods of smoothing cannot smooth raw-voxel models to a desired level while still retaining its features. Current smoothing methods render methods that either still had an undesired roughness or had features of the original model that were worn thin by the algorithm over too many iterations.

Figure 22:
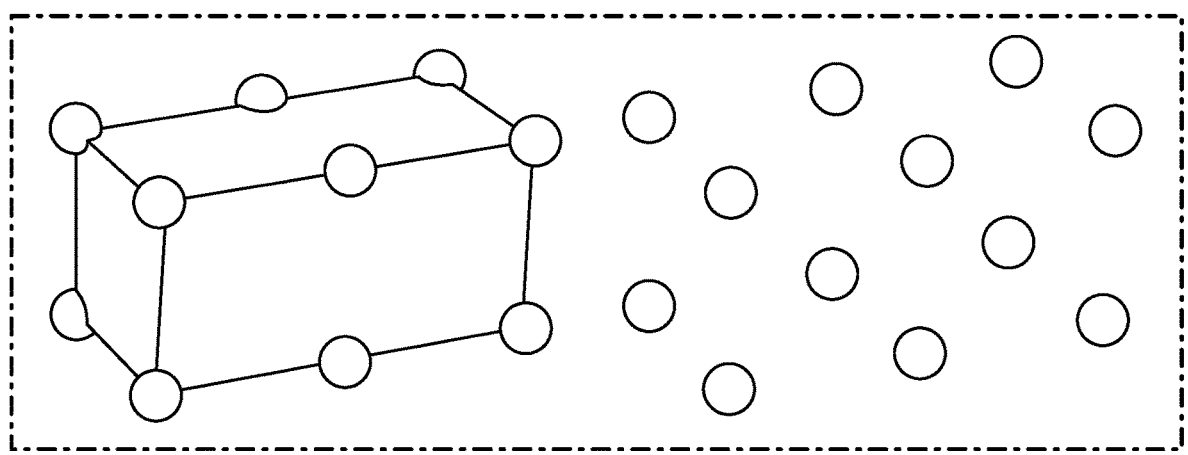

In some embodiments, method 900 may include receiving a growth-based model (902). The received growth-based model may then be converted into a model expressed in a raw voxel format, and the raw voxel format may include points that represent the vertices of each voxel (904). In particular, the raw voxel format of the GBD structure may be represented by a 3-dimensional set of points that represent the vertices of each voxel. Where two or more voxels meet (on faces, edges, or corners), the shared vertices may be represented by a single point. For example, if there were two voxels side by side, connected by a face, four of the points may be shared, resulting in a representation of 12 points in total (illustrated by FIG. 22).

Figure 23:
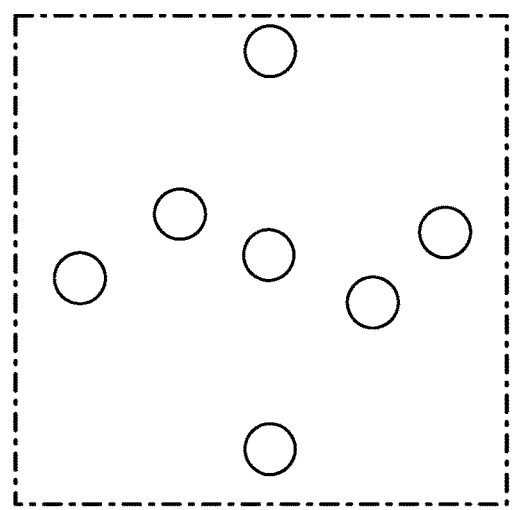
Figure 24:
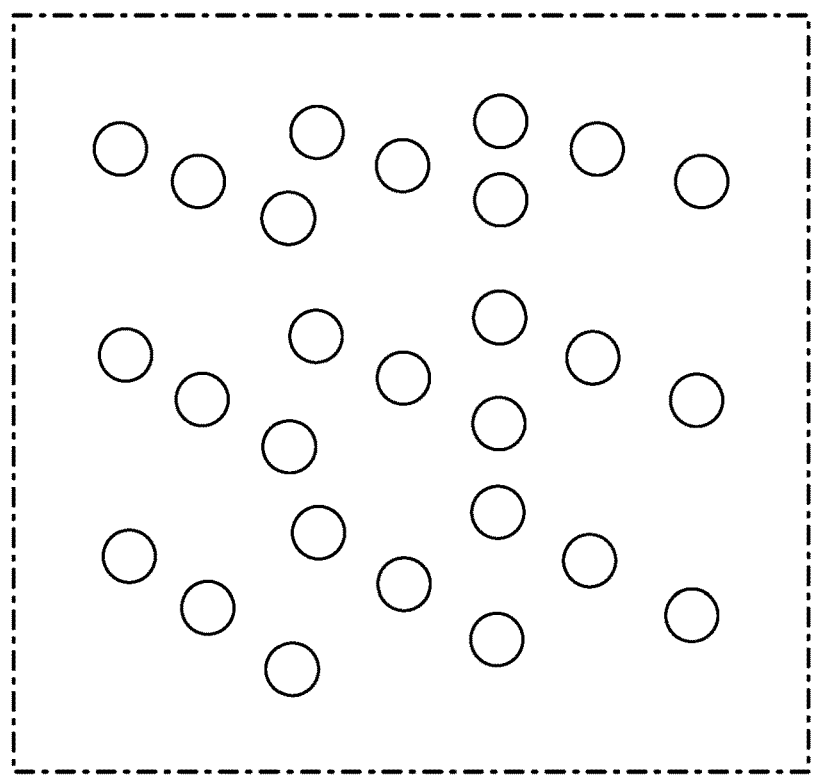

One or more geometric triangles may be detected in the raw voxel format of the received model (906), and an updated model may be generated by removing or stripping the detected geometric triangles from the model (908). For each vertex of the raw voxel updated model, a determination can be made as to whether vertices exist in each cardinal direction from the (current) vertex (910). For example, each point in the model may be evaluated to decide where to place the geometric triangles. The evaluation may entail analyzing positions neighboring that point. The initial point being evaluated for operation 910 may be referred to as the "base point." This is shown in FIG. 23, which illustrates the point being analyzed and the 6 neighboring points. After a neighbor is selected for analysis, the analysis continues to evaluate all the points in the immediate area surrounding the base point (e.g., as shown in FIG. 24). Some of these reference positions may or may not be active points in the grid (e.g., cell fabric). Information regarding what points neighbor the base point may be analyzed to decide what triangles to place (if any) that may connect to the base point being analyzed.

As the algorithm cycles through all points in the model, (Base Point) and all surrounding points may be analyzed to decide where to place triangles. In some embodiments of operation 910, points that are in the ±x, ±y, or ±z directions from the base point and are 1 unit away from the base point are defined as the "neighbors" of the base point. Points in a combination of the ±x and ±y, ±y and ±z, or ±x and ±z directions from the base point may then be known as "diagonals" of the base point. These points may be at a distance of √2 units from the base point. Points in a direction comprised of all 3 axes may be "opposite points" to the base point and are at a distance of √3 from the base point. These sets of points may then be used to determine where to generate triangles. There may be four types of geometric triangles the algorithm generates as it loops through the points: Fabric-Oriented, Corner, Inverse Corner, and Slant. The Fabric-Oriented Triangles are comprised of two types: Normal and Abnormal.

Figure 25:
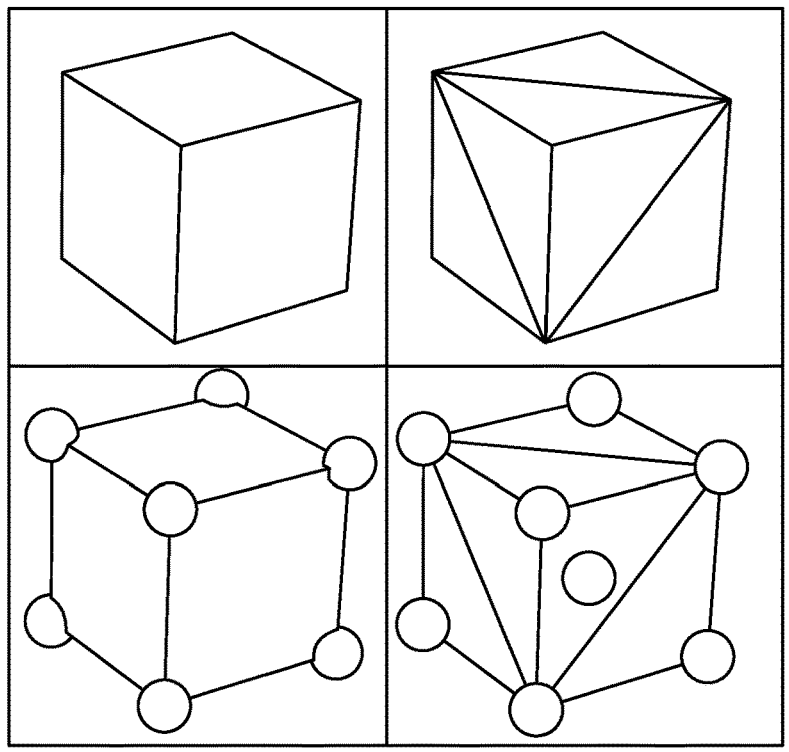
Figure 26:
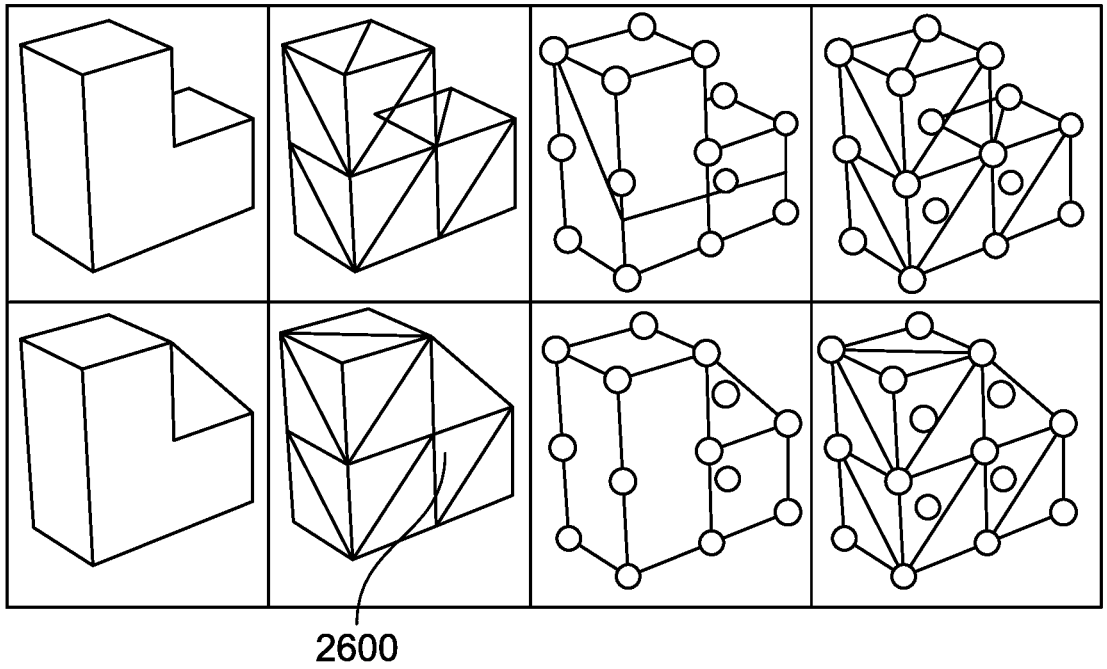

In some embodiments, Fabric-Oriented Triangles (FOTs) may be placed between 3 points that all lie on the same plane (x-y plane, y-z plane or x-z plane) during the fairing process. This means that the normals of all FOTs may be in the cardinal directions from the base point. FOTs may be generated on faces of voxels in pairs. Alternately or in addition, FOTs may spawn in between voxels (as in FIG. 26) or leave one of the two triangles that would normally spawn out due to other types of triangles spawning. In these cases, there is a potential to spawn Abnormal FOTs, which have their normals swapped from Normal FOTs. FIG. 25 is an example of a set of Normal FOTs, while FIG. 26 has a single Abnormal FOT 2600 in it on the side of a Slant.

When operation 910 prompts generation of an FOT, it may analyze each neighbor point. Based on the cardinal direction of the neighbor point, another neighbor point may also be analyzed, and a triangle leg may be specified. In some embodiments, if the neighbor lies on the x axis (either positive or negative) in relation to the base point, the leg may be chosen to lie on the z axis (also either positive or negative) in relation to the base point. If the neighbor lies on the y axis, the leg may be chosen to lie on the x axis. If the neighbor lies on the z axis, the leg may be chosen to lie on the y axis. With each attempt, operation 910 may prompt spawning of 4 triangles: 2 with the legs going in opposite directions (i.e., + and −z direction if the neighbor lies on the x axis from the base point) with the triangle normal being the cross product of the neighbor and the leg (Normal FOT) and 2 with the same leg directions, but with the normal reversed (Abnormal FOT).

In some embodiments, Normal FOTs may generate if the points in the normal direction if the base, neighbor, and leg points are all nonexistent, e.g., the face is open, or if the point in the normal direction of the base is open and the point in the diagonal direction of the neighbor and leg combined from the base point is open, e.g., there is a slant, corner, or inverse corner that needs its sides filled in that location. In some embodiments, Abnormal FOTs may generate in non-standard cases (Sides of slants or Inverse Corners, Corners and Slants cutting through faces). In these cases, the point in the normal direction from the base point may be clear. Then there may be a choice: Either the point in the diagonal direction lying on the face of the potential FOT may be clear or the points in the normal direction of the leg, neighbor, and the diagonal that does exist are clear.

Figure 27:
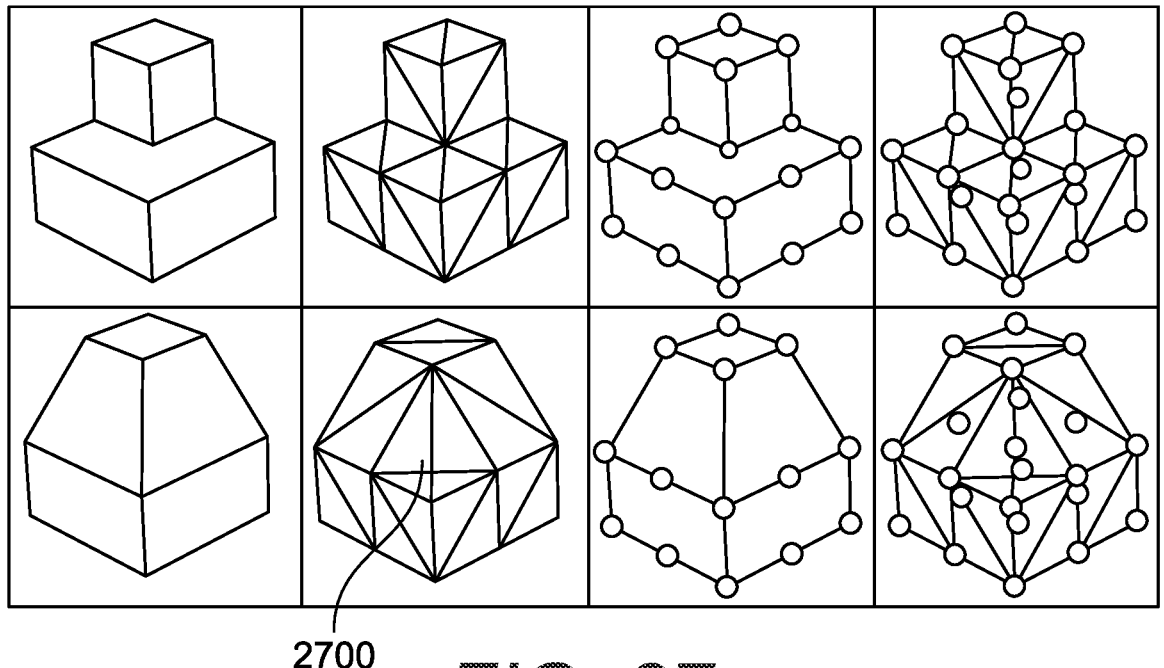

In some embodiments, Corner Triangles may be generated in between 3 points that branch off in the 3 cardinal directions from a base point. The x/y, y/z, and x/z directions of the neighbors may be each added together to obtain the 3 diagonals from the base point. The opposite point being analyzed in this case may lie in the direction of all 3 neighbor directions added. If there are points in each of the 3 cardinal directions from the base, no more than 1 diagonal point, and no opposite point, the Corner Triangle can spawn. The normal of this triangle may point away from the base point. An example of this is shown in FIG. 27, where the base point is the point that all 5 voxels share. The 3 points being used to generate the Corner Triangle 2700 in this example are in the −x, +y, and +z directions from the base point. There is 1 point in a diagonal direction from the base point, and it lies at the −x, +z position. The −x, +y and +y, +z diagonals remain without points. Additionally, there is no point opposite the base point. These conditions allow a Corner Triangle to spawn.

Figure 28:
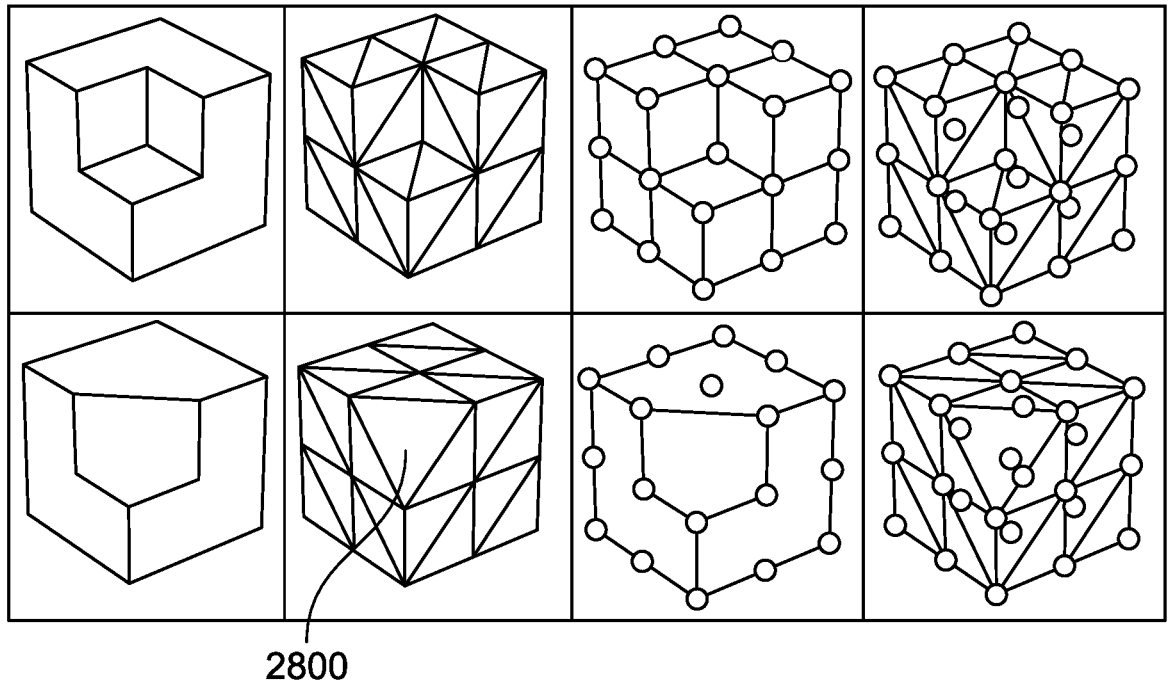

Inverse Corner Triangles may be generated, in some embodiments, when a base point has 3 neighbors −1 of each axis—like with the Corners, but also has all 3 diagonals corresponding with these neighbors, but no point opposite the base. This is demonstrated in FIG. 28. The base point may be the point that is shared by all 7 voxels in this figure. It has points in the −x, +y, and +z directions as well as in the directions of all 3 diagonals. Because the 8th voxel is missing, there is no point opposite the base point. These conditions may allow an inverse triangle 2800 to spawn where the voxel is missing.

Figure 29:
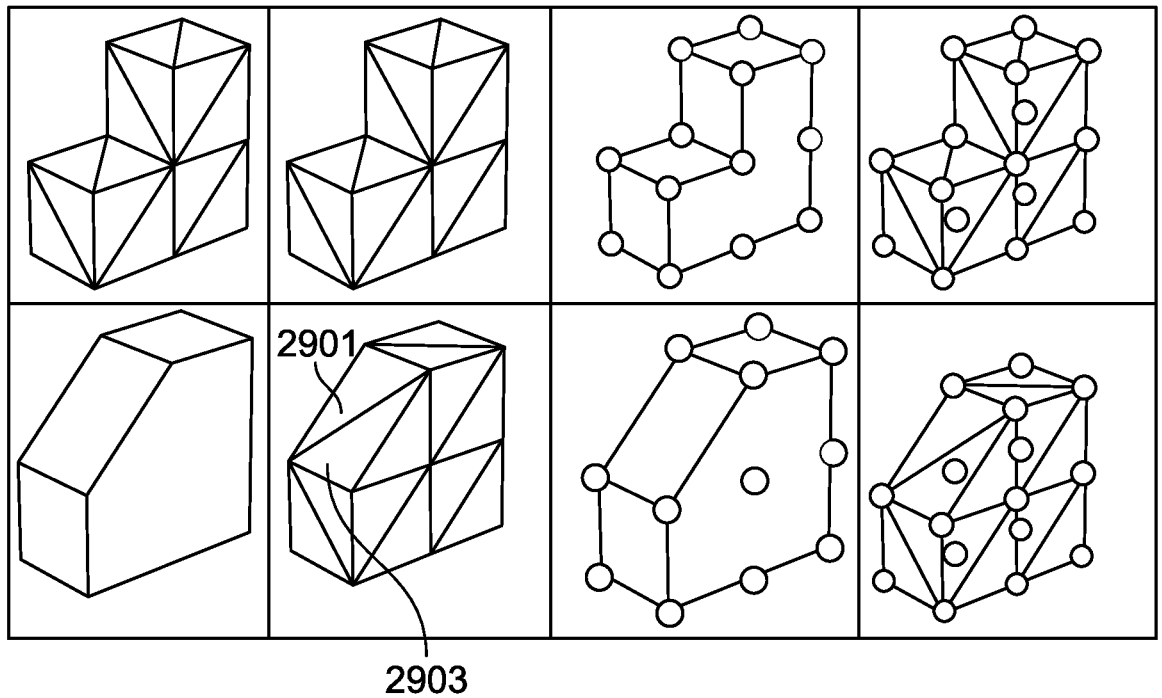
Figure 30:
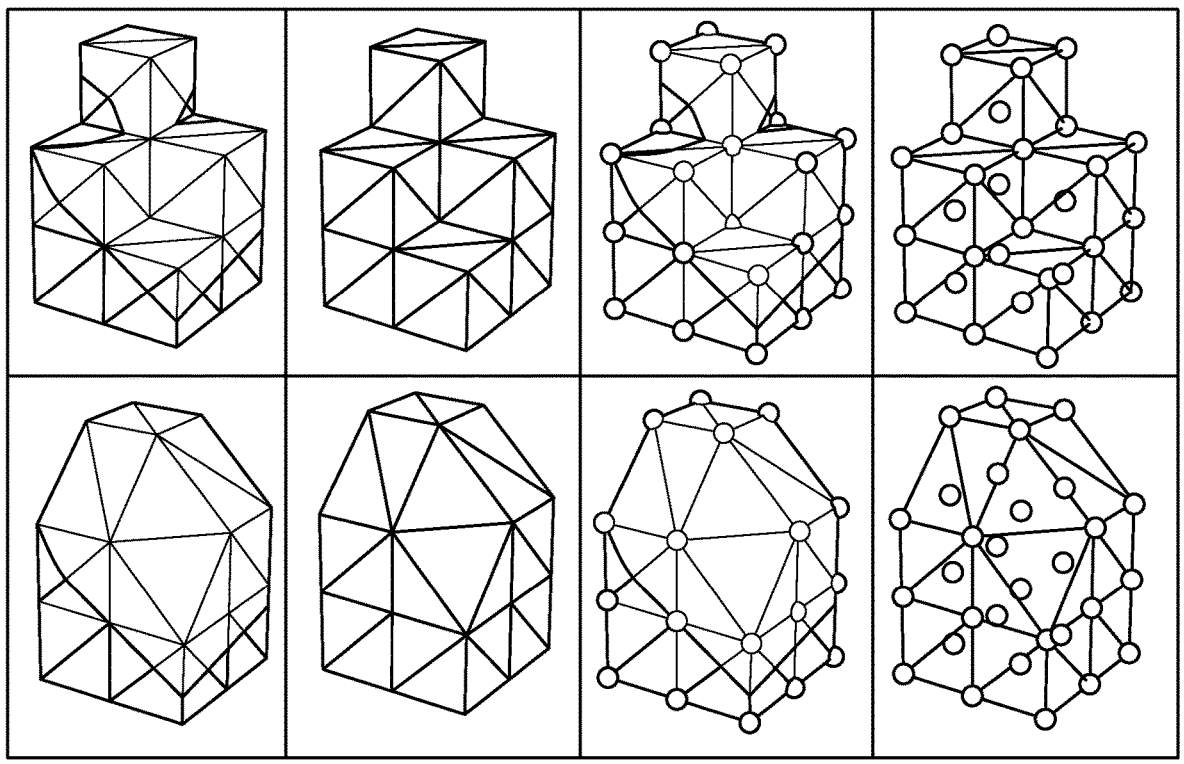

Slant Triangles may be the most complicated to spawn. Each slant may be comprised of 2 triangles, each with distinct base points. In these cases, the base points may be part of the triangles being generated, like the FOTs. Depending on the direction of the neighbor being analyzed from the base point, the design platform 105 may choose a "slant direction," which may be any of the 4 cardinal directions perpendicular to the line created between the base point and the neighbor. The 2 remaining directions that are perpendicular to the base/neighbor lines and the base/slant lines may be the "cross directions." For a single slant triangle to spawn, the points in one of the slant directions above the base point and the neighbor may be unoccupied (or absent of an existing point/triangle). Additionally, the points in the cross direction from the base point and the neighbor point may be filled, as well as the points in the slant direction from those positions (otherwise referred to as the "slant/cross directions" from the base and neighbor). If these conditions are met, a triangle may be generated between the base point, the neighbor, and the point in the cross direction plus the slant direction from the base point. Using this logic, as more base points are analyzed, the other half of the slant may be filled in. FIG. 29 illustrates one behavior used to generate slants. FIG. 29 includes two slant triangles, the back top left one 2901 and the front bottom right one 2903 as viewed. For reference, the point lying at (0, 0, 0) may have the lowest x, y, and z values on the figure, which may be the bottom left back point. Starting with the back top left slant triangle, the base point may be at (1, 2, 0) from the origin and the neighbor being analyzed may be the +z neighbor at (1, 2, 1). The "slant direction" in this case may be the vector <−1, 0, 0>, and the "cross direction" may be the vector <0, −1, 0>. In this example, the points in the slant direction from the base and the neighbor may be unoccupied, while the points in the cross direction and slant/cross direction from the base and neighbor may be filled. This may allow a triangle to spawn between the base, neighbor, and the point in the slant/cross direction from the base. For the other triangle, the base point may be at (0, 1, 1), its neighbor direction may be in the −z direction, so the neighbor may be at (0, 1, 0). The slant direction may be <0, 1, 0> and the cross direction may be <1, 0, 0>. The points in the slant direction from the base and neighbor may be empty while those in the cross direction and the slant/cross direction from the base and neighbor may be filled. This also may also allow a triangle to spawn between the base, neighbor, and the point in the slant/cross direction from the base. This shows that to generate a full slant, operation 910 may include analyzing 2 different bases. FIG. 30 depicts a simple scenario where each type of geometric triangle may be used in standard rendering and wireframe, with and without points visualized. The top shows an example of the raw voxel format, the bottom shows an example of a faired model. The voxel fairing smoothing process may be applied to any structures, including gradient meshes, e.g., cylinders, right prisms, and sphere geometries.

For operation 912, a faired mesh may be generated based on the updated model (of operation 908) and the inserted triangles (of operation 910).

FIGS. 10A and 10B illustrate configurations of cells within a design space. Example embodiments may provide a grown structure within the design space, the structure comprising a set of cells. FIG. 10A illustrates a set of cells 1010 positioned relative to a cell fabric 1005. The cell fabric 1005 may impose an ordered structure upon a population of cells. In this example, cells form a planar rectangular grid. FIG. 10B illustrates a set of cells 1020 aligned with a rectangular cell fabric, and also displays corner nodes and both internal and boundary springs of cells.

FIGS. 11 and 12 depict a base cell 1106 storing a fixed vector as the growth direction 1110 to create a new base cell. One neighboring cell may be created in the upwards direction, while another neighboring cell may be created in the horizontal direction. Over time, the collection of new base cells may form a line that matches the specified direction 1110. FIG. 11 illustrates the step-wise nature of a base stem, where cells may be created sometimes upwards and sometimes horizontally to track the growth direction. In another embodiment, a base stem may follow a step-wise trajectory in three directions, e.g., x, y, and z directions.

FIGS. 13A and 13B illustrate lateral 2D views of cell bodies 1320, 1330 (e.g., a GBD structure) growing from a respective wall 1304, 1305 in further examples. Here, as in FIG. 11, base stems may be grown from an initial seed base cell attached to a wall. In the first case, the direction of growth was designated to be a vector pointing upwards, whereas in the second case, the vector points downwards. The direction of growth may be fixed, but it may also change over time in cases where a base cell stem is tracking towards a moving target, such as the base cell at the tip of another base stem.

FIGS. 13A and 13B also illustrate how cells near the root of a base stem may spawn new cells in order to reduce the level of bending in the stem, due to a force (e.g., gravity) pulling downwards on all of the cells. The first frame of each of FIGS. 13A and 13B shows that cells towards the base of the stem may begin to experience higher strain due to bending, as the stem may grow outwards from the wall. Base stems may grow outwards from a base cell. Base stems may also grow thicker or prompt creation of more stems as a means of resisting bending and collapse.

FIG. 14 is a lateral 2D view of a population of cells (e.g., a GBD structure) 1400 displayed with only their boundary and internal springs. The cells experience varying levels of strain, where some portions experience varying degrees of stretching 1420, while other portions experience varying levels of compression 1430. The upward forces 1450a-d applied to certain cells in the population are causing the upper cells to experience horizontal tension, while the lower cells are experiencing horizontal compression.

Figure 16:
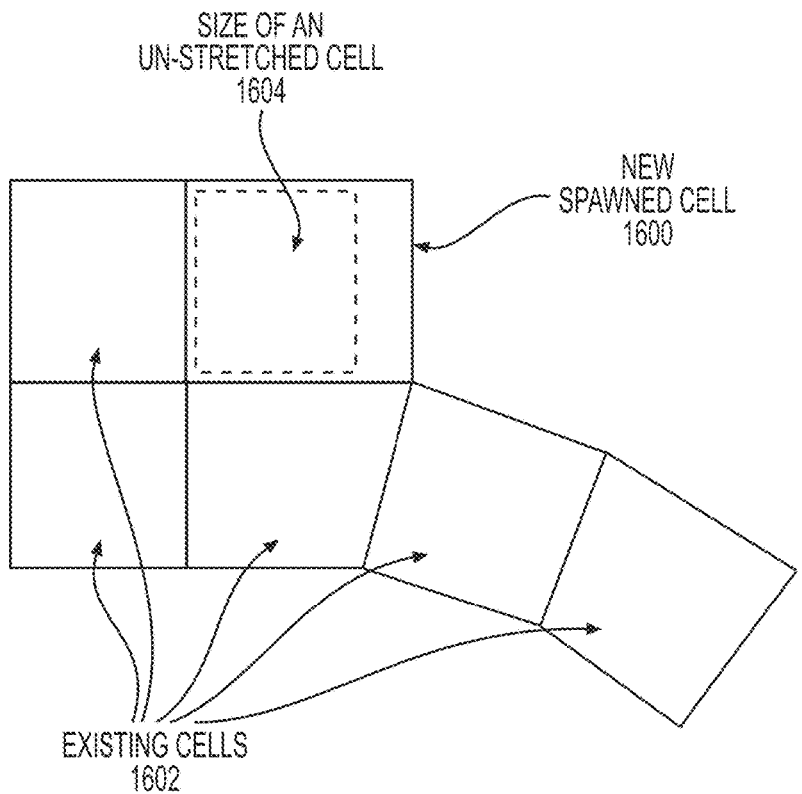
FIG. 16 illustrates exemplary cells undergoing a strengthening operation.

FIG. 15 illustrates a potential cell spawning space in a cell fabric and FIG. 16 illustrates cells undergoing a strengthening operation. In particular, FIG. 16 illustrates the difference between the deformed state of a newly spawned cell 1600 relative to other existing cells 1602, versus an unstretched cell 1604. When a new cell is spawned, design platform 105 may note the boundaries of the new cell as the resting lengths of its already stretched neighbors' boundaries, or it may record parameters of the new cell boundaries according to a uniform default resting length. The latter may cause a newly spawned cell to have an instantaneous initial amount of stretch or compression potential energy relative to its neighbors, whereas the former case may result in new cells that have no initial stored potential energy.

Figure 17:
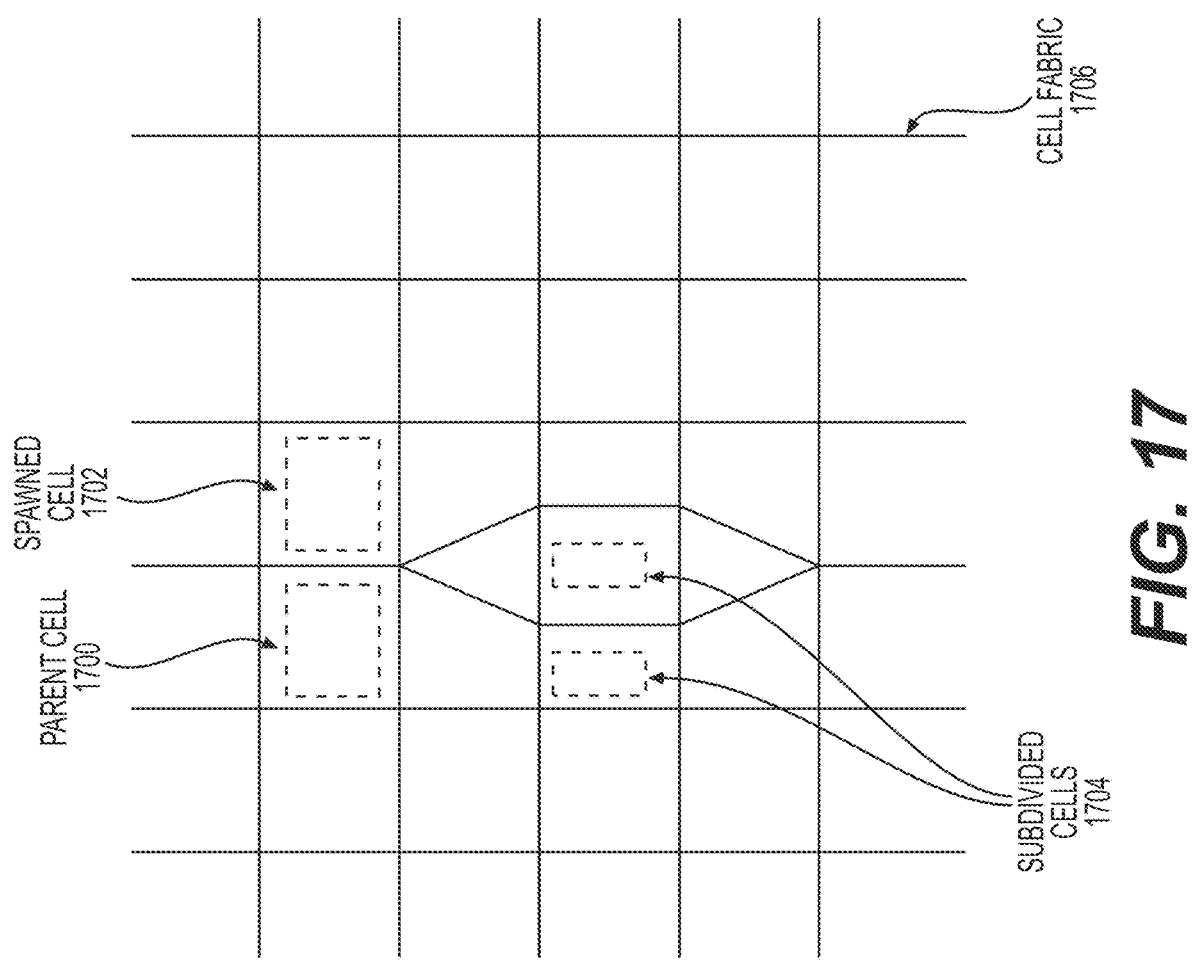
FIG. 17 illustrates an exemplary cell division process.

FIG. 17 illustrates a cell division. In addition to or instead of supporting the spawning of new cells, design platform 105 may also provide cells that may be divided into two cells. As a prerequisite for such a cell, design platform 105 may define a cell fabric that may allow insertion of cell slots. For such an example, if a cell divides along its vertical axis, the underlying cell fabric may have the capability to support the addition of a new slot next to the existing slot. FIG. 17 illustrates the difference between a parent cell 1700 that spawns a new neighbor 1702 into an empty neighboring slot versus a cell that splits into two adjacent cells 1704. In the latter case, the design platform 105 may prompt a cell fabric 1706 to split, in order to accommodate the additional slot. Splitting a fabric may entail the design platform 105 designating a flexible indexing mechanism for the cell fabric 1706, where indices may be inserted into the fabric.

FIGS. 18A and 18B illustrate a GBD undergoing cell destruction, as previously described. FIGS. 19A-19J illustrate a sequence of growth and modification of GBD structure in an example embodiment. The sequence may be exhibited by a system 100 and/or design platform 105 implementing some or all of the processes and features described above. In FIG. 19A, a GBD structure 1902 begins as two separate cell populations, each attached to a respective wall 1904a-b, and programmed to grow toward a central target location 1906 between the walls 1904a-b. A process such as the growth process 520 (FIG. 5B) described above may direct such growth. In exemplary FIG. 19B, the GBD structure 1902 fuses together at the target, and a force 1910 is applied to the GBD structure 1902 at the target location. In exemplary FIG. 19C, two keep-out regions 1920 are introduced, which prohibit occupation by the GBD structure 1902. In response, as shown in exemplary FIG. 19D, a cell destruction process (e.g., process 680 of FIG. 6E) destroys cells to clear the keep-out regions 1920. Simultaneously, a cell spawn process (e.g., process 640 of FIG. 6C) causes additional cells to be spawned to withstand the force 1910. Although keep-out regions 1920 are described here as being introduced after growth of the GBD structure has started, some embodiments may entail keep-out regions that are initially defined, and cell growth in the keep-out regions may be prevented during all points of growth.

Figure 19E:
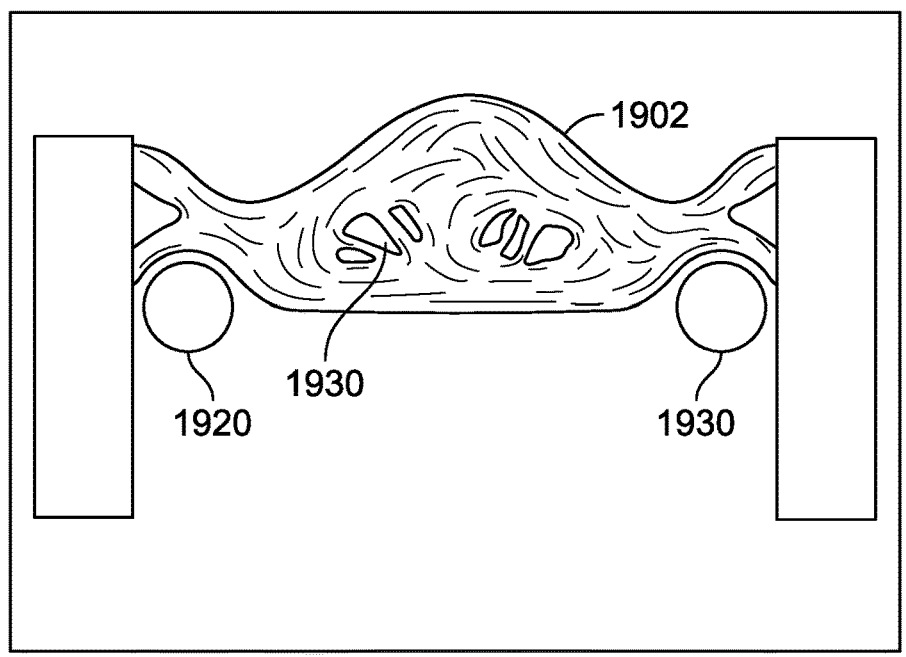
Figure 19F:
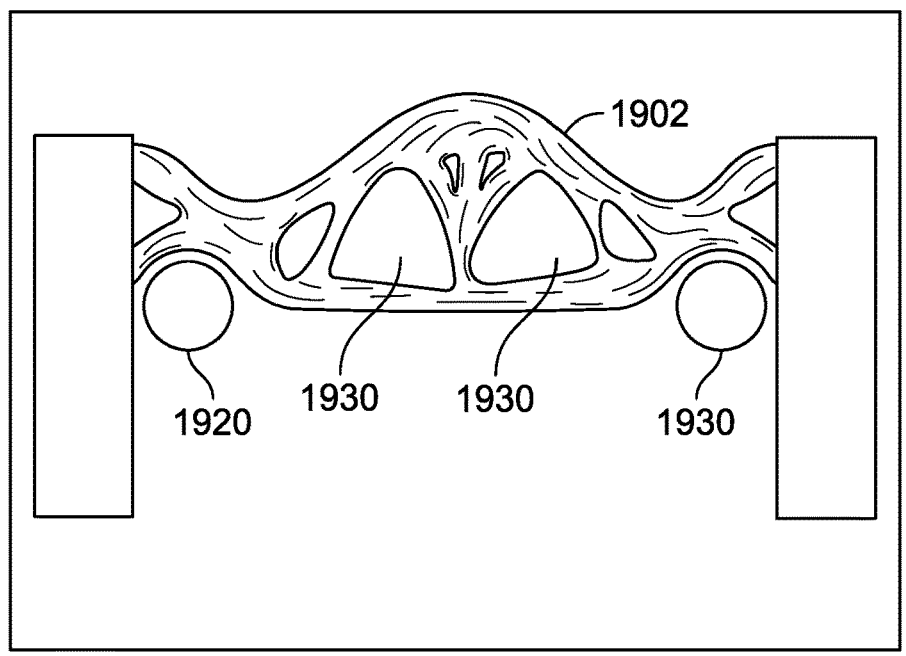
Figure 19G:
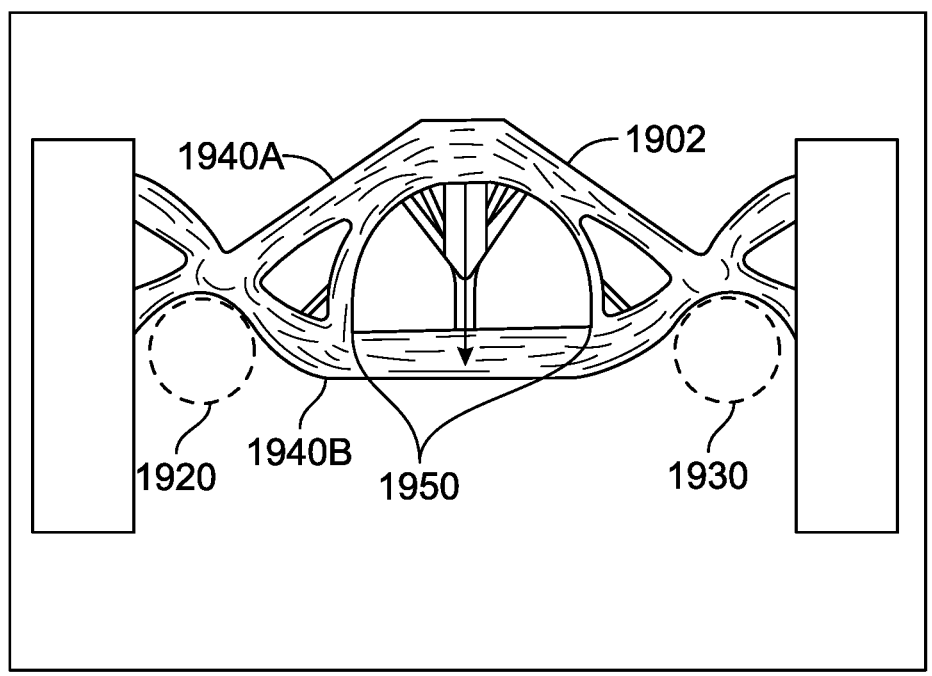
Figure 19H:
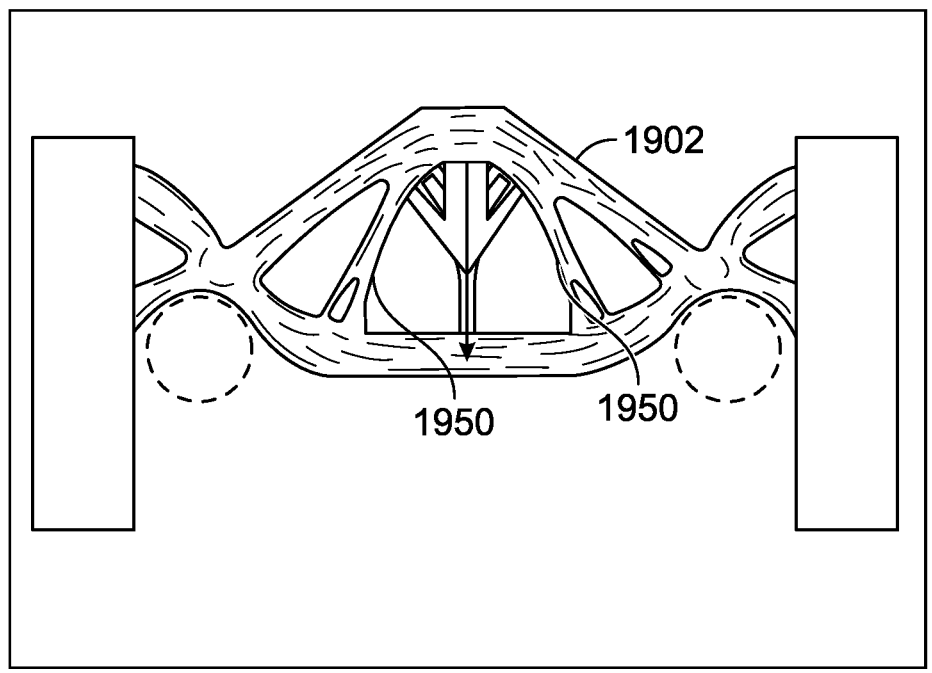
Figure 19I:
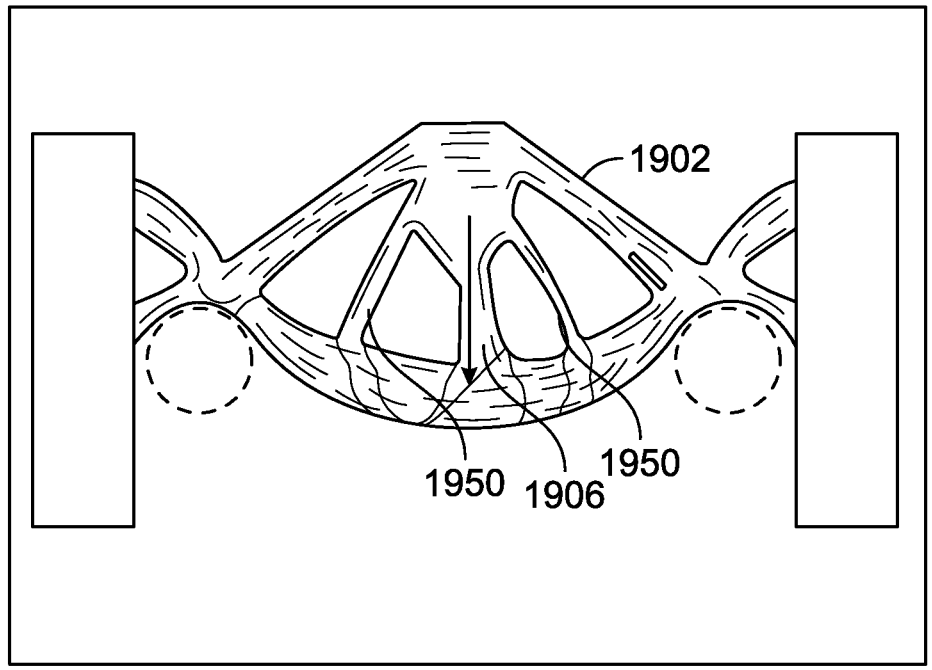
Figure 19J:
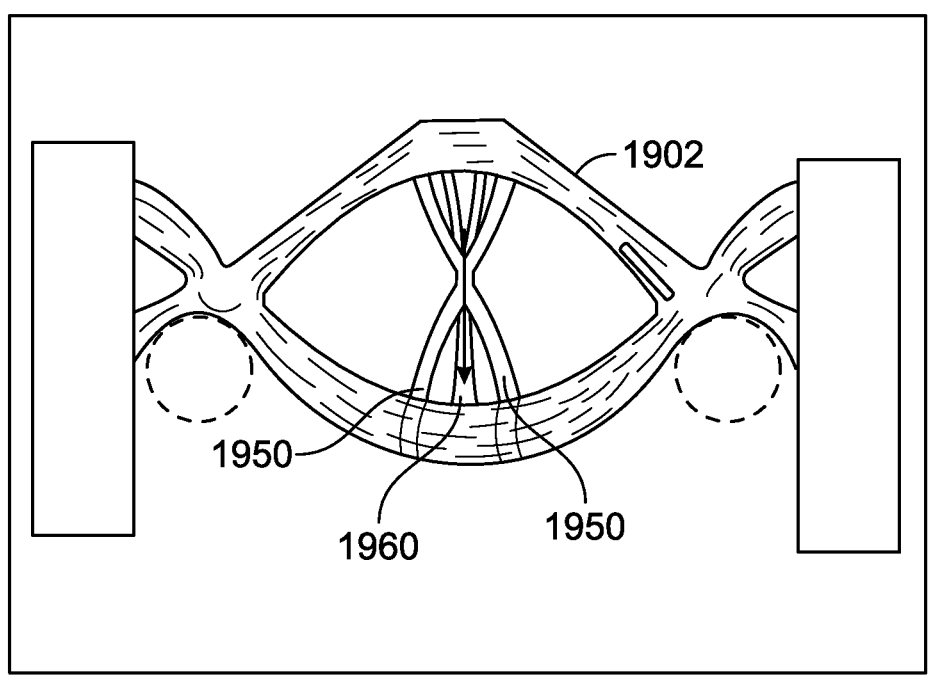

As shown in exemplary FIG. 19E, the cell destruction process may also cause some cells at the center of the GBD structure 1902 to be destroyed as a result of experiencing insufficient strain, opening a cavity 1930 within the GBD structure 1902. Continued cell spawning and destruction, in reaction to one another and to the force 1910, may cause the cavity to expand as shown in exemplary FIG. 19F. This expansion continues through exemplary FIGS. 19G-19I. In exemplary FIG. 19G, an upper dome 1940a and a lower dome 1940b begin to form, and the domes 1940a-b are joined by legs 1950. In FIG. 19H, the legs 1950 begin to migrate towards the center of the GBD structure 1902. The legs 1950 continue to migrate and form new threads, as shown in FIG. 19I, as the response to the force 1910 causes the cell spawning and destruction to shift structural support towards the central target location 1906, thereby supporting the force 1910 with greater efficiency. At FIG. 19J, the GBD structure 1902 forms a stable, final structure 1970 that meets the imposed constraints (e.g., the target location 1906, adherence to the walls 1904a-b, the force 1910, the keep-out regions 1920) without requiring further modification. The structure 1970 can be further processed (e.g., surface smoothing), and the geometry of the structure 1970 can be exported for use in an assembly in a CAD tool, or may be used to define the geometry of an object to be fabricated (e.g., via molding, casting, tooling, milling or additive manufacturing, e.g., 3D printing).

Figure 20:
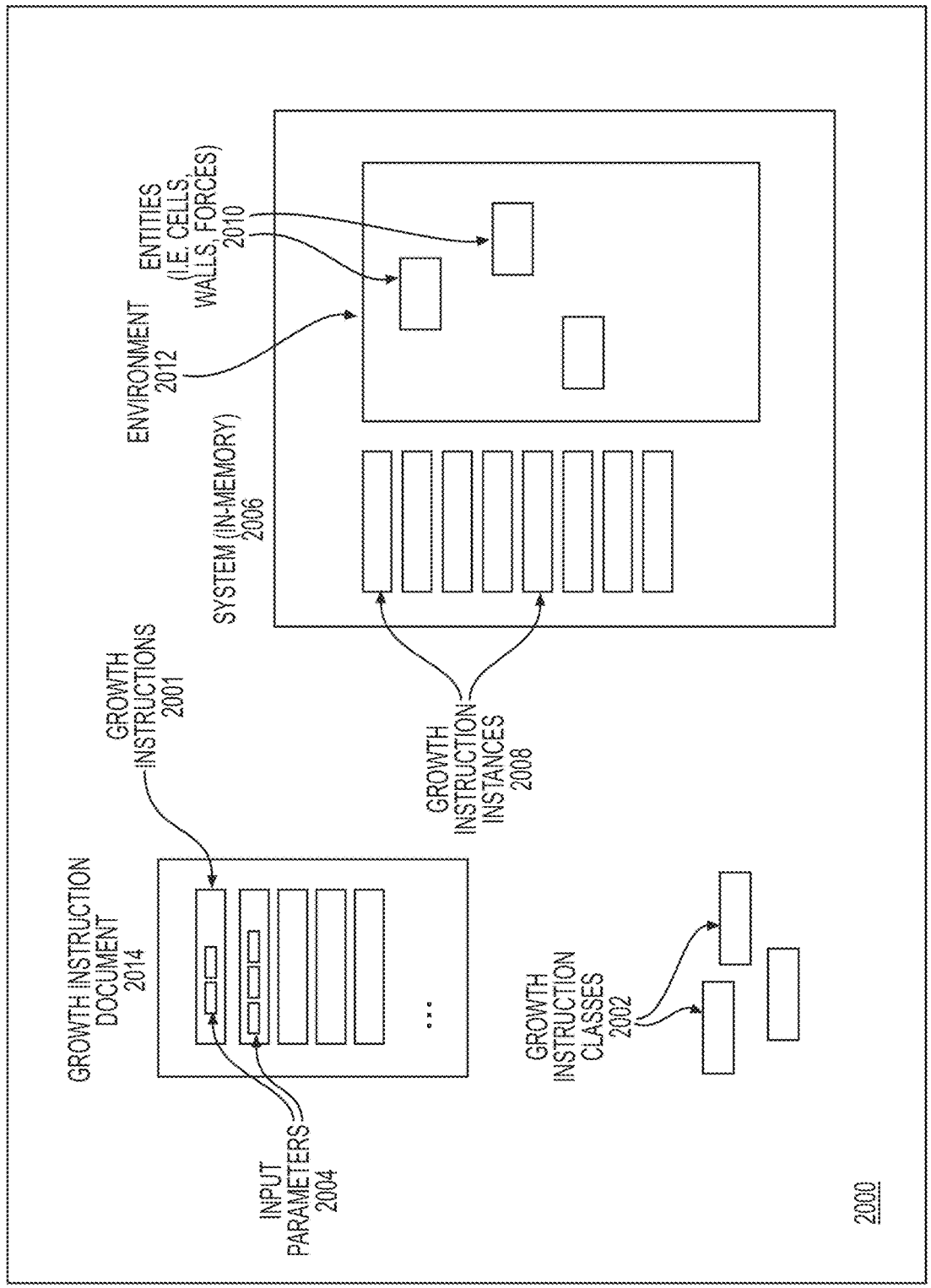
FIG. 20 is a block diagram representing an exemplary growth instruction data structure that may be implemented.

FIG. 20 is a block diagram representing a data structure 2000 that may be implemented in example embodiments, e.g., a growth instruction module 250. An example system 100 and/or design platform 105 may provide a means of eliminating the need to hard-code logic into a main loop (e.g., loop 400 in FIG. 4A) for adding and removing growth elements to and from the design space. Instead, the design platform 105 may provide a means of reading in a set of externally supplied inputs comprising a growth recipe. This growth recipe may be referred to as a set of growth instructions 2001. Each growth instruction 2001 may comprise the name of a growth instruction class 2002 and a set of input parameters 2004 to be used as inputs. A growth instruction class 2002 may refer to a software implementation of the logic encompassed by the growth instruction. When the system 2006 creates an in-memory instance of a growth instruction class 2002, this may be referred to as a growth instruction instance 2008. The design platform 105 may feed the input parameters 2004 into a growth instruction instance 2008.

Growth instruction instances 2008 may create, modify, and delete entities 2010 in the environment 2012 (e.g., the design space), such as cells, in addition to modifying the state of the design space in which the cells reside. A growth instruction instance 2008 may also be used to cause an abrupt change to the design space, such as removing an entity, such as a support structure, or it may be used to subtly change the state of the design space, such as gradually increasing the magnitude of a force. The collection of growth instructions representing the growth recipe described above may be stored in a structure known as a growth instruction document 2014.

When the design platform 105 reads a set of growth instructions 2001 from a document, it may look for the growth instruction class 2002 identified by each growth instruction and instantiate a growth instruction instance 2008 that provides an in-memory representation for the growth instruction 2001. When an in-memory representation of the instruction is created, input parameters may be passed to the method, which may be called upon instantiation of a new GBD structure—this type of method which may be associated with input parameters may be known as a "constructor method" in object-oriented programming languages. In some embodiments, the design platform 105 may pass the input parameters 2004 from each growth instruction 2001 into the corresponding growth instruction instance's constructor method. In such methods, initial parameters of an object to be modeled (e.g., a mechanical part) may be set up before running methods defined within it.

The design platform 105 may instantiate a number of growth instruction instances 2008, and then incorporate these instances into the execution a main loop (e.g., operation 410 in main loop 400 of FIG. 4A). While executing the main loop, the design platform 105 may increment time, call for an update of entities in the design space, and then evaluate each growth instruction instance to see if any conditions for triggering execution have been met. If conditions for execution are met, the design platform 105 may call an execute method on the growth instruction instance 2008. In cases where an input parameter is the ID of an entity in the design space, the design platform 105 may look up the in-memory representation of that entity and pass it to the growth instruction instance.

An example growth instruction 2001 may be represented as XML or JSON data. Such a growth instruction 2001 may have an ID, which may be a number or any other code or identifier assigned by the design platform 105. The ID may uniquely identify the growth instruction from others within a growth instruction document 2014. The growth instruction 2001 may also comprise a type identifier, (e.g., "add_force") that is used to identify a growth instruction class 2002. The growth instruction 2001 may also include a condition that the design platform 105 may use to determine when to execute the instruction. For example, a condition may take on the form of a Java or C++ Boolean expression. An example condition may cause the design platform 105 to retrieve a base cell matching a given ID, and to test the cell to see if it has reached its target location. Accordingly, the design platform 105 may return a Boolean value indicating if the base cell has reached its specified target location through repeated base growth. If the cell has reached its target, then the instruction may cause the design platform 105 to check whether the number of cycles (i.e., time) has exceeded a given count. If so, then the design platform 105 may execute the instruction, which may create a new point force in the design space.

The growth instructions 2001 may comprise a set of parameter inputs 2004. In the example described above, a first input may provide the ID of a node in the design space to which the point force will be attached. Second and third inputs may specify the magnitude and direction of the force, with an assumption of units being Newton and unit vector.

Figure 21A:
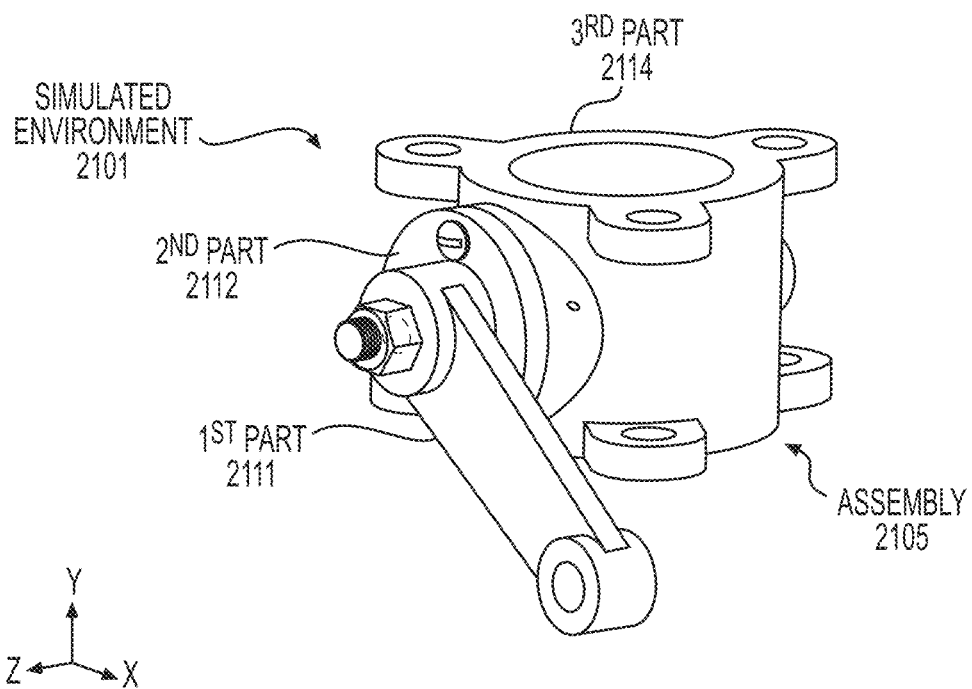
FIGS. 21A, 21B, 21C, 21D, 21E, 21F, 21G, 21H, 21I, and 21J illustrate an exemplary sequence of operations to form a GBD structure.

FIGS. 21A-21J illustrate a sequence of operations to form an object in an example embodiment. Each of the FIGS. 21A-J shows a portion of a CAD tool user interface during a respective state of a design process. FIG. 21A illustrates the model assembly 2105 within a simulated environment, e.g., design space 2101 rendered by a CAD tool. In this example, the first part 2111 is to be replaced with a newly-designed part defined by a GBD process.

FIG. 21A illustrates a model assembly 2105 within a design space 2101 rendered by a CAD tool with which example embodiments may be implemented. The assembly 2105 may include multiple individual modeled parts, including a first part 2111, and second part 2112, and a third part 2114. The parts 2111, 2112, 2114 may be coupled together using modeled fasteners (e.g., bolts, nuts, and screws), and the CAD tool may model the physical properties and real-world operation of the assembly within the design space 2101.

Figure 21B:
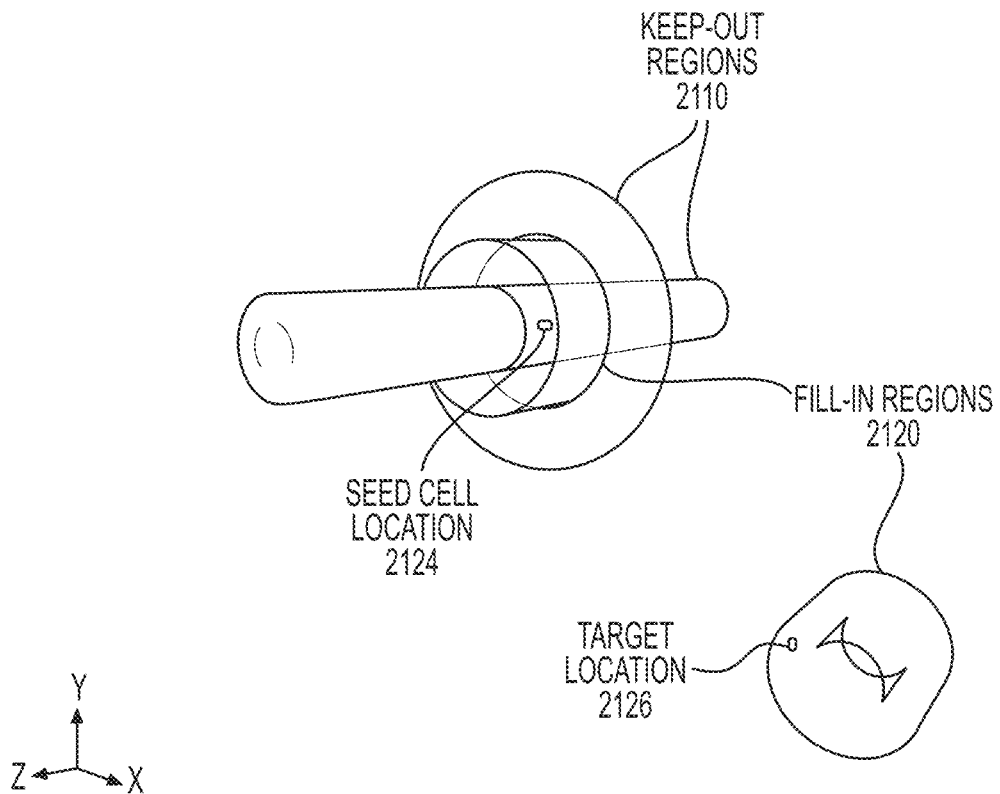

Example embodiments may provide for automatically generating object models using GBD solutions. The object models may be generated to meet predetermined parameters, constraints, performance criteria, or other design requirements. For example, a model may be generated to replace one or more of the parts 2111, 2112, 2114 of the assembly. Further, in meeting particular design requirements, the object model may have a geometry that is superior to the geometry of a corresponding hand-designed part (such as the parts 2111, 2112, 2114). FIG. 21B illustrates an initial design space in which a cell/cell population is to be grown. Here, a number of constraints are established to guide the growth and represent the remainder of the assembly. In particular, fill-in regions 2120 may be imposed to ensure the GBD structure occupies those regions, and keep-out regions 2110 may be imposed to prevent the GBD structure from occupying those regions (e.g., regions occupied by other components of the assembly 2105). The seed cell location 2124 defines locations for one or more seed cells of the GBD structure, while the target location 2126 defines one or more locations to which the GBD structure must grow.

Figure 21C:
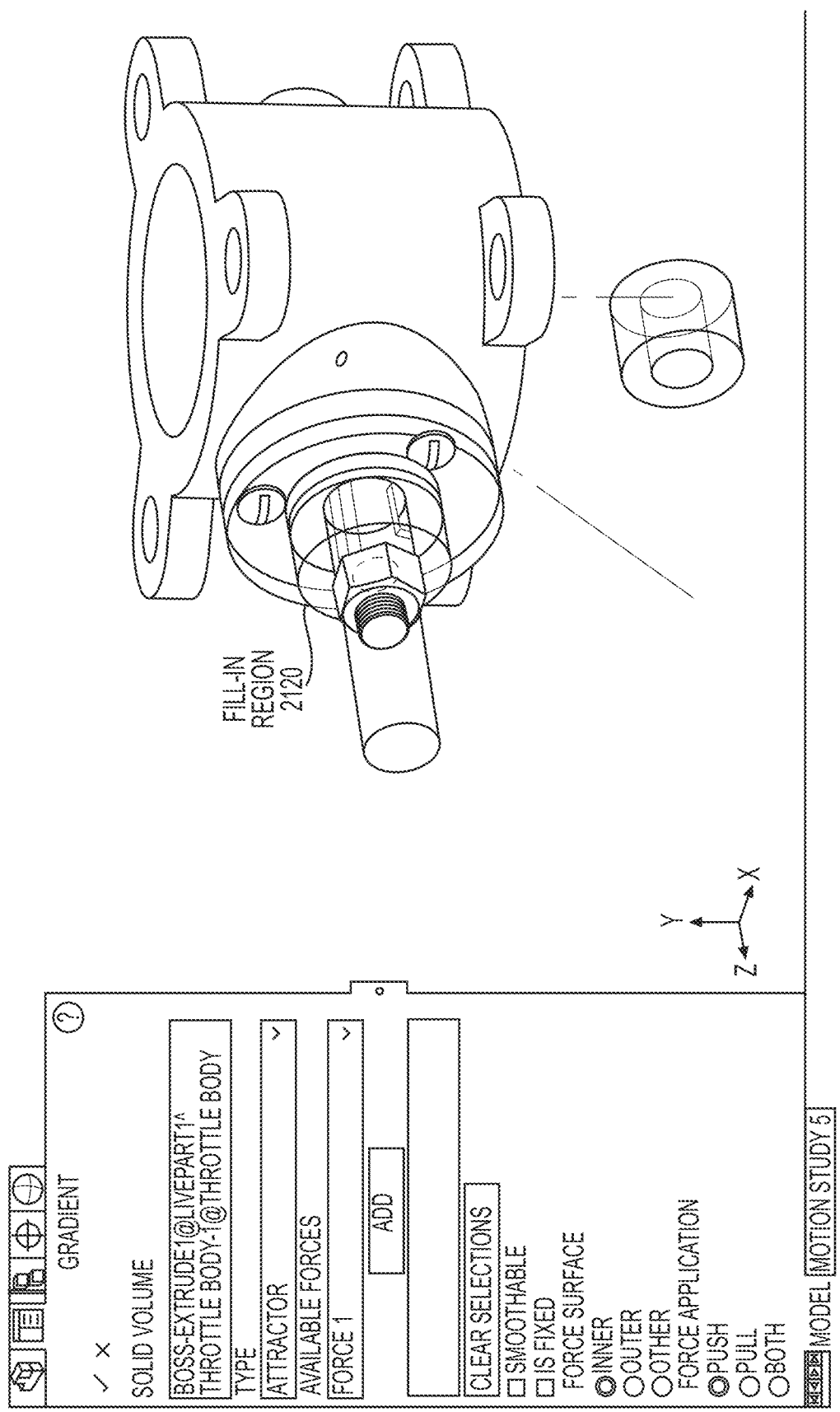
Figure 21D:
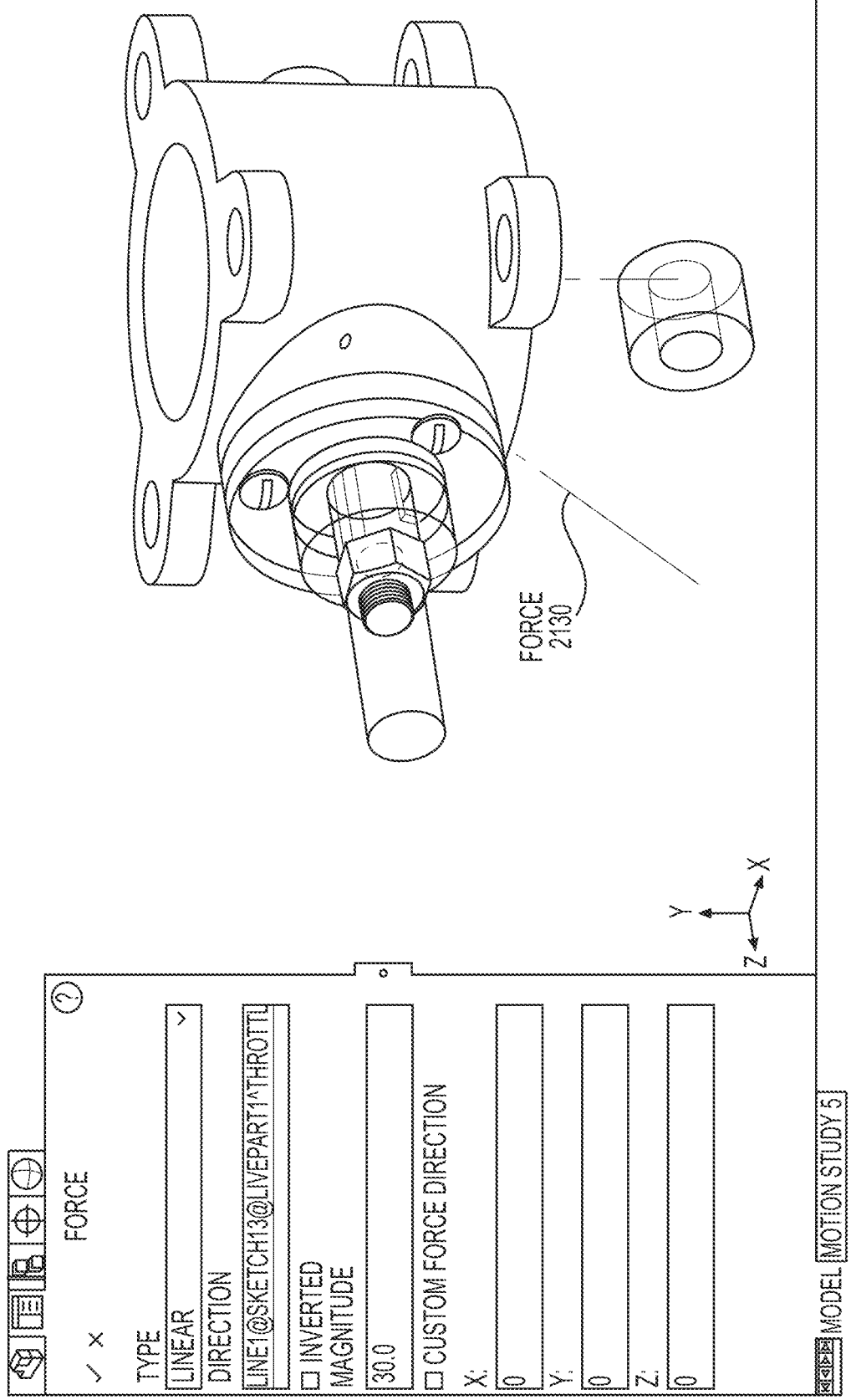
Figure 21E:
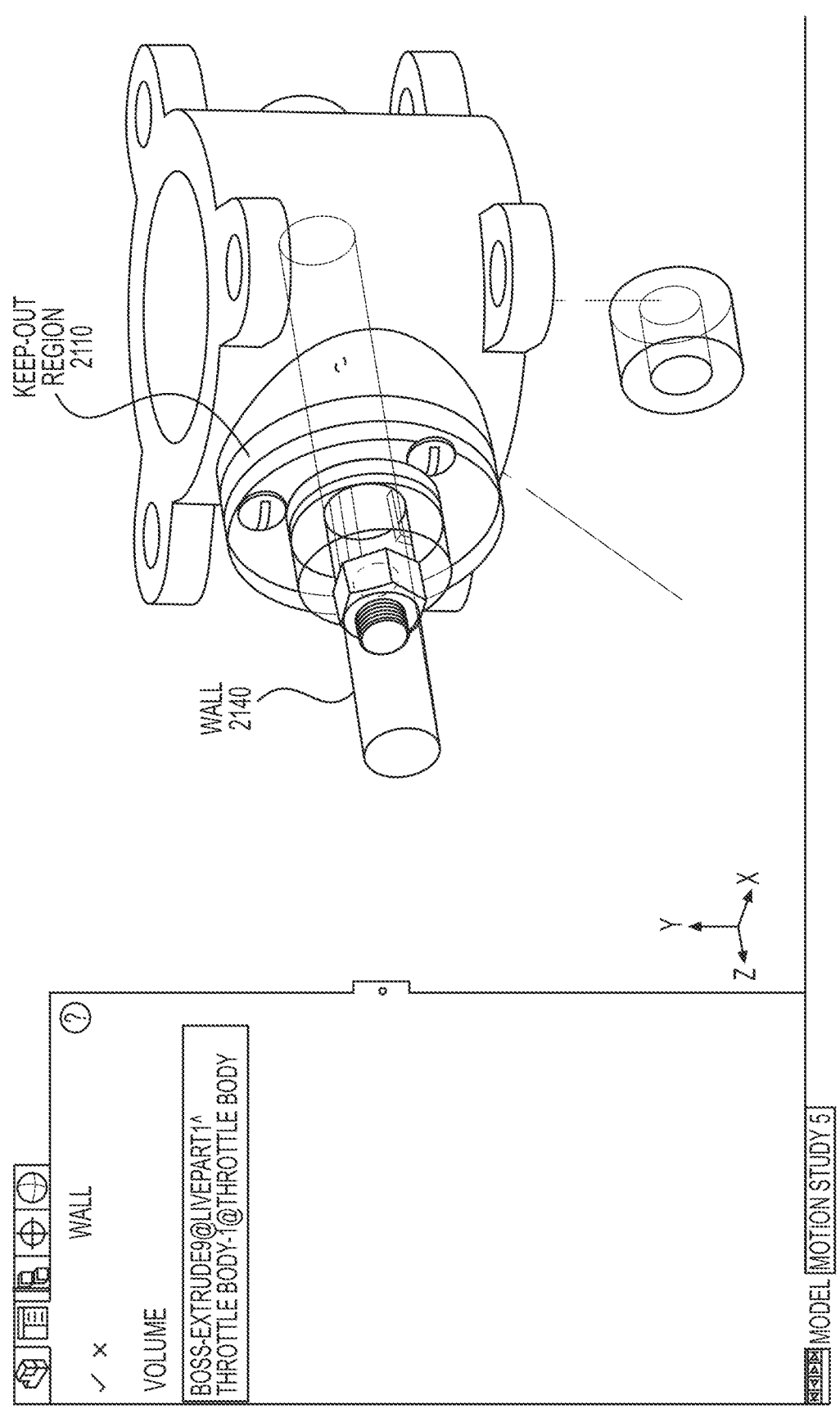
Figure 21F:
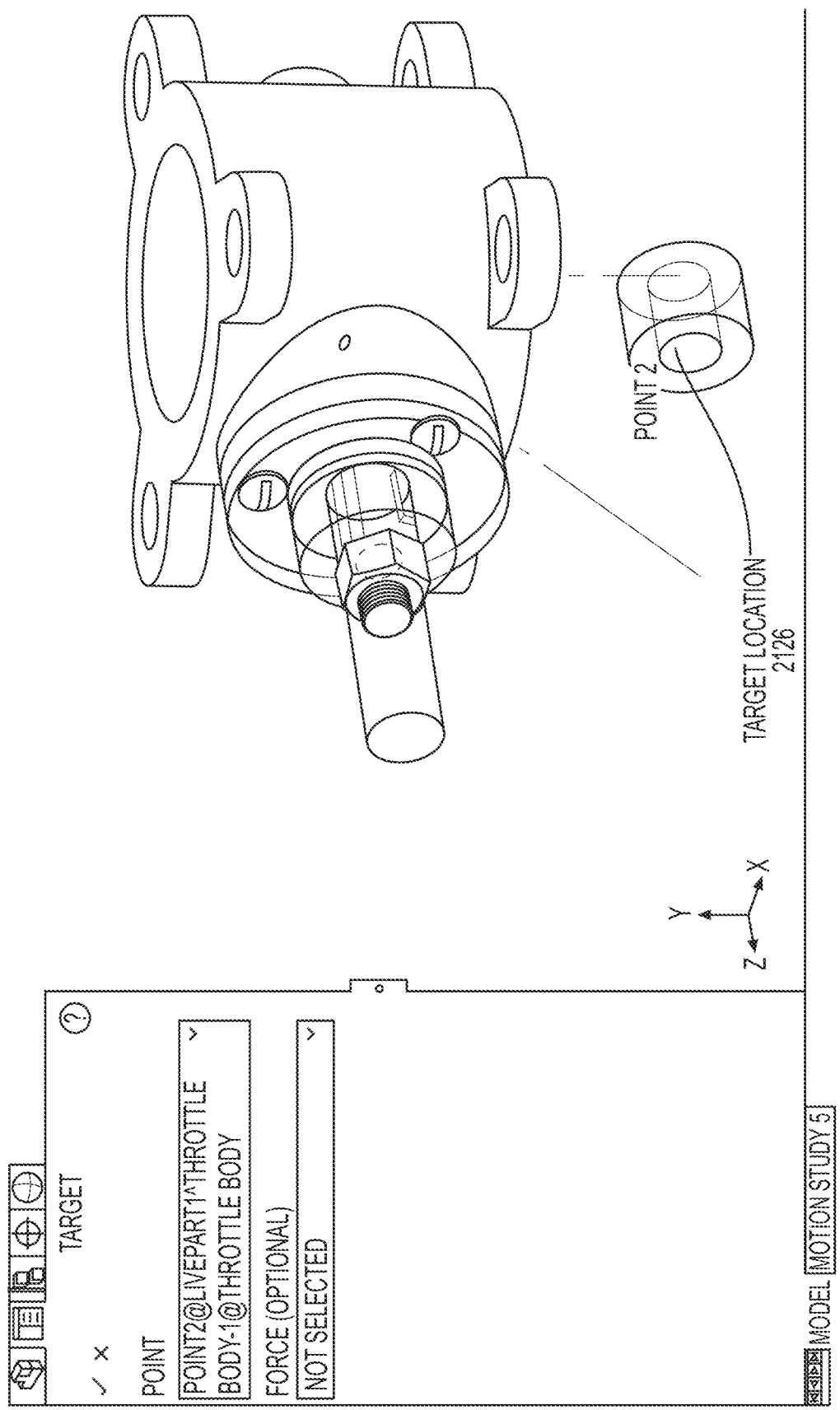
Figure 21G:
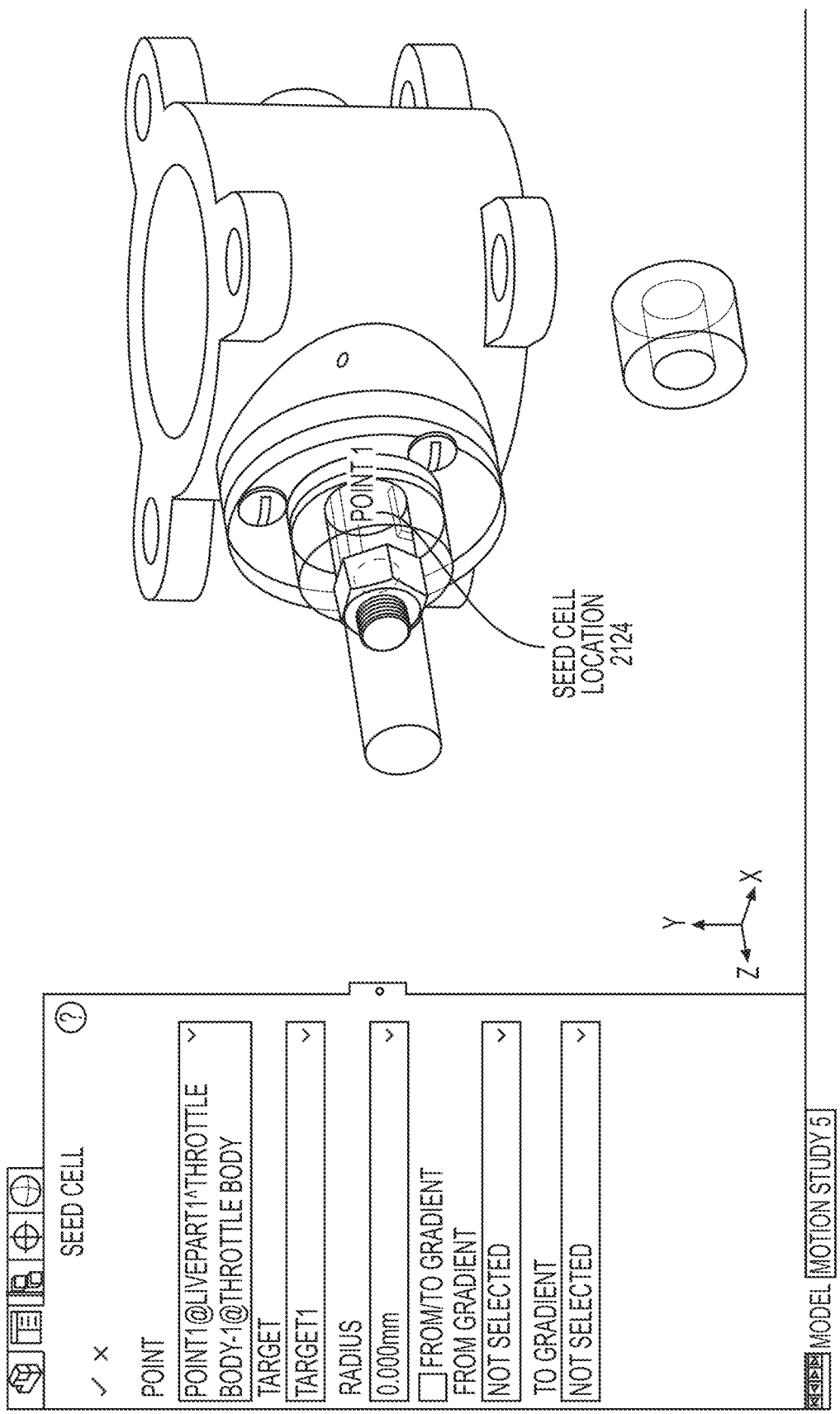
Figure 21H:
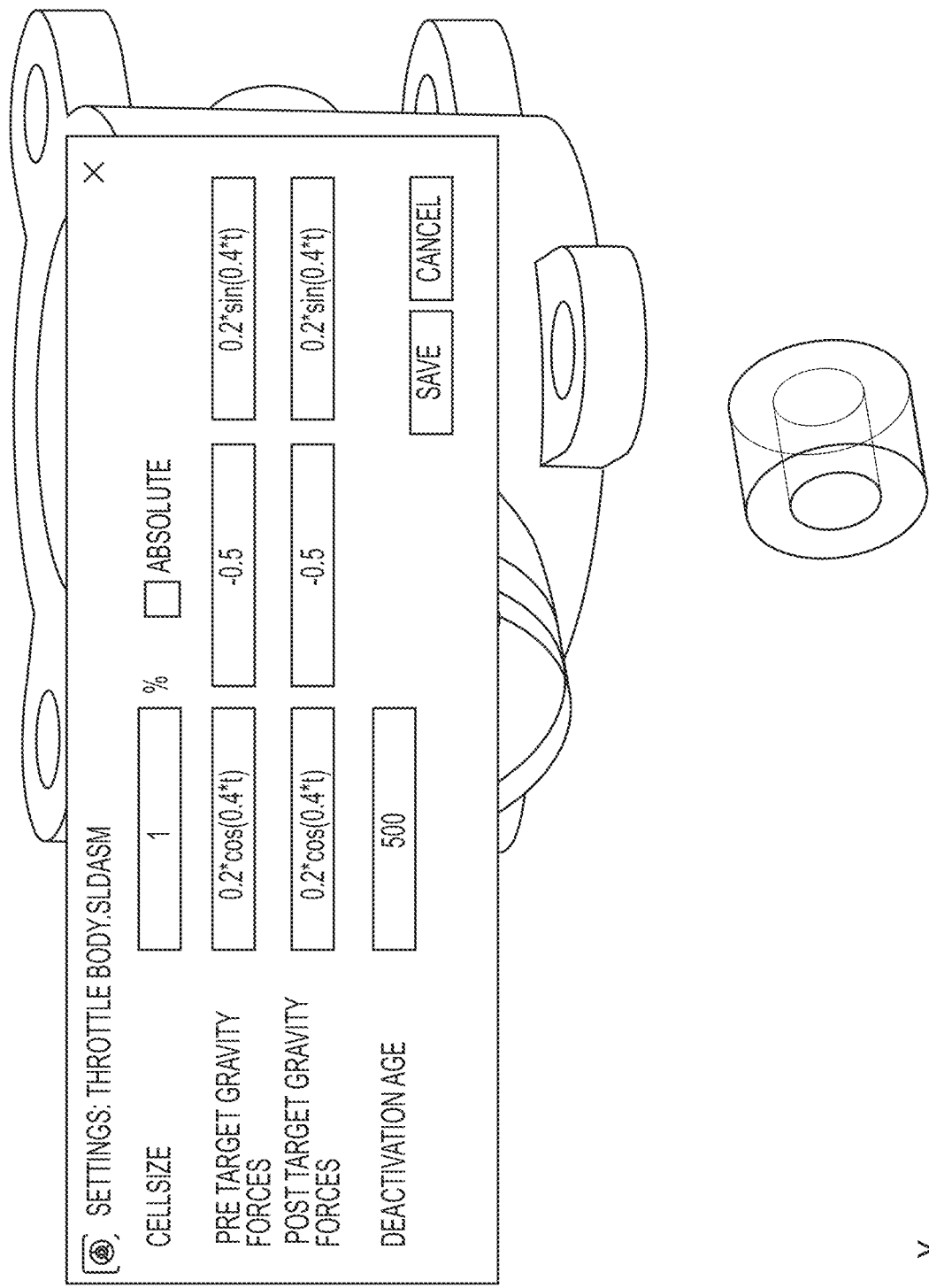

FIGS. 21C-H illustrate a number of dialog boxes within a user interface enabling the user to define constraints and other parameters within the environment to affect the GBD structure. FIG. 21C shows a gradient dialog box for defining the geometry of the fill-in regions 2120. A comparable dialog box may be provide to define the geometry of the keep-out regions 2110. FIG. 21D shows a force dialog box enabling a user to define a force 2130 to be imposed on the GBD structure. As shown in FIG. 21E, a wall dialog box enables a user to define a wall 2140 to which the GBD structure will adhere. In this example, the wall 2140 is an outer surface of a keep-out region 2110. FIG. 21F shows a target dialog box for defining the target location 2126, while FIG. 21G shows a seed cell dialog box for defining the seed cell location 2124. Lastly, FIG. 21H shows a dialog box enabling the user to define other parameters and constraints, such as background gravity waves as functions of time and position. Additionally, the user may define cell properties such as cell size and minimum age before a cell is eligible for termination.

Figure 21I:
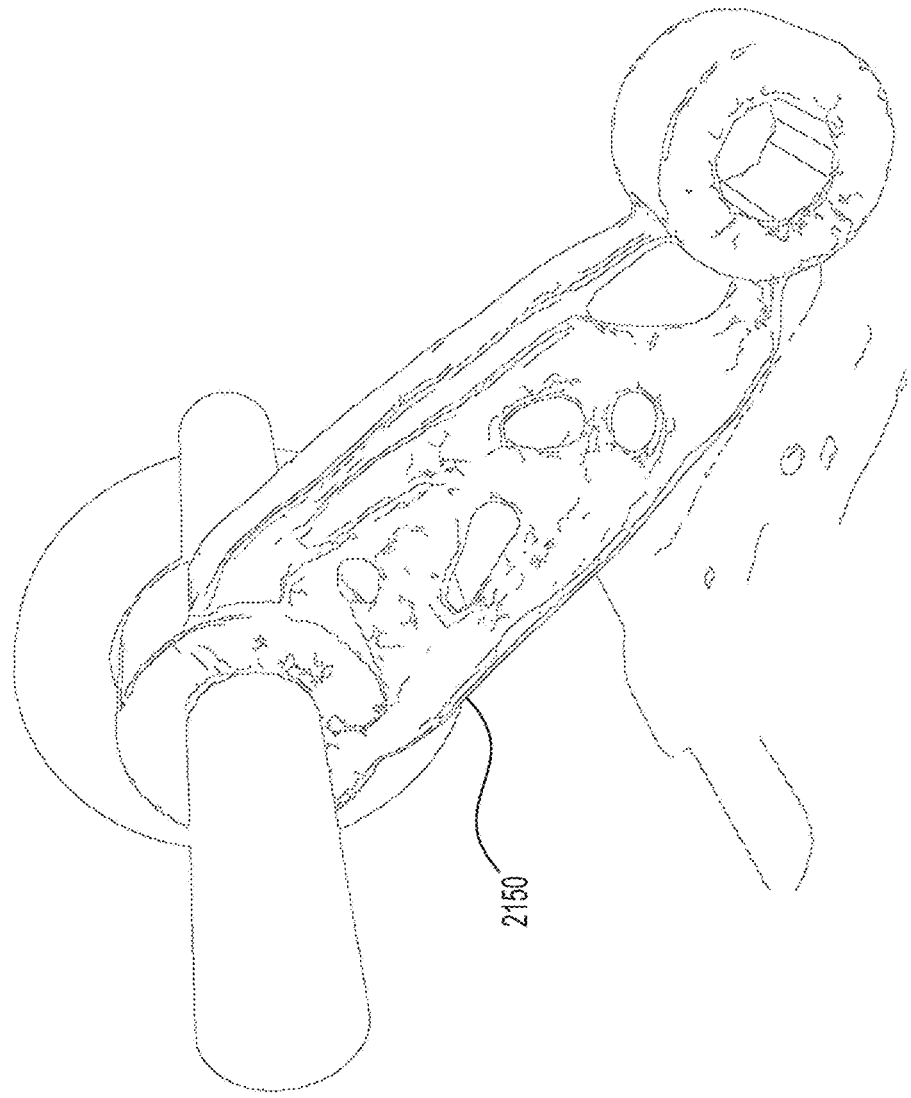

FIG. 21I illustrates a final, stable structure 2150 resulting from the GBD structure undergoing the cell growth, cell spawning, and cell destruction processes under the imposed constraints and parameters described above. The structure 2150 may be further processed, such as by smoothing the outer surfaces of the structure, e.g., voxel fairing. Alternatively, a user may continue to modify the structure by modifying the aforementioned constraints, or by imposing other parameters or forces as presented in the dialog box at left.

Figure 21J:
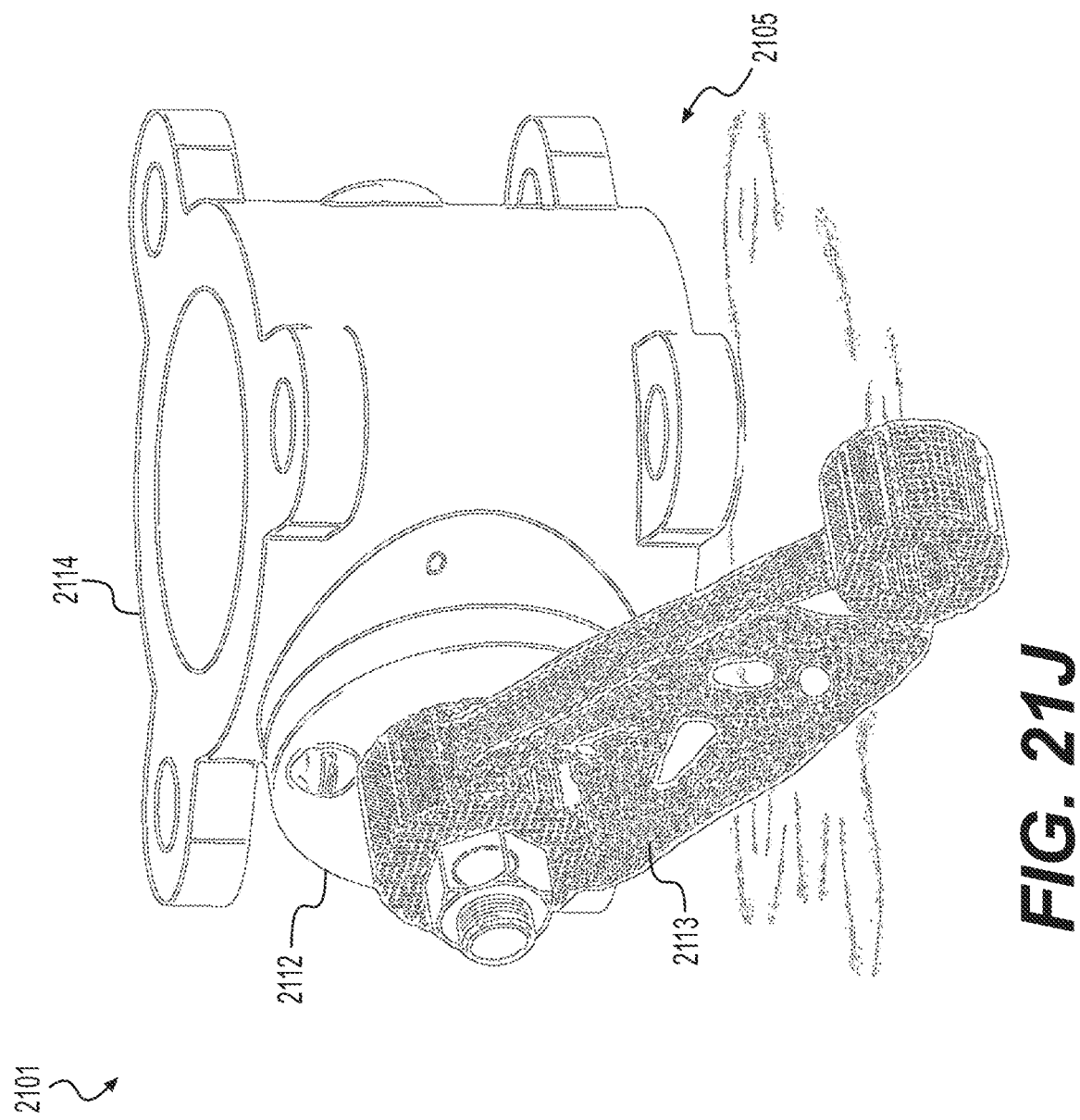

FIG. 21J illustrates a model of the resulting GBD part 2113 based on the final structure 2150 in the context of the assembly 2105. The model GBD part 2113 may be further analyzed within a CAD tool, or may be used to fabricate a corresponding real-world object. For example, a 3D printing system may process the model GBD part 2113 to define the geometry of a corresponding printed object, as well as corresponding instructions (e.g., a toolpath) enabling the 3D printing system to print the object.

FIG. 21J illustrates the model assembly 2105 of FIG. 21A, but modified to replace the first part 2111 with a model part 2113 having a geometry defined by a GBD solution. The GBD part 2113 may have a geometry defined as a result of a GBD process described herein. The GBD part 2113 may possess a number of advantages over the first part 2111, such as higher durability, higher strength, lower volume (and thus more efficient use of build materials), and greater ease of manufacturing by some manufacturing processes. Various embodiments of performing growth-based design are disclosed, for example, in U.S. patent application Ser. No. 16/173,343, filed Oct. 29, 2018, entitled "Growth-Based Design System," U.S. Provisional Application No. 62/583,880 filed on Nov. 9, 2017, U.S. Provisional Application No. 62/623,821 filed on Jan. 30, 2018, and U.S. Provisional Application No. 62/626,608 filed on Feb. 5, 2018. The teachings of these above applications are incorporated herein by reference in their entireties.

A part having geometry defined by a GBD solution, such as the part 2113, may also have several advantages when manufactured via metal injection molding (MIM) and additive manufacturing (3D printing). Both such manufacturing processes may impose certain constraints or limitations on geometries and materials of objects to be manufactured. For example, a debinding process of 3D printing may require objects not to exceed a maximum thickness in order for the green object to be efficiently debinded within an acceptable period of time. Further, a 3D printer may be able to generate green objects having certain geometries more efficiently, and with higher fidelity to the original design, than objects having other geometries. For example, object geometries that can be printed via more continuous tool paths, fewer discrete segments at each layer, and minimal layer-to-layer differential, may yield higher-fidelity objects that can also be manufactured more quickly by a 3D printer. It may also be advantageous to generate a part meeting design requirements while using minimal material. Example embodiments may generate object models for manufacturing using MIM and/or 3D printing, and may generate those objects to confer some or all of the advantages described above.

Figure 31A:
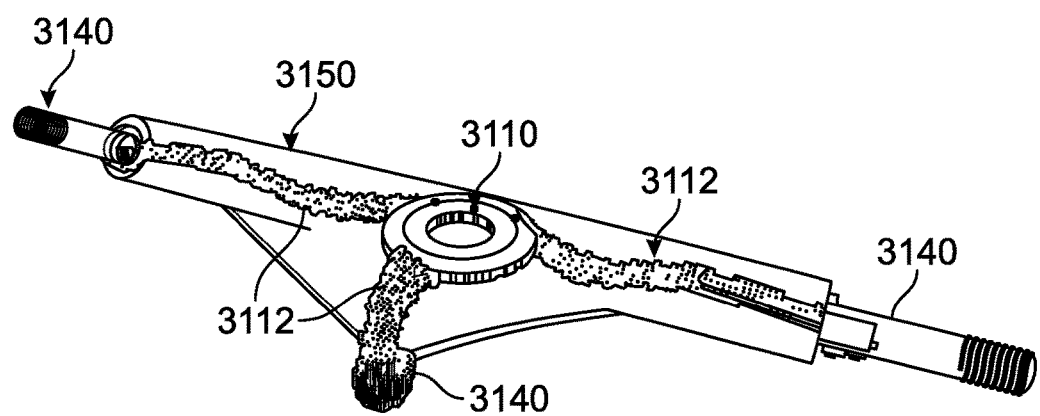
FIGS. 31A, 31B, and 31C illustrate a controlled growth of an exemplary GBD structure and formation of a mechanical part.
Figure 31B:
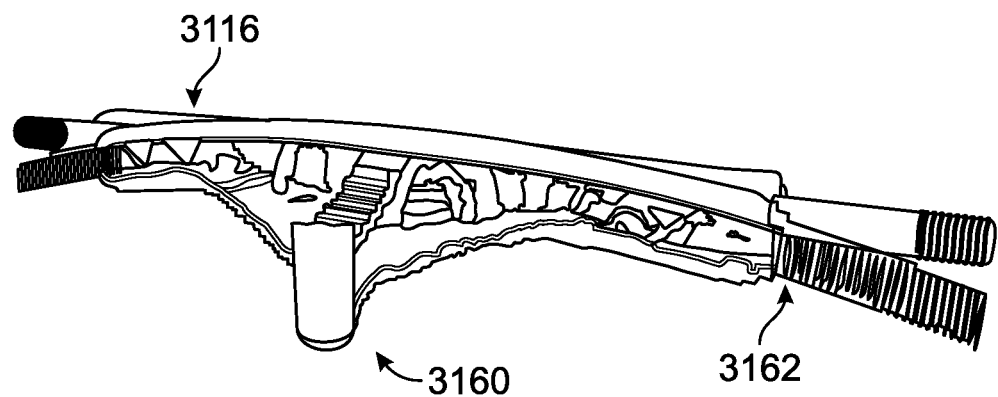
Figure 31C:
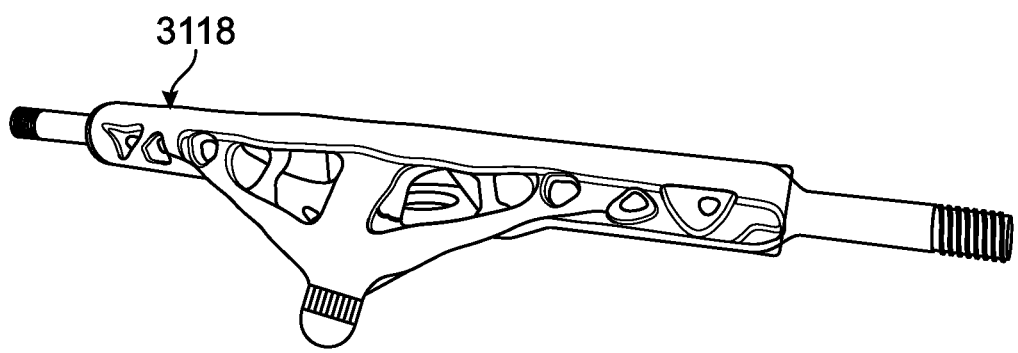

FIGS. 31A-31C illustrate a controlled growth of a GBD structure and formation of a model part in a further embodiment. FIG. 31A illustrates early growth of a GBD structure, including three stems 3112 growing from start locations 3110 coincident at the rear center of a disk region towards end locations located on three attractor volumes 3140. The growth may be constrained to lie within a container volume 3150, which may define a volume within which the GBD structure may grow, and may prevent occurrence of the GBD structure outside of the container volume 3150.

FIG. 31B illustrates an example of a mature, grown GBD structure, part 3116. Forces 3160, 3162 may be applied during the growth of the part 3116, influencing the growth by causing the GBD structure to generate and/or remove cells to counteract the forces 3160, 3162. An upward force 3160 may be applied at a central attractor volume, and a downward force 3162 may be applied at ends of the part on surfaces touching attractor volumes. Exemplary GBD structure 3116 may be deformed due to the force stimuli, but may be constrained to grow only within the container volume 3150. FIG. 31C shows an exemplary mature part 3118 after snapping to an undeformed state, with application of voxel fairing and smoothing. Here, it can be seen that the part 3118 continues to lie within the container volume 3150 of FIG. 31A.

Example embodiments, described below, include systems and methods of providing object geometries via GBD solutions. Systems incorporating example embodiments provide design tools for simulating the growth of a physical structure using a cell-based approach. Users may work with a palette of setup features, which they add to a design space comprising initial constraints such as forces and fixed locations. The design space may support keep-out regions to prevent cell growth, fill-in regions to enforce cell growth, and container regions that act as cages to contain cell growth. Additionally, users may define signaling sources that form gradient fields of parameter values across a cell population to propagate changes across portion(s) of a GBD structure. The user may also define seed cell connections that specify start locations for cells upon fixed surfaces and target locations for stem growth to terminate at forced surfaces. The user may add a collection of features to a design space that may contain assembly geometry of parts to which the grown part or parts must mate and align. The features may allow the user to select geometry in the assembly to be associated with fill-in, keep-out, and container regions. When the setup is complete, the user may trigger cell growth to begin. Cells may begin to grow from seed cells in the directions of target locations to form stems. As time steps progress, the environment may vary the initial stimuli in the form of forces, heat sources, electrostatic fields, and chemical concentrations that may act upon the GBD structure. These stimuli may further trigger the environment to update one or more multi-physics engines that produce cell-level reactions to the stimuli. These reactions may include changes to the positions of cells, changes in strains, stresses, temperatures, and/or other cell-based parameters representing responses to stimuli upon the GBD structure.

As cells within the GBD structure react to changes in stimuli, their parameter values representing immediate changes, such as strain, may cause a set of other parameters to update. These other parameters may update parameters to across cell boundaries, similar to how chemicals may react, diffuse, and decay in a substrate. For example, when a cell's strain parameter increases drastically from one frame to the next, a second parameter representing a strain relational parameter in the cell may initially spike or "react" by increasing in response to the drastic increase in the strain parameter. But then a second modification of the strain relational parameter may cause it to decrease, analogous to how diffusion of a high concentration of a chemical in one cell to a lower concentration of the same parameter in a neighboring cell with a lower value of the strain chemical parameter. Finally, after the diffusion, the strain relational parameter of the first and other cells may further update by dropping in order to simulate a decay or "sink" of the concentration over time.

Once the cells' parameters have been updated, the design platform 105 may spawn new cells, kill existing cells, and modify the connections of these cells with neighboring cells and supporting structures. One purpose of the secondary modification of parameters based upon the values of the same parameters in neighboring cells is to average or damp out the immediate changes to cell parameters based upon changes in stimuli. Another purpose is to allow cells to propagate signals to other cells. For example, if a cell updates by dramatically increasing its strain parameter, the diffusion and decay into other cells may serve to signal to neighboring cells a high strain. This may enable the GBD structure to effect cell growth in a general area where a single cell may experience a high strain. By increasing the diffusion rate upon each frame tick, this signal may be propagated to a wider area of neighboring cells spurring a more regional growth. Alternatively, by increasing the decay rate of the strain chemical parameter, the size of the signal area may be reduced causing a more localized growth.

As time elapses, the disclosed system and methods may trigger the introduction of additional forces, such as point loads and keep-out regions. As time passes, the cellular structure may adapt to changes imposed by the design space. In the same way that a tree grows to support its own increasing weight over time, a cellular structure may adapt to a collection of varying dynamic loads.

Once a cellular structure has reached a certain level of maturity (as measured by cell age or elapsed time of a design process), the disclosed embodiments may be triggered to unleash a cell-destroying process that causes cells to self-terminate if they meet certain fitness criteria. One such criterion is low strain or low value in a strain relational parameter, whereby a cell may not be participating significantly in holding up the structure, and thus may sense little strain. In many cases, cells created early in the design process may no longer be needed to support the structure. Because the overall cell population may have changed, cells that may have formed at the core of a "stem" structure early on may end up with little or no strain as younger cells on the outside of the stem take up the shifting loads. As cells die, neighboring cells may feel the effects of the increased average loads per cell. This may cause the GBD structure to enter a phase whereby cells are both destroyed and spawned simultaneously in order to reach equilibrium. The disclosed system may activate these cell-terminating processes at different points in time in the same way it activates and configures loads, mounting structures, cell-signaling sources, at different points in time.

While example embodiments have been particularly shown and described, it will be understood by those skilled in the art that various changes in form and details may be made therein without departing from the scope of the embodiments encompassed by the appended claims.

The description above and examples are illustrative, and are not intended to be restrictive. One of ordinary skill in the art may make numerous modifications and/or changes without departing from the general scope of the invention. For example, and as has been referenced, the above-described embodiments (and/or aspects thereof) may be used in combination with each other. Additionally, portions of the above-described embodiments may be removed without departing from the scope of the invention. In addition, modifications may be made to adapt a particular situation or aspect to the teachings of the various embodiments without departing from their scope. Many other embodiments will also be apparent to those of skill in the art upon reviewing the above description.

What is claimed is:

1. A non-transitory computer readable medium for use on a computer system containing computer-executable programming instructions for performing a method of generating a design for a mechanical part, the method comprising:
   generating a model of a mechanical part, the model including one or more cells, wherein each cell is comprised of a plurality of parameterized representations, each of the plurality of parameterized representations representing a material property;
   determining, for each cell, a cell-specific parameter value for each of the parameterized representations;
   comparing, for each cell, each of the cell-specific parameter values to a corresponding threshold parameter value associated with each of the representations of the material properties; and
   generating at least one additional cell or removing at least one of the one or more cells based on the comparison of each cell-specific parameter value to the corresponding threshold parameter value; and
   wherein at least one cell-specific parameter value is a strain value.

2. The computer-implemented method of claim 1, further comprising:
   determining a prompt corresponding to a physical material property, a temperature, or an age of the cell; and
   updating each of the cell-specific parameter values based on the prompt.

3. The computer-implemented method of claim 2, further comprising:
   determining the prompt based on user input or a default setting related to a simulated stimulus applied to the model of the mechanical part.

4. The computer-implemented method of claim 2, further comprising:
   determining the threshold parameter value based on the prompt.

5. The computer-implemented method of claim 1, further comprising:
   detecting, for each cell, at least one neighboring cell; and
   determining each cell-specific parameter value based on a parameter value associated with the at least one neighboring cell.

6. The computer-implemented method of claim 1, further comprising:
   generating the parametrized representations of each cell based on user inputs comprising material type or safety factor.

7. The computer-implemented method of claim 1, further comprising:
   identifying a location on or within the model of the mechanical part; and
   generating the at least one additional cell or removing the at least one of the one or more cells at the identified location of the model.

8. The computer-implemented method of claim 7, further comprising:
   identifying the location based on a cell-specific parameter value, a user input, a setting associated with the mechanical part, or a combination thereof.

9. A system for performing a method of generating a design for a mechanical part, the system comprising:
   a data storage device storing instructions for performing a method of generating a design for a mechanical part; and
   a processor configured to execute the instructions to perform a method including:
      generating a model of a mechanical part, the model including one or more cells, wherein each cell is comprised of a plurality of parameterized representations, each of the plurality of parameterized representations representing a material property;
      determining, for each cell, a cell-specific parameter value for each of the parameterized representations;
      comparing, for each cell, each of the cell-specific parameter values to a corresponding threshold parameter value associated with each of the representations of the material properties; and
      generating at least one additional cell or removing at least one of the one or more cells based on the comparison of each cell-specific parameter value to the corresponding threshold parameter value.

10. The system of claim 9, wherein the system is further configured for:
    determining a prompt corresponding to a physical material property, a temperature, or an age of the cell; and
    updating each of the cell-specific parameter values based on the prompt.

11. The system of claim 10, wherein the system is further configured for:
    determining the prompt based on user input or a default setting related to a simulated stimulus applied to the model of the mechanical part.

12. The system of claim 10, wherein the system is further configured for:
    determining the threshold parameter value based on the prompt.

13. The system of claim 9, wherein the system is further configured for:
    detecting, for each cell, at least one neighboring cell; and determining each cell-specific parameter value based on a parameter value associated with the at least one neighboring cell.

14. The system of claim 9, wherein the system is further configured for:
generating the parametrized representations of each cell based on user inputs comprising material type or safety factor.

15. The system of claim 9, wherein the system is further configured for:
identifying a location on or within the model of the mechanical part; and
generating the at least one additional cell or removing the at least one of the one or more cells at the identified location of the model.

16. The system of claim 15, wherein the system is further configured for:
identifying the location based on a cell-specific parameter value, a user input, a setting associated with the mechanical part, or a combination thereof.

17. A non-transitory computer readable medium for use on a computer system containing computer-executable programming instructions for performing a method of generating a design for a mechanical part, the method comprising:
generating a model of a mechanical part, the model including one or more cells, wherein each cell is comprised of a plurality of parameterized representations, each of the plurality of parameterized representations representing a material property;
determining, for each cell, a cell-specific parameter value for each of the parameterized representations;
comparing, for each cell, each of the cell-specific parameter values to a corresponding threshold parameter value associated with each of the representations of the material properties; and
generating at least one additional cell or removing at least one of the one or more cells based on the comparison of each cell-specific parameter value to the corresponding threshold parameter value.

18. The non-transitory computer readable medium of claim 17, the method further comprising:
determining a prompt corresponding to a physical material property, a temperature, or an age of the cell; and
updating each of the cell-specific parameter values based on the prompt.

19. The non-transitory computer readable medium of claim 17, the method further comprising:
determining the prompt based on user input or a default setting related to a simulated stimulus applied to the model of the mechanical part.

20. The non-transitory computer readable medium of claim 17, the method further comprising: determining the threshold parameter value based on the prompt.

* * * * *